US012774413B2

(12) United States Patent
Wang et al.

(10) Patent No.: US 12,774,413 B2
(45) Date of Patent: Oct. 27, 2026

(54) HYDROCHROMIC HALIDE PEROVSKITE, ITS PREPARATION AND USE THE SAME

(71) Applicant: City University of Hong Kong, Kowloon (HK)

(72) Inventors: Feng Wang, Kowloon (HK); Jiangkun Chen, Kowloon (HK)

(73) Assignee: City University of Hong Kong, Kowloon (HK)

(*) Notice: Subject to any disclaimer, the term of this patent is extended or adjusted under 35 U.S.C. 154(b) by 633 days.

(21) Appl. No.: 18/356,646

(22) Filed: Jul. 21, 2023

(65) Prior Publication Data

US 2025/0026981 A1 Jan. 23, 2025

(51) Int. Cl.
*C09K 11/77* (2006.01)
*C01F 17/36* (2020.01)

(52) U.S. Cl.
CPC .......... *C09K 11/7705* (2013.01); *C01F 17/36* (2020.01); *C09K 11/7733* (2013.01)

(58) Field of Classification Search
CPC .. C09K 11/7705; C09K 11/7733; C01F 17/36
See application file for complete search history.

(56) References Cited

PUBLICATIONS

Chen et al, "Ultrafas and Multicolor Luminescence Switching in a Lanthanide-Based Hydrochromic Perovskite", J.Am.Chem.Soc., 2022, 144, 22295-22301, Nov. 23, 2022.*

Zhang, C.; Wang, B.; Li, W.; Huang, S.; Kong, L.; Li, Z.; Li, L. Conversion of invisible metal-organic frameworks to luminescent perovskite nanocrystals for confidential information encryption and decryption. Nat. Commun. 2017, 8, 1138.

Park, D.-H.; Jeong, W.; Seo, M.; Park, B. J.; Kim, J.-M. Inkjet-Printable Amphiphilic Polydiacetylene Precursor for Hydrochromic Imaging on Paper. Adv. Funct. Mater. 2016, 26, 498-506.

Lee, J.; Chang, H. T.; An, H.; Ahn, S.; Shim, J.; Kim, J. M. A protective layer approach to solvatochromic sensors. Nat. Commun. 2013, 4, 2461.

Lee, J.; Pyo, M.; Lee, S. H.; Kim, J.; Ra, M.; Kim, W. Y.; Park, B. J.; Lee, C. W.; Kim, J. M. Hydrochromic conjugated polymers for human sweat pore mapping. Nat. Commun. 2014, 5, 3736.

Sheng, L.; Li, M.; Zhu, S.; Li, H.; Xi, G.; Li, Y.-G.; Wang, Y.; Li, Q.; Liang, S.; Zhong, K.; Zhang, S. X.-A. Hydrochromic molecular switches for water-jet rewritable paper. Nat. Commun. 2014, 5, 3044.

(Continued)

*Primary Examiner* — C Melissa Koslow

(74) *Attorney, Agent, or Firm* — Renner, Kenner, Greive, Bobak, Taylor & Weber

(57) ABSTRACT

A hydrochromic halide perovskite includes a $Cs_xTb_yF_z$ halide perovskite doped with a lanthanide ion dopant, which is capable of water-induced reversible phase transformation between pristine state and wet state, and exhibits reversible change in optical emission under ultraviolet excitation. A printable pattern comprising a film of the hydrochromic halide perovskite and a method for preparing the hydrochromic halide perovskite are also addressed.

30 Claims, 54 Drawing Sheets
(6 of 54 Drawing Sheet(s) Filed in Color)

(56) References Cited

PUBLICATIONS

Burneo, I.; Stylianou, K. C.; Rodríguez-Hermida, S.; Juanhuix, J.; Fontrodona, X.; Imaz, I.; Maspoch, D. Two New Adenine-Based Co(II) Coordination Polymers: Synthesis, Crystal Structure, Coordination Modes, and Reversible Hydrochromic Behavior. Cryst. Growth Des. 2015, 15, 3182-3189.
Zhang, C.; Sun, L.; Yan, Y.; Shi, H.; Wang, B.; Liang, Z.; Li, J. A novel photo- and hydrochromic europium metal-organic framework with good anion sensing properties. J. Mater. Chem. C 2017, 5, 8999-9004.
Zhao, H.; Qin, X.; Zhao, L.; Dong, S.; Gu, L.; Sun, W.; Wang, D.; Zheng, Y. Invisible Inks for Secrecy and Anticounterfeiting: From Single to Double-encryption by Hydrochromic Molecules. ACS Appl. Mater. Interfaces 2020, 12, 8952-8960.
Mao, L.; Wang, Z.; Duan, Y.; Xiong, C.; He, C.; Deng, X.; Zheng, Y.; Wang, D. Designing of Rewritable Paper by Hydrochromic Donor-Acceptor Stenhouse Adducts. ACS Nano 2021, 15, 10384-10392.
Zhang, P.; An, Z.; He, J.; Sheng, W.; Wang, L.; Tao, L.; Zhou, B. Fast and reversible phase transition in hydrochromic lanthanide metal-organic frameworks towards sweat pores mapping and identification. J. Lumin. 2022, 244, No. 118735.
Fang, S.; Zhou, B.; Li, H.; Hu, H.; Zhong, H.; Li, H.; Shi, Y. Highly Reversible Moisture-Induced Bright Self-Trapped Exciton Emissions in a Copper-Based Organic-Inorganic Hybrid Metal Halide. Adv. Opt. Mater. 2022, 10, 2200605.
Zhang, F.; Liang, W.; Wang, L.; Ma, Z.; Ji, X.; Wang, M.; Wang, Y.; Chen, X.; Wu, D.; Li, X.; Zhang, Y.; Shan, C.; Shi, Z. Moisture-Induced Reversible Phase Conversion of Cesium Copper Iodine Nanocrystals Enables Advanced Anti-Counterfeiting. Adv. Funct. Mater. 2021, 31, 2105771.
Majher, J. D.; Gray, M. B.; Liu, T.; Holzapfel, N. P.; Woodward, P. M. Rb3InCl6: A Monoclinic Double Perovskite Derivative with Bright Sb3+-Activated Photoluminescence. Inorg. Chem. 2020, 59, 14478-14485.
Zhou, L.; Liao, J. F.; Huang, Z. G.; Wei, J. H.; Wang, X. D.; Li, W. G.; Chen, H. Y.; Kuang, D. B.; Su, C. Y. A Highly Red-Emissive Lead-Free Indium-Based Perovskite Single Crystal for Sensitive Water Detection. Angew. Chem., Int. Ed. 2019, 131, 5331-5335.
Senthamizhan, A.; Fragouli, D.; Balusamy, B.; Patil, B.; Palei, M.; Sabella, S.; Uyar, T.; Athanassiou, A. Hydrochromic carbon dots as smart sensors for water sensing in organic solvents. Nanoscale Adv. 2019, 1, 4258-4267.
Wu, Z.; Du, B.; Tong, G.; Zhang, H.; Zhang, Y.; Xia, J.; Zhao, Z. Highly luminescent and stable inorganic perovskite micro-nanocomposites for crucial information encryption and decryption. Chem. Eng. J. 2022, 428, No. 131016.
Gong, Z.; Zheng, W.; Huang, P.; Cheng, X.; Zhang, W.; Zhang, M.; Han, S.; Chen, X. Highly efficient Sb3+ emitters in 0D cesium indium chloride nanocrystals with switchable photoluminescence through water-triggered structural transformation. Nano Today 2022, 44, No. 101460.
Feng, J.; Wang, J.; Wang, D.; Han, M.; Qian, G.; Wu, F.; Lin, Q.; Hu, Z. Reversible Phase Transitions of all Inorganic Copper-Based Perovskites: Water-Triggered Fluorochromism for Advanced Anticounterfeiting Applications. ACS Appl. Electron. Mater. 2022, 4, 225-232.
Yu, X.; Wu, L.; Yang, D.; Cao, M.; Fan, X.; Lin, H.; Zhong, Q.; Xu, Y.; Zhang, Q. Hydrochromic CsPbBr3 Nanocrystals for Anti-Counterfeiting. Angew. Chem., Int. Ed. 2020, 59, 14527-14532.

* cited by examiner

| Compound | *a*(Å) | *b*(Å) | *c*(Å) | *α*(°) | *β*(°) | *γ*(°) |
| --- | --- | --- | --- | --- | --- | --- |
| $Cs_3TbF_6$ | 7.182 | 7.182 | 10.177 | 90 | 90 | 90 |
| $CsTb_2F_7$ | 6.038 | 10.865 | 11.838 | 90 | 90 | 90 |

Fig. 2

| Sample | $Tb^{3+}$ (mg/L) | $Eu^{3+}$ (mg/L) | $Tb^{3+}$ (mol%) | $Eu^{3+}$ (mol%) |
|---|---|---|---|---|
| #1 | 8.0378 | 0.0738 | 99.03 | 0.97 |
| #2 | 8.6796 | 0.0759 | 99.04 | 0.96 |
| #3 | 7.0561 | 0.0622 | 99.03 | 0.97 |

Fig. 5

| Materials | | | Response time | Reference |
|---|---|---|---|---|
| Inorganic | Perovskite | $Cs_3Cu_2I_5$ | 20-70 s | *Adv. Funct. Mater.* ***2021****, 31, 2105771* |
| | | $CsPbBr_3$@MSNs | 5-15 s | *Angew. Chem., Int. Ed.* ***2020****, 59, 14527~14532* |
| | | $Cd^{2+}$:$CsPbBr_3$@MSNs | 10-40 s | *Chem. Eng. J.* ***2022****, 428, 131066* |
| | | $Cs_2InBr_5 \cdot H_2O$ | 10-40 s | *Angew. Chem., Int. Ed.* ***2019****, 58 (16), 5277~5281* |
| | | $Cs_3InCl_6$:$Sb^{3+}$ | 10 mins | *Nano Today* ***2022****, 44, 101460* |
| | Carbon dots | | 10-40 s | *Nanoscale Adv.* ***2019****, 1 (11), 4258~4267* |
| Organic | | Donor-acceptor Stenhouse adducts (DASAs) | Hours | *ACS Nano* ***2021****, 15, 10384~10392* |
| | | DASAs and oxazolidines (OXs) | Days | *ACS Appl. Mater. Interfaces* ***2020****, 12, 8952~8960* |
| | | Poly(PCDA-Cs) | 20 μs | *Nat. Commun.* ***2014****, 5, 3736* |
| | | Diacetylene (DA) | 3-10 s | *Adv. Funct. Mater.* ***2016****, 26, 498~506* |
| | | Coordination polymers (CPs) | 24 h | *Cryst. Growth Des.* ***2015****, 15, 3182~3189* |
| | | Organic dyes (oxazolidines, oxazines and spiropyrans) | 22 h | *Nat. Commun.* ***2014****, 5, 3044* |
| | | Yb/Tb/Eu-BTC | 3 mins | *J. Lumin.* ***2022****, 244, 118735* |
| $Cs_3TbF_6$:$Eu^{3+}$ | | | 20 ms | **This work** |

Fig. 20

HYDROCHROMIC HALIDE PEROVSKITE, ITS PREPARATION AND USE THE SAME

TECHNICAL FIELD

The present invention relates to a hydrochromic halide perovskite for example particularly, but not exclusively, a hydrochromic halide perovskite comprising a $Cs_xTb_yF_z$ halide perovskite doped with a lanthanide ion dopant; and a method for preparing the same. Also pertaining to the present invention is a printable printed pattern comprising a film of the hydrochromic halide perovskite.

BACKGROUND OF THE INVENTION

Water is one of the most common stimuli in the natural environment, featuring ecological friendliness, economy, and simplicity. Consequently, hydrochromic materials have intrigued special attention compared with other stimulus-responsive systems, such as mechanochromics, photochromics, thermochromics, and solvatochromics.

Typical examples of hydrochromic materials may include π-conjugated polydiacetylenes (PDAs), inorganic crystals such as some specialized carbon dots (CDs), and metal halide perovskites such as $CsPbX_3$ (X=Cl, Br, and I). However, it is noted that each of these typical materials may suffer from one or more of the following shortcomings such as: slow response rate to water (such as by dozens of seconds), limited transformation reversibility, stringently controlled structure for achieving hydrochromic luminescence, limited optical tunability, instability under ambient conditions, use of toxic lead ions, inherent colors with unadjustable optical features, etc. Thus, it is believed that the development of a hydrochromic material with improved optical tunability and hydrochromic performance remains a challenge.

The invention seeks to eliminate or at least to mitigate such shortcomings by providing a new or otherwise improved hydrochromic material, in particular, a hydrochromic halide perovskite (such as the one with B site comprising $Tb^{3+}$ ion) doped with a lanthanide ion dopant, which is capable of water-induced reversible phase transformation between pristine state and wet state, and exhibits reversible change in optical emission under ultraviolet excitation.

SUMMARY OF THE INVENTION

In a first aspect of the present invention, there is provided a hydrochromic halide perovskite comprising a $Cs_xTb_yF_z$ halide perovskite doped with a lanthanide ion dopant, which is capable of water-induced reversible phase transformation between pristine state and wet state, and exhibits reversible change in optical emission under ultraviolet excitation. In an optional embodiment, the lanthanide ion dopant comprises $Eu^{3+}$, in the pristine state, x is 3, y is 1 and z is 6, and in the wet state, x is 1, y is 2 and z is 7.

Optionally, the optical emission of $Cs_3TbF_6$ doped with $Eu^{3+}$ can be controlled by changing the wavelength of the ultraviolet during the ultraviolet excitation. It is optional that the wavelength is selected from any one of between about 365 nm to about 395 nm.

Optionally, the optical emission of $Cs_3TbF_6$ doped with $Eu^{3+}$ under UV excitation at specific wavelength is changeable by adjusting concentration of the $Eu^{3+}$ dopant.

In an embodiment of the invention, the halide perovskite is reversibly transformable between a zero-dimensional structure of $Cs_3TbF_6$ at the pristine state and a one-dimensional structure of $CsTb_2F_7$ in the wet state.

It is optional that the optical emission of $Cs_3TbF_6$ doped with $Eu^{3+}$ under the UV excitation at about 365 nm is changeable from green to orange by adjusting concentration of the $Eu^{3+}$ dopant when the $Cs_3TbF_6$ doped with $Eu^{3+}$ is in the pristine state.

It is also optional that the optical emission of $Cs_3TbF_6$ doped with $Eu^{3+}$ under UV excitation at about 393 nm is changeable from non-fluorescent to pink by adjusting concentration of the $Eu^{3+}$ dopant when the $Cs_3TbF_6$ doped with $Eu^{3+}$ is in the pristine state.

In an optional embodiment, the $Cs_xTb_yF_z$ is co-doped with the lanthanide ion dopant and a rare earth metal ion, optical emission wavelength of a co-doped lanthanide-based halide perovskite is changeable by adjusting relative concentration of the lanthanide ion dopant and rare earth metal ion dopant. Optionally, x is 1 or 3, y is 1 or 2 and z is 6 or 7 and the lanthanide ion dopant comprises $Eu^{3+}$ and the rare earth metal ion comprises $Y^{3+}$, the optical emission under UV excitation is changeable by adjusting concentration of the $Eu^{3+}$ and $Y^{3+}$ dopants. It is optional that the concentration of the $Eu^{3+}$ dopant is adjustable between 1 mol % and 30 mol % and the concentration of the $Y^{3+}$ dopant is adjustable between 0 mol % and 70 mol %.

In an embodiment of the invention, the optical emission of $CsTb_2F_7$ doped with $Eu^{3+}$ and $Y^{3+}$ ions under UV excitation at about 365 nm is changeable from orange to green by adjusting concentration of the $Eu^{3+}$ and $Y^{3+}$ dopants.

It is optional that the transformation from the zero-dimensional structure to the one-dimensional structure reaches 90% in a response time of about 20 ms.

In an optional embodiment, the response time is changeable by adjusting water absorption ability of the $Eu^{3+}$ doped $Cs_xTb_yF_z$. Optionally, the water absorption ability of the $Eu^{3+}$ doped $Cs_xTb_yF_z$ is adjustable by partly forming Rb-alloyed $Cs_3TbF_6$:$Eu^{3+}$.

In a second aspect of the present invention, there is provided a printed pattern comprising a film of hydrochromic halide perovskite in accordance with the first aspect. Optionally, the film comprises at least first and second layers, the first layer comprises $Cs_xTb_yF_z$ doped with $Eu^{3+}$ ion. It is optional that the second layer comprises $Cs_xTb_yF_z$ doped with $Eu^{3+}$ and $Y^{3+}$ ions or $Cs_3TbF_6$.

In a third aspect of the present invention, there is provided a method for preparing the hydrochromic halide perovskite in accordance with the first aspect, comprising the steps of: providing a mixture comprising a Cs source, a Tb source, a F source, and a lanthanide source; and annealing the mixture at an elevated temperature for a predetermined time.

Optionally, the method further comprises a step of grinding the mixture prior to annealing.

In an optional embodiment, the mixture comprises stoichiometric amount of $CsCO_3$, $TbF_3$, $NH_4F$, and $EuF_3$. Optionally, molar ratio of Cs:Tb:F:Eu in the mixture is from about 3:0.99:6:0.01 to about 3:0.7:6:0.3.

In an optional embodiment, the mixture further comprises $YF_3$. It is optional that molar ratio of Cs:Tb:F:Eu:Y in the mixture is from about 3:0.89:6:0.01:0.1 to about 3:0.29:6:0.01:0.7.

In an optional embodiment, the mixture further comprises $Rb_2CO_3$. It is optional that molar ratio of Cs:Rb:Tb:F:Eu in the mixture is from about 2.4:0.6:0.99:6:0.01 to about 0:3:0.99:6:0.01.

Optionally, the annealing is performed at about 150° C. to about 500° C. for about 2 h.

BRIEF DESCRIPTION OF DRAWINGS

The patent or application file contains at least one drawing executed in color. Copies of this patent or patent application publication with color drawing(s) will be provided by the Office upon request and payment of the necessary fee.

The invention will now be more particularly described, by way of example only, with reference to the accompanying drawings, in which:

FIG. 2 is a table summarizing the lattice parameters of $Cs_3TbF_6$ and $CsTb_2F_7$ crystal structure obtained by Density Functional Theory (DFT) calculations;

FIG. 5 is a table summarizing inductively coupled plasma-optical emission spectroscopy (ICP-OES) results of $Cs_3TbF_6$:$Eu^{3+}$ (1%) crystals

FIG. 20 is a table summarizing the comparison of hydrochromic response time between different materials;

DETAILED DESCRIPTION OF OPTIONAL EMBODIMENT

As used herein, the forms "a", "an", and "the" are intended to include the singular and plural forms unless the context clearly indicates otherwise.

The words "example" or "exemplary" used in this invention are intended to serve as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Without intending to be limited by theory, the inventors have, through their own research, trials, and experiments, devised a hydrochromic material comprising a halide perovskite, particularly a halide perovskite with a lanthanide ion dopant, that can provide fine-tuning of optical properties such as hydrochromism response time, hydrochromic emission colors, etc. by controlling the dopant composition and/or concentration. The hydrochromic material is devised by employing a $Cs_xTb_yF_z$ halide perovskite doped with a lanthanide ion dopant, which is capable of water-induced reversible phase transformation between pristine state and wet state, leading to a reversible change in optical emission under ultraviolet excitation.

According to the present invention, there is provided a hydrochromic halide perovskite comprising a $Cs_xTb_yF_z$ halide perovskite doped with a lanthanide ion dopant, which is capable of water-induced reversible phase transformation between pristine state and wet state, and exhibits reversible change in optical emission under ultraviolet excitation.

Figure 1A:
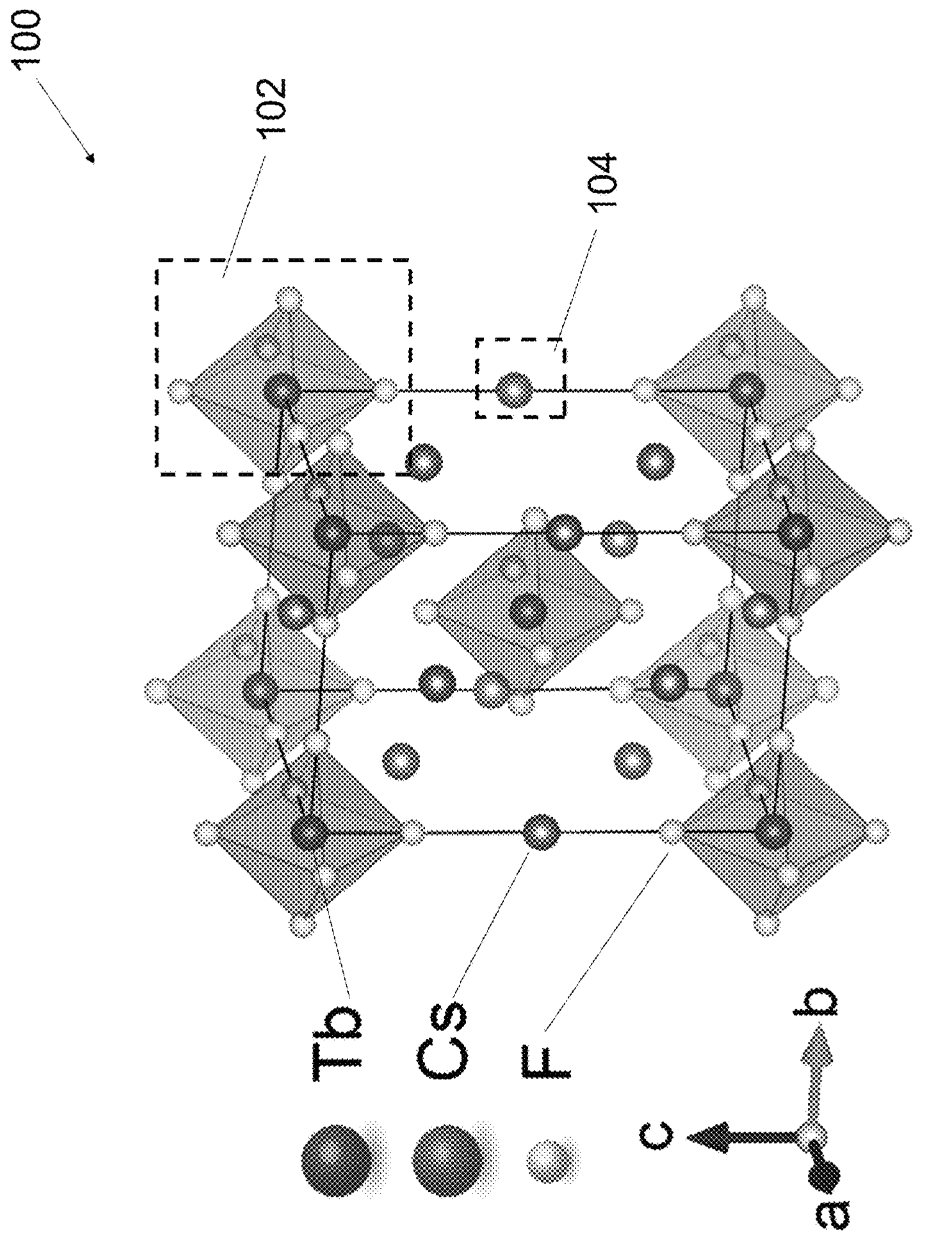
FIG. 1A is a schematic diagram illustrating the crystal structure of $Cs_3TbF_6$ in accordance with an embodiment of the present invention.

The lanthanide-doped $Cs_xTb_yF_z$ halide perovskite may have a pure phase with high crystallinity. In an example embodiment, where the lanthanide ion dopant comprises $Eu^{3+}$, x is 3, y is 1 and z is 6, i.e., the $Cs_xTb_yF_z$ halide perovskite is in its pristine state, it may have a lattice structure 100 as exemplified in FIG. 1A. As shown, the pristine lanthanide-doped $Cs_3TbF_6$ (i.e., $Cs_3TbF_6:Eu^{3+}$) has a body-centered tetragonal (BCT) lattice structure, with a space group of I4/mmm. In this rutile-type perovskite structure, $[TbF_6]^{3-}$ octahedral 102 and vacancies are alternately arranged and separated by $Cs^+$ ions 104, suggesting a zero-dimensional (0D) perovskite structure of $Cs_3TbF_6:Eu^{3+}$.

In particular, the optical emission of $Cs_3TbF_6:Eu^{3+}$ ($Cs_3TbF_6$ doped with $Eu^{3+}$) may be controlled by changing the wavelength of the ultraviolet during ultraviolet excitation, particularly with an excitation wavelength selected from any one of between about 365 nm to about 395 nm. For example, upon an UV excitation of about 365 nm to about 377 nm, the $Cs_3TbF_6:Eu^{3+}$ may emit a green emission whereas when the UV excitation is changed to about 393 nm to about 395 nm, the $Cs_3TbF_6:Eu^{3+}$ may emit a red (or pink) emission instead.

In addition to be controlled by changing the wavelength of the ultraviolet during the ultraviolet excitation, it is found that, optionally, the optical emission of pristine $Cs_3TbF_6$ doped with $Eu^{3+}$ under UV excitation at specific wavelength may be changeable by adjusting concentration of the $Eu^{3+}$ dopant. For example, in an embodiment where $Cs_3TbF_6$ is doped with 1% $Eu^{3+}$ ($Cs_3TbF_6$:$Eu^{3+}$ (1%)), upon photoexcitation at about 365 nm to about 377 nm, it may emit a green emission. On the other hand, when the concentration of the $Eu^{3+}$ dopant increases, such as from about 1% to about 30%, the emission color of $Cs_3TbF_6$:$Eu^{3+}$ may be changed from green to orange under the same photoexcitation wavelength(s).

Optionally or additionally, when the pristine $Cs_3TbF_6$ doped with $Eu^{3+}$ is excited at about 393 nm, the optical emission thereof may be changeable by adjusting concentration of the $Eu^{3+}$ dopant as well. In an example embodiment, the optical emission of the pristine $Cs_3TbF_6$ doped with $Eu^{3+}$ under an excitation of about 393 nm may be changeable from non-fluorescent to pink upon increasing the $Eu^{3+}$ concentration from 0 mol % to 30 mol %.

Figure 1B:
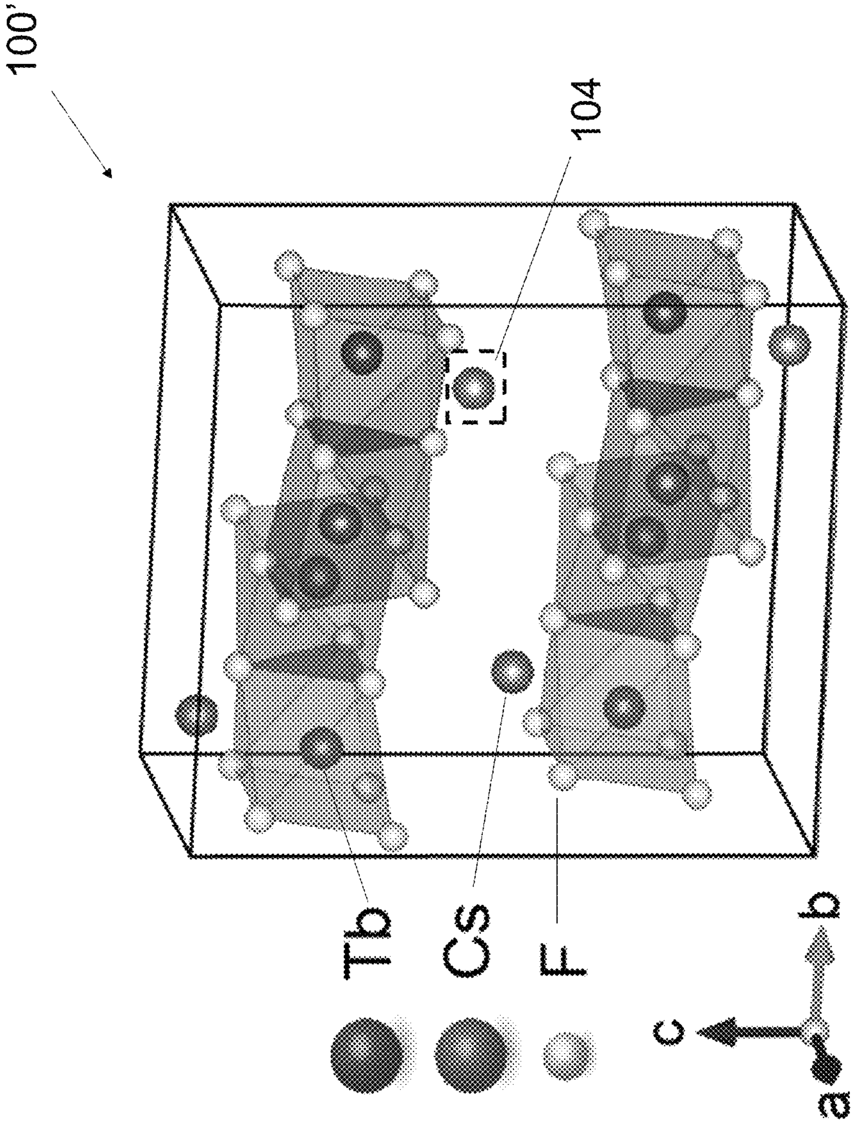
FIG. 1B is a schematic diagram illustrating the crystal structure of $CsTb_2F_7$ in accordance with an embodiment of the present invention.

As mentioned, the lanthanide-doped $Cs_xTb_yF_z$ halide perovskite of the present invention is capable of water-induced reversible phase transformation between pristine state and wet state. For example, in an embodiment where the lanthanide-doped $Cs_xTb_yF_z$ halide perovskite is $Cs_3TbF_6$:$Eu^{3+}$, it may undergo a reversible phase transformation between a zero-dimensional (0D) (pervoskite) structure of $Cs_3TbF_6$ at the pristine state and a one-dimensional (1D) (non-perovskite) structure of $CsTb_2F_7$:$Eu^{3+}$ in the wet state, which may have an orthorhomic lattice structure 100' as shown in FIG. 1B. In particular, it is believed that such transformation is ascribed to a Cs—F stripping process as a result of the high solubility of CsF in water. When water molecules are removed from the bulk system, the (initial) 0D structure of $Cs_3TbF_6$:$Eu^{3+}$ may be recovered from the 1D structure of $CsTb_2F_7$:$Eu^{3+}$. In an example embodiment, the $Cs_3TbF_6$:$Eu^{3+}$ may remain intact after subjecting to at least 20 wetting-drying cycles.

Preferably, such a reversible phase transformation may accompany with a change of optical emission properties of the halide perovskite in wet state as compared with that in the pristine state upon photoexcitation, particularly the optical emission (color or wavelength) of the wet halide perovskite may become independent from the excitation wavelength as compared with the pristine halide perovskite. For example, referring again to FIG. 1B which shows the orthorhombic lattice structure of 1D structure of $CsTb_2F_7$:$Eu^{3+}$ (i.e., $Cs_3TbF_6$:$Eu^{3+}$ in wet state), upon phase transformation, it may activate the coupling of neighboring polyhedral units due to the contraction of the lanthanide sublattice. As such, it may lead to luminescence processes that are essentially independent from the excitation wavelength, which is in contrast to the pristine $Cs_3TbF_6$:$Eu^{3+}$. In a particular example embodiment, the emission spectra of $CsTb_2F_7$:$Eu^{3+}$ may be dominated by $Eu^{3+}$ peaks under both about 377 nm and about 393 nm excitation.

Given that the change of luminescence of pristine $Cs_3TbF_6$:$Eu^{3+}$ from excitation wavelength-dependent to excitation wavelength-independent when it is transformed into wet state (i.e., $CsTb_2F_7$:$Eu^{3+}$), it is appreciated that the luminescence switching in the lanthanide-doped $Cs_xTb_yF_z$, particularly $Cs_3TbF_6$ may be controlled by interaction of individual polyhedrons, and therefore the hydrochromic behavior may be tuned by modulating the interpolyhedral energy transfer through supplementary doping such as co-doping one or more of an additional lanthanide ion or rare earth metal ion.

In an embodiment, the $Cs_xTb_yF_z$ (such as with x being 1 or 3, y being 1 or 2 and z being 6 or 7) may be co-doped with a lanthanide ion dopant such as $Eu^{3+}$ and a rare earth metal ion such as $Y^{3+}$. The optical emission wavelength of such co-doped lanthanide-based halide perovskite, particularly under UV excitation, may be changeable by adjusting relative concentration of the lanthanide ion dopant and rare earth metal ion dopant. In particular, it is believed that upon incorporating the $Y^{3+}$ ion into the host lattice (i.e., $Cs_xTb_yF_z$), the phase transformation of the $Cs_xTb_yF_z$ as described herein would no longer bring the $Tb^{3+}$ and $Eu^{3+}$ into close proximity, thus the energy transfer therebetween would be suppressed, affecting the hydrochromic switching process.

As a specific embodiment, the halide perovskite $Cs_xTb_yF_z$ may be $Cs_3TbF_6$ co-doped with $Eu^{3+}$ and $Y^{3+}$ in the pristine state (i.e., $Cs_3TbF_6$:$Eu^{3+}$/$Y^{3+}$) and $CsTb_2F_7$:$Eu^{3+}$/$Y^{3+}$ in the wet state. The doping concentration of the $Eu^{3+}$ dopant may be adjustable between 1 mol % and 30 mol % whereas the concentration of the $Y^{3+}$ dopant may be adjustable between 0 mol % and 70 mol %.

In an example embodiment, the pristine $Cs_3TbF_6$ may be doped with 1% $Eu^{3+}$ and with a gradual increasing concentration of $Y^{3+}$, such as 10 mol %, 20 mol %, 30 mol %, 40 mol %, 50 mol %, 60 mol %, 70 mol % and the like. Upon absorption of water, the pristine $Cs_3TbF_6$:$Eu^{3+}$/$Y^{3+}$ (1%/10-70%) may undergo a reversible phase transformation as described herein to form the wet $Cs_3TbF_6$:$Eu^{3+}$/$Y^{3+}$ (1%/10-70%) (i.e., $CsTb_2F_7$:$Eu^{3+}$/$Y^{3+}$ (1%/10-70%)). Under UV excitation at about 365 nm to about 377 nm, $CsTb_2F_7$:$Eu^{3+}$/$Y^{3+}$ (1%/10-70%) may have a change of optical emission from orange to green with the increase of co-doped $Y^{3+}$ concentrations.

As described herein, the conversion of the pristine $Cs_xTb_yF_z$ such as $Cs_3TbF_6$:$Eu^{3+}$ to the wet $Cs_xTb_yF_z$ such as $CsTb_2F_7$:$Eu^{3+}$ involves a reversible phase transformation of the zero-dimensional structure to the one-dimensional structure, which is believed to be a result of a CsF stripping process. In an embodiment, it is found that such reversible phase transformation may reach 90% in a response time of about 20 ms. Advantageously, it is believed that such a rapid hydrochromic response has never been observed in any other reported inorganic counterparts. Details will be discussed in the later part of the present disclosure.

In particular, it is devised that the response time may be changeable by adjusting water absorption ability of the $Eu^{3+}$ doped $Cs_xTb_yF_z$, such as by way of partly forming Rb-alloyed $Cs_3TbF_6$:$Eu^{3+}$. The phrase "alloyed" is intended to distinguish from the phrase "doped" as used herein even though both of which are directed to an intended addition of external metal ion into the (host/base) crystal lattice structure. In particular, it is appreciated that the phrase "alloyed" may involve a high-degree substitution (such as up to 100%) of lattice sites such as A-site and/or B-site cation(s) by isovalent dopant, and may be intended to modify the chemical and/or structural features of the host/base crystals. In contrast, it is appreciated that while the phrase "doped" also involves replacement of host cations by guest cations, the dopant ion may be incorporated into lattice sties and/or interstitial sites, and it may be primarily intended to modify the electronic properties of the host/base material.

For example, in the embodiments, the hydrochromic halide perovskite $Cs_3TbF_6$:$Eu^{3+}$ (1%) may be alloyed with about 20 mol % to about 100 mol % of Rb ion, forming a series of Rb-alloyed $Cs_3TbF_6$:$Eu^{3+}$. That said, upon alloying with Rb ion, the A-site cation, i.e. $Cs^+$ ion may be partially substituted with the Rb ion, forming a series of $Cs_{3-}$ $_x$Rb$_x$TbF$_6$:Eu$^{3+}$ (1%), with x being 0.6, 1.2, 1.8, 2.4, or 3. In particular, the Rb-alloyed $Cs_3TbF_6$:Eu$^{3+}$ in the embodiments may have a hydrochromic response time extended from about millisecond scale to about second scale upon increasing the alloyed Rb concentrations, which may be attributed to the production of less water-soluble (as compared with CsF) RbF, leading to a substantially reduced water absorption.

Based on the above, it is believed that the tunable/adjustable optical emission of the hydrochromic halide perovskite of the present invention may be applicable to information encryption. Thus, according to another aspect of the invention, there is provided a printable printed pattern comprising a film of hydrochromic halide perovskite as described herein. In particular, the film may comprise at least first and second layers and each of which may be printed with a portion of a desired pattern, which, when overlaid, a completed (desired) printed pattern would be observed when viewed on top of the film. Preferably, each layer may comprise a halide perovskite $Cs_xTb_yF_z$ with different lanthanide ion dopant and/or rare earth metal ion dopant concentrations, such that the desired pattern may be extracted/observed/recognized by using a particular combination of excitation wavelength and/or stimulus conditions.

For example, in an embodiment, the first layer may comprise $Cs_xTb_yF_z$ doped with $Eu^{3+}$ ion such as $Cs_3TbF_6$:$Eu^{3+}$ (1%-5%), whereas the second layer may comprise $Cs_xTb_yF_z$ doped with $Eu^{3+}$ and $Y^{3+}$ ions such as $Cs_3TbF_6$:$Eu^{3+}$/$Y^{3+}$ (1%/40%-70%) or $Cs_3TbF_6$. The desired pattern may only be observed when a specific combination of excitation wavelength and/or stimulus conditions. In an example embodiment, the desired pattern may only be recognizable under simultaneous UV excitation and water stimulus, but being concealed upon evaporation of water. Detailed examples of employing the hydrochromic halide perovskite as described herein for information encryption will be discussed in the later part of the present disclosure.

Optionally or additionally, the film of hydrochromic halide perovskite as described herein may be prepared by any suitable techniques in the art. For example, the film may be prepared spin-coating, spray-coating, brushing, 3D printing and the like the pattern with the hydrochromic halide perovskite as described herein onto a transparent film substrate.

Further pertaining to the present invention is a method for preparing the hydrochromic halide perovskite as described herein. In the embodiments of the present invention, the method may involve a solid-state reaction. In particular, the method may comprise the steps of: providing a mixture comprising a Cs source, a Tb source, a F source, and a lanthanide source; and annealing the mixture at an elevated temperature for a predetermined time.

In an embodiment, the mixture may comprise a stoichiometric amount of $CsCO_3$, $TbF_3$, $NH_4F$, and $EuF_3$. For example, the molar ratio of Cs:Tb:F:Eu in the mixture is from about 3:0.99:6:0.01 to about 3:0.7:6:0.3. In an optional embodiment, the mixture may further comprise a rare earth metal ion source such as $YF_3$. In this embodiment, the molar ratio of Cs:Tb:F:Eu:Y in the mixture may be from about 3:0.89:6:0.01:0.1 to about 3:0.29:6:0.01:0.7. In another optional embodiment, the mixture may further comprise an alkali metal ion source such as $Rb_2CO_3$. In this embodiment, the molar ratio of Cs:Rb:Tb:Eu in the mixture may be from about 2.4:0.6:0.99:6:0.01 to about 0:3:0.99:6:0.01.

Preferably, the mixture in the above embodiments may be subjected to a step of grinding prior to the annealing step, such that the raw materials (i.e., $CsCO_3$, $TbF_3$, $NH_4F$, $EuF_3$, $YF_3$, and/or $Rb_2CO_3$) may be uniformly mixed. In particular, the grinding may be performed by way of grinding the raw materials in an agate mortar, ball milling and the like.

After grinding, the mixture may be transferred into a container such as an alumina crucible for annealing. In particular, the annealing step may be performed at a temperature range from about 150° C. to about 500° C. for, e.g., 2 h in a muffle furnace. At this stage, the hydrochromic halide perovskite as described herein would be obtained upon cooling to, for example, room temperature.

Optionally or additionally, it is appreciated that a skilled person may further perform any purification step such as by way of washing the as-prepared hydrochromic halide perovskite with a suitable solvent, and/or may further perform a grinding step to grind the as-prepared hydrochromic halide perovskite into powders according to the practical needs.

Hereinafter, the present invention is described more specifically by way of examples, but the present invention is not limited thereto.

EXAMPLES

Reagents

Cesium carbonate ($Cs_2CO_3$, 99.9%), rubidium carbonate ($Rb_2CO_3$, 99.9%), terbium(III) fluoride ($TbF_3$, 99.9%), europium(III) fluoride ($EuF_3$, 99.9%), and yttrium(III) fluoride ($YF_3$, 99.9%) were purchased from Shanghai Macklin Biochemical Co., Ltd. Ammonium fluoride ($NH_4F$) was purchased from Sigma-Aldrich. All reagents were used as received without further purification.

Methods and Characterization

Stimulation of Standard XRD Pattern

The optimized lattice parameters were obtained by using geometric optimization in the Vienna Ab initio Simulation Package (VASP) code and plotted by VESTA.

Simulation of Electronic and Optical Properties

First-principles calculations involving band structure, electron density of states (DOS), and isosurface charge densities were carried out within the plane-wave DFT combined with the projector-augmented wave method, as implemented in the VASP code. We employed the Perdew-Burke-Ernzerhof function with U values of 3.26 eV for $Tb^{3+}$ and 6 eV for $Eu^{3+}$ of the DFT+U method in the geometry optimization and electronic structure calculations. The $5s^25p^66s^1$ of Cs, $2s^22p^5$ of F, $5s^26s^25p^65d^04f^9$ of Tb, and $5s^26s^25p^65d^04f^7$ of Eu were treated as valence electrons. The cutoff energy of the plane wave was set as 500 eV throughout the simulation, and the 2×2×2 k-point mesh in the Brillouin zone was employed. The structure was optimized until the force between each atom was smaller than 0.01 eV/A. The simulated band structure and DOS of $Eu^3$-doped $Cs_3TbF_6$ and $CsTb_2F_7$ crystals were analyzed using the VASPKIT code. The VESTA package was used to plot crystal structures and charge density isosurfaces. The lattice parameters of the $Cs_3TbF_6$ and $CsTb_2F_7$ crystal structures obtained by DFT calculation are shown in FIG. 2.

Formation Energy Calculation

The formation energy (Ef) was calculated by first-principles calculations implemented in the VASP code. The exchange-correlation function was treated by generalized-gradient-approximation (GGA) with the Perdew-Burke-Ernzerhof (PBE) function. For the $Cs_3TbF_6$ and $CsTb_2F_7$ phases, the formation energies were seen by the functions of $E_{f_1}=E_{Cs_3TbF_6}-3E_{CsF}-E_{TbF}$ and $E_{f_2}=E_{CsTb_2F_7}-E_{CsF}-2E_{TbF_3}$, respectively.

Physical Measurement

RD patterns were recorded on a Bruker D2 phaser X-ray diffractometer using Cu $K_\alpha$ radiation with $\lambda$=1.5406 Å. SEM and EDAX measurements were carried out on a Quattro S environmental scanning electron microscope (Thermo Fisher). The photoluminescence spectra were acquired from an F-4600 spectrophotometer (Hitachi) equipped with an R928 photo-multiplier (PMT). Decay curves were recorded on an FLS980 fluorescence spectrophotometer (Edinburgh Instruments). ICP-OES was conducted on a PE optima 6000. Thermogravimetric (TG) curves were recorded on a dynamic mechanical analyzer (TA Instruments Q800). The time-dependent photoluminescence spectra were recorded on a Maya 2000 Pro high-resolution spectrometer (Ocean Insight).

Reversibility Test

The as-synthesized powder crystals (about 70 mg) were transferred to a Petri dish in a constant temperature and humidity box (25° C., 70% RH). The sample was allowed to take natural moisture absorption for 22 h, followed by drying at 80° C. for 2 h as a cycle. The weight and emission spectrum were recorded by an electronic balance and a Maya 2000 Pro high-resolution spectrometer (Ocean Insight), respectively.

Example 1A

Synthesis of $Cs_3TbF_6$ Crystals 3 mmol of $Cs_2CO_3$, 2 mmol of $TbF_3$, and 6 mmol of $NH_4F$ were mixed in an agate mortar with 2 mL of acetone. After grinding, the mixture was transferred into alumina crucibles and heated to 300° C. for 2 h in a muffle furnace. The final product was obtained by cooling down to room temperature.

Example 1B

Synthesis of $Cs_3TbF_6:Eu^{3+}$ (1%) Crystals 3 mmol of $Cs_2CO_3$, 1.98 mmol of $TbF_3$, 0.02 mmol of $EuF_3$, and 6 mmol of $NH_4F$ were mixed in an agate mortar with 2 mL of acetone. After grinding, the mixture was transferred into alumina crucibles and heated to 300° C. for 2 h in a muffle furnace. The final product was obtained by cooling down naturally. All dopant-engineered samples (i.e., $Cs_3TbF_6:Eu^{3+}$ (5, 10, 15, 20, 25, or 30 mol %)) were prepared through a similar process according to the stoichiometric ratio of raw materials.

Example 1C

Synthesis of $CsTb_2F_7:Eu^{3+}$ (1%) Crystals 1 mmol of $Cs_2CO_3$, 3.96 mmol of $TbF_3$, 0.04 mmol of $EuF_3$, and 2 mmol of $NH_4F$ were weighed and mixed in an agate mortar with 1 mL of absolute ethanol. After grinding, the mixtures were transferred into alumina crucibles and heated to 450° C. for 2 h in a muffle furnace. The final product was obtained by cooling down naturally.

Example 1D

Synthesis of $Cs_3TbF_6:Eu^{3+}/Y^{3+}$ (1%/10%) Crystals 3 mmol of $Cs_2CO_3$, 1.78 mmol of $TbF_3$, 0.02 mmol of $EuF_3$, 0.2 mmol $YF_3$, and 6 mmol of $NH_4F$ were mixed in an agate mortar with 2 mL of acetone. After grinding, the mixture was transferred into alumina crucibles and heated to 300° C. for 2 h in a muffle furnace. The final product was obtained by cooling down to room temperature. All dopant-engineered samples (i.e., $Cs_3TbF_6:Eu^{3+}/Y^{3+}$, with % $Y^{3+}$ being 20, 30, 40, 50, 60 or 70%) were prepared through a similar process according to the stoichiometric ratio of raw materials.

Example 1E

Synthesis of $Cs_{3-x}Rb_xTbF_6:Eu^{3+}$ (1%) Crystals, with x being 0.6, 1.2, 1.8, 2.4, or 3

2.4 mmol of $Cs_2CO_3$, 0.6 mmol of $Rb_2CO_3$, 1.98 mmol of $TbF_3$, 0.02 mmol of $EuF_3$, and 6 mmol of $NH_4F$ were mixed in an agate mortar with 2 mL of acetone. After grinding, the mixture was transferred into alumina crucibles and heated to 300° C. for 2 h in a muffle furnace. The final product was obtained by cooling down to room temperature. All dopant-engineered samples (i.e., $Cs_{3-x}Rb_xTbF_6:Eu^{3+}$ (1%), with x being 0.6, 1.2, 1.8, 2.4, or 3) were prepared through a similar process according to the stoichiometric ratio of raw materials.

Example 2

Design Structural Characterization

Figure 3A:
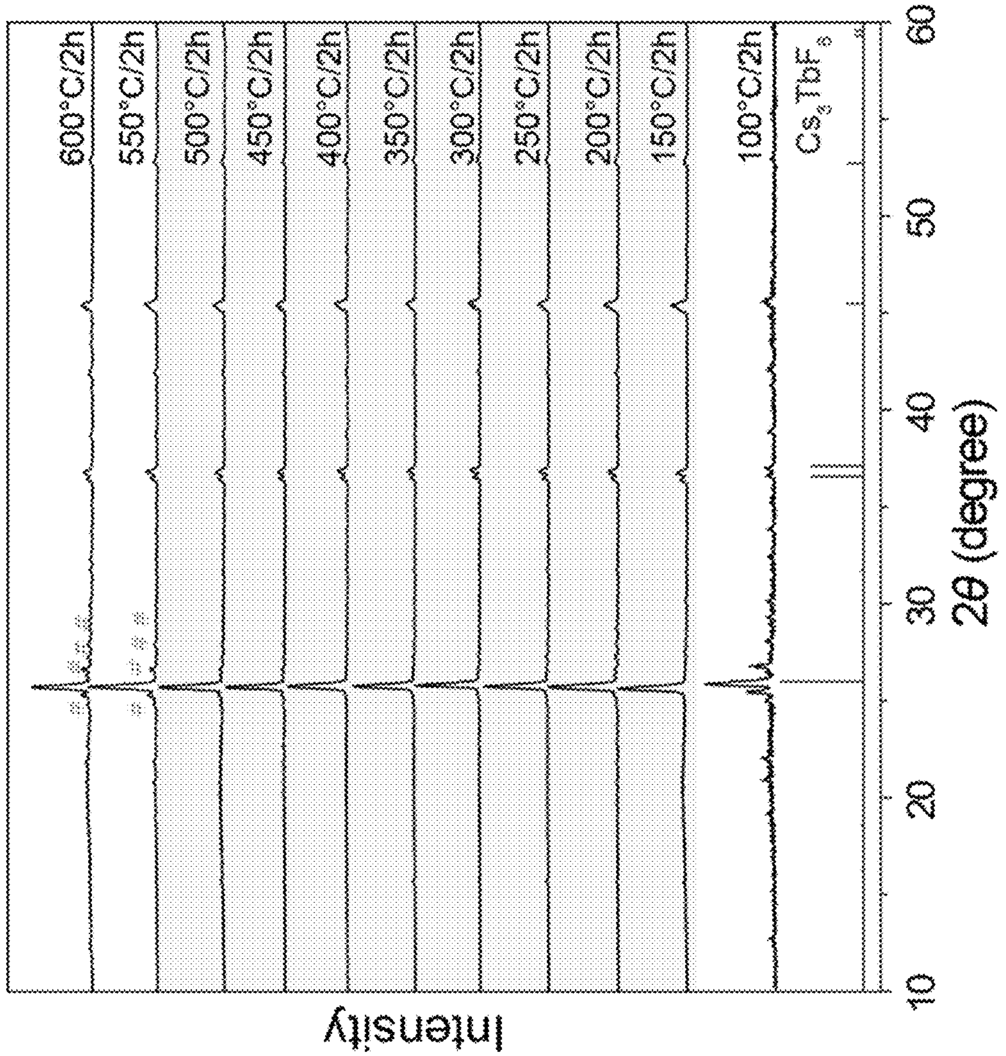
FIG. 3A shows the X-ray diffraction (XRD) patterns of $Cs_3TbF_6$:$Eu^{3+}$ (1%) prepared by heating the starting materials at different temperatures from 100-600° C. for 2 h. The results show that the target product of $Cs_3TbF_6$ crystals started to form at 150° C., and the most suitable synthesis temperature was in the range of 150-500° C.

The luminescence of lanthanide compounds generally stems from intra-configurational electronic transitions within individual lanthanide ions. To permit luminescence switching, a $Cs_3TbF_6:Eu^{3+}$ crystal was designed, which is capable of exhibiting dual emissions due to the host $Tb^{3+}$ and dopant $Eu^{3+}$ ions, respectively. In the example embodiments, $Cs_3TbF_6$ crystals doped with 1% $Eu^{3+}$ were synthesized through a solid-state reaction method. Control experiments revealed an optimal reaction temperature range of 150-500° C. for preparing pure-phase $Cs_3TbF_6$ crystals with high crystallinity (FIG. 3A).

Figure 3B:
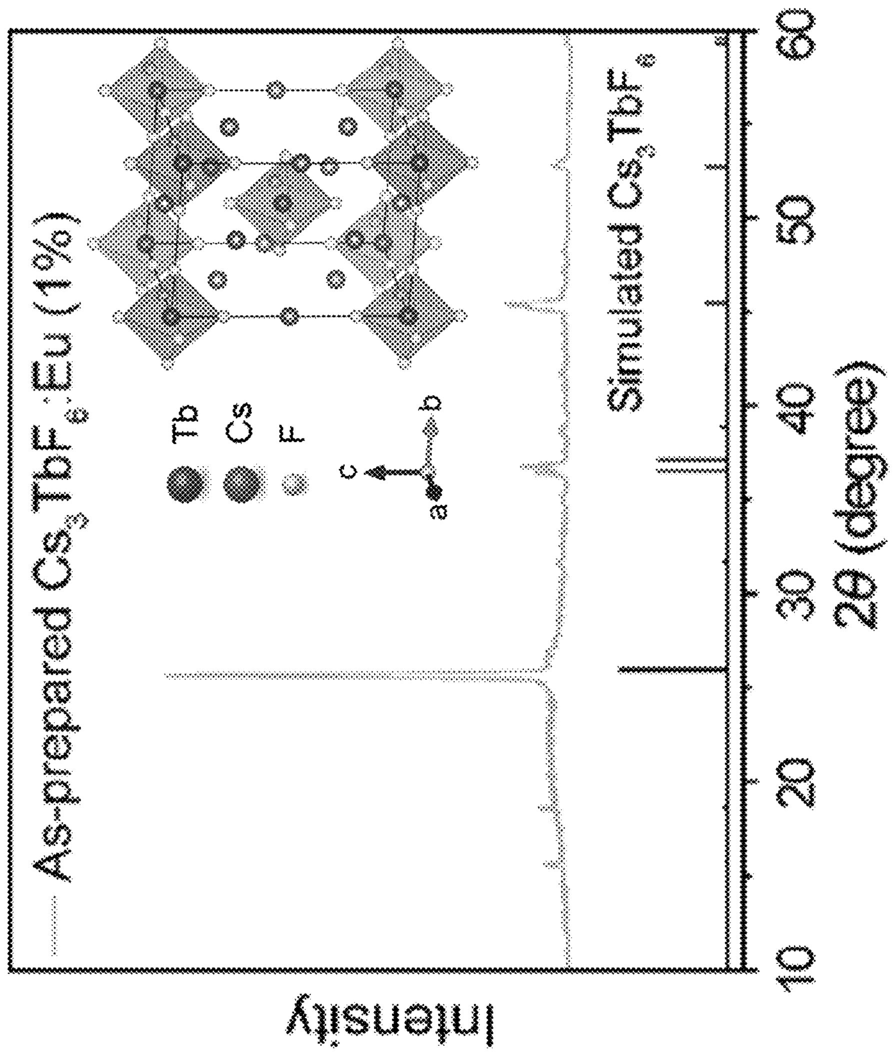
FIG. 3B shows the XRD pattern of the as-synthesized $Cs_3TbF_6$:$Eu^{3+}$ (1%) crystals. The black line spectrum is the simulated result for tetragonal $Cs_3TbF_6$. The inset is the crystal structure diagram of $Cs_3TbF_6$.

The powder X-ray diffraction (XRD) pattern of the as-synthesized crystals is illustrated in FIG. 3B, showing diffraction peaks that can be well indexed in accordance with body-centered tetragonal (BCT) $Cs_3TbF_6$ with a space group of I4/mmm. In this rutile-type perovskite structure, $[TbF_6]^{3-}$ octahedra and vacancies are alternately arranged and separated by $Cs^+$ ions, characterized by a zero-dimensional (0D) perovskite structure (FIG. 3B, inset).

Figure 4A:
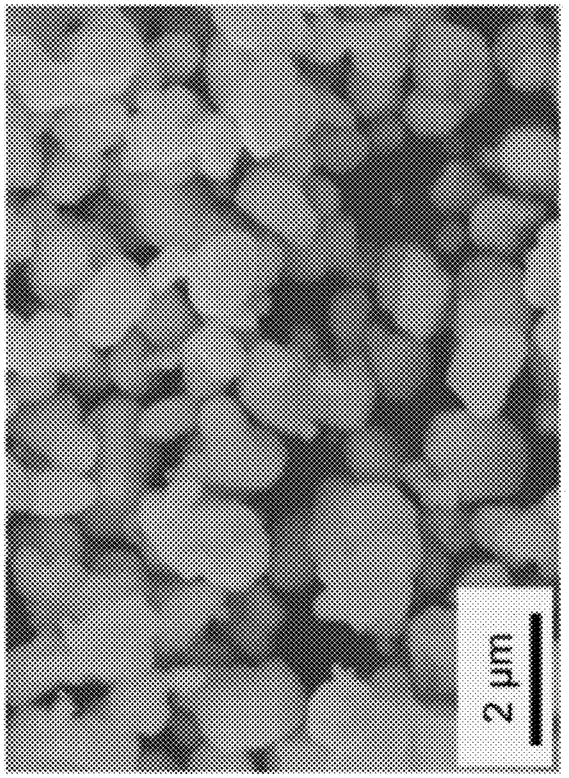
FIG. 4A is a scanning electron microscope (SEM) image of the $Cs_3TbF_6$:$Eu^{3+}$ (5%) crystals, with a magnification scale of 2 μm.
Figure 4B:
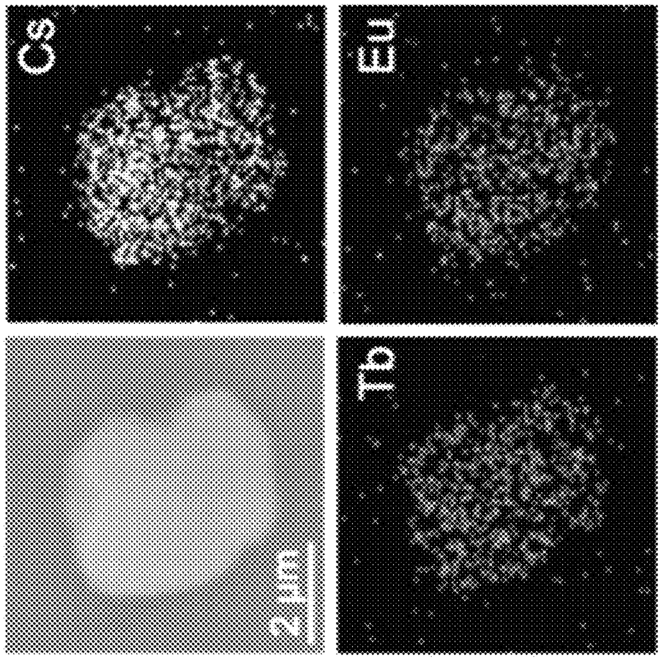
FIG. 4B shows the elemental maps of Cs, Tb, and Eu of the $Cs_3TbF_6$:$Eu^{3+}$ (5%) crystals in FIG. 4A.
Figure 4C:
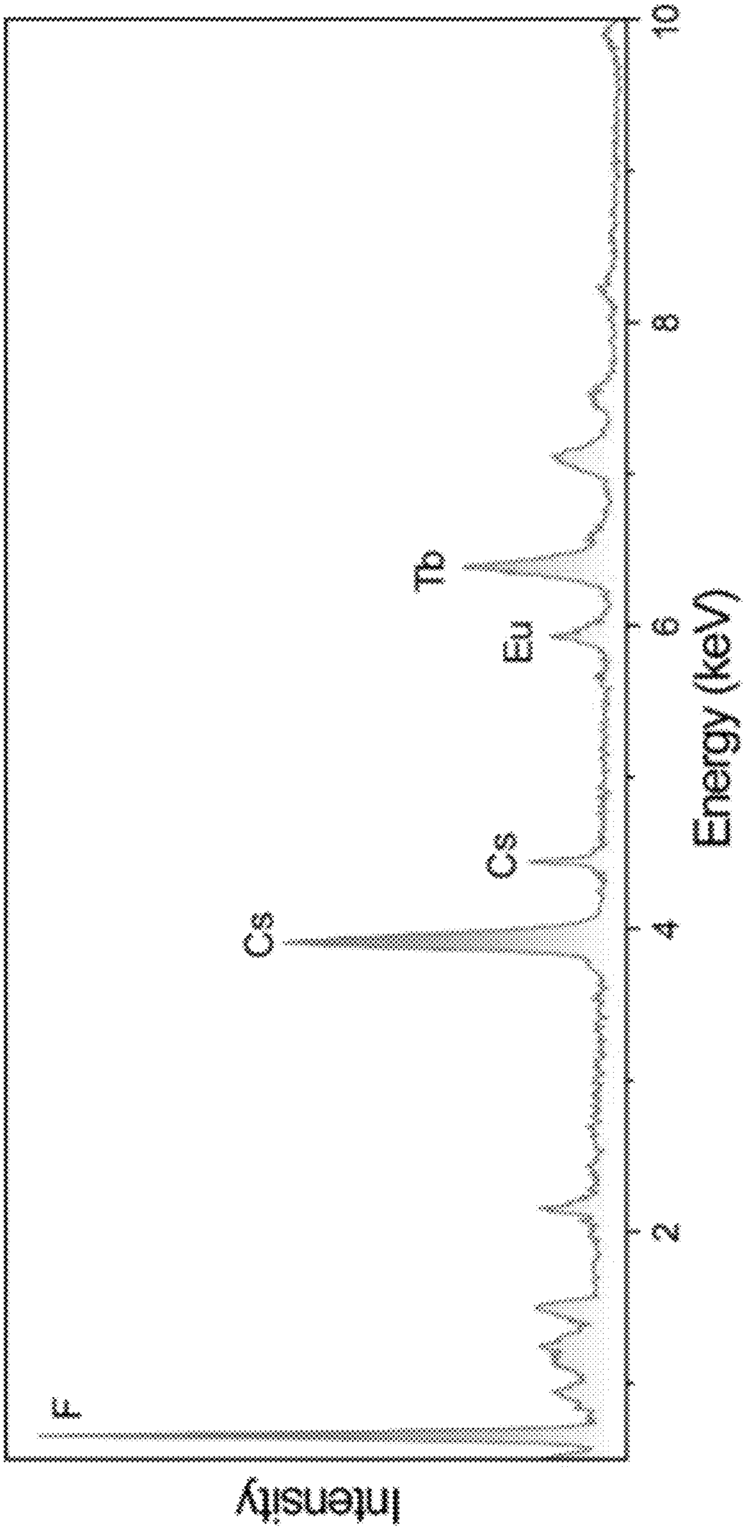
FIG. 4C shows an energy-dispersive X-ray (EDX) spectrum of the $Cs_3TbF_6$:$Eu^{3+}$ (5%) crystals in FIG. 4A.

The as-synthesized $Cs_3TbF_6:Eu^{3+}$ crystals had an irregular morphology with a particle size in the 0.5-3 μm range according to scanning electron microscopy (SEM) (FIG. 4A). Compositional analysis by energy-dispersive X-ray spectroscopy (EDX) and elemental mapping reveals the presence of the dopant ions $Eu^{3+}$ with a uniform distribution in the host lattice (FIGS. 4B and 4C). Inductively coupled plasma-optical emission spectroscopy (ICP-OES) further revealed that almost all the dopant ions in the starting materials were successfully doped in the host lattice (FIG. 5).

Example 3

Photophysical Characterization

Figure 6B:
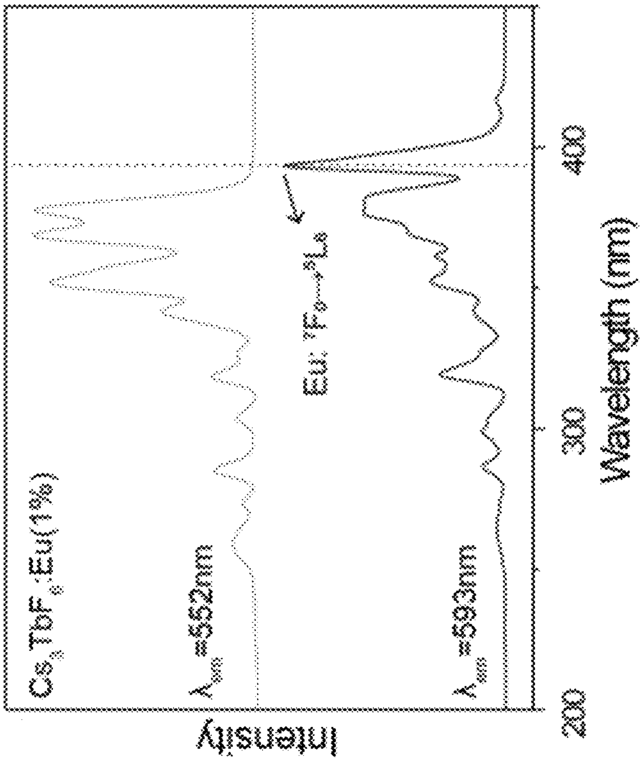
FIG. 6B shows the excitation spectra of $Cs_3TbF_6$:$Eu^{3+}$ (1%) crystals recorded by monitoring the emissions at 552 nm (top panel) and 593 nm (bottom panel), respectively. The dashed line indicates the $^7F_0 \rightarrow {}^5L_6$ transition of $Eu^{3+}$.
Figure 6A:
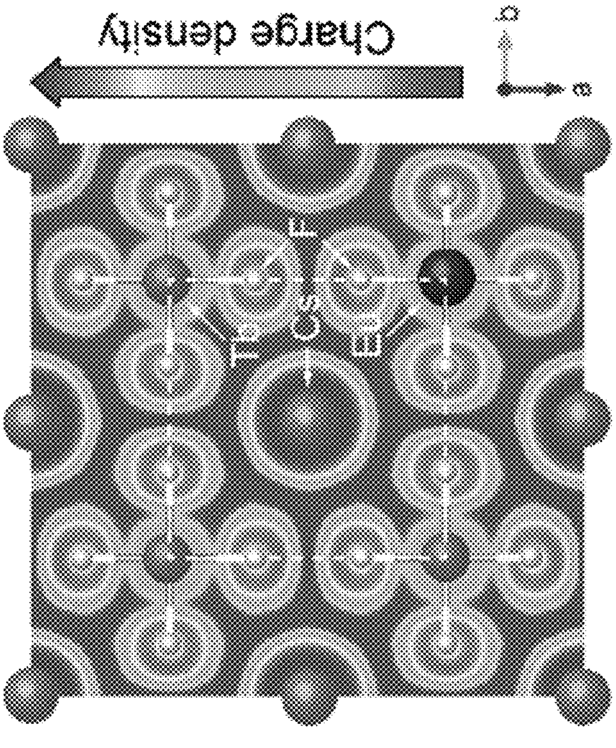
FIG. 6A shows the charge density isosurface at the (001) plane in $Eu^{3+}$-doped $Cs_3TbF_6$ that shows decoupling of electronic orbitals between neighboring $[TbF_6]^{3-}$ and $[EuF_6]^{3-}$ polyhedral.
Figure 7A:
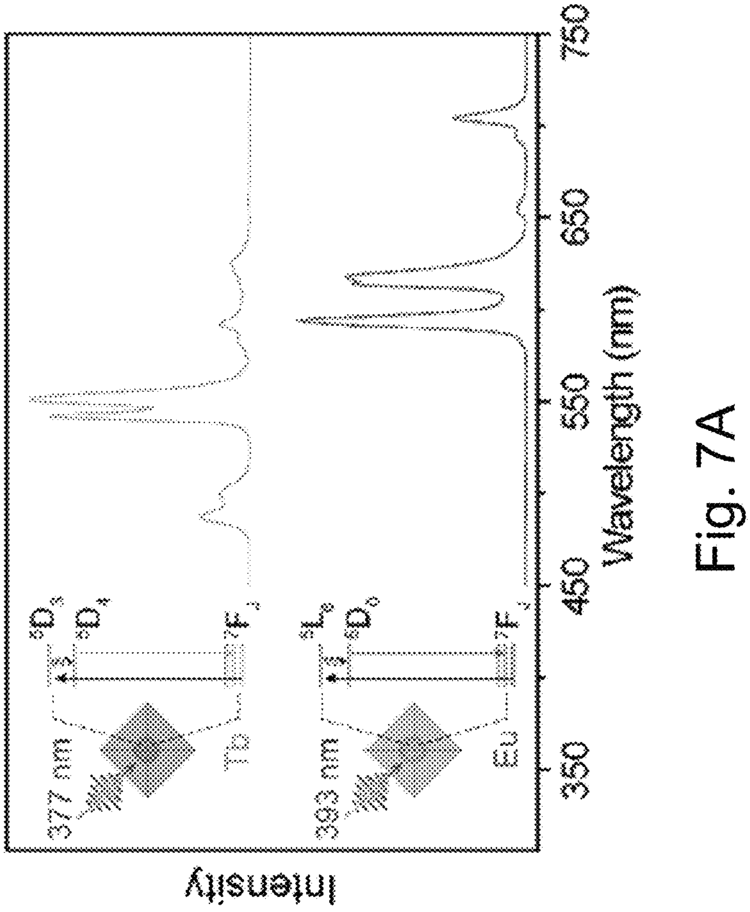
FIG. 7A shows the emission spectra of the $Cs_3TbF_6$:$Eu^{3+}$ (1%) crystals under 377 nm (top panel) and 393 nm (bottom panel) excitation, respectively.
Figure 7B:
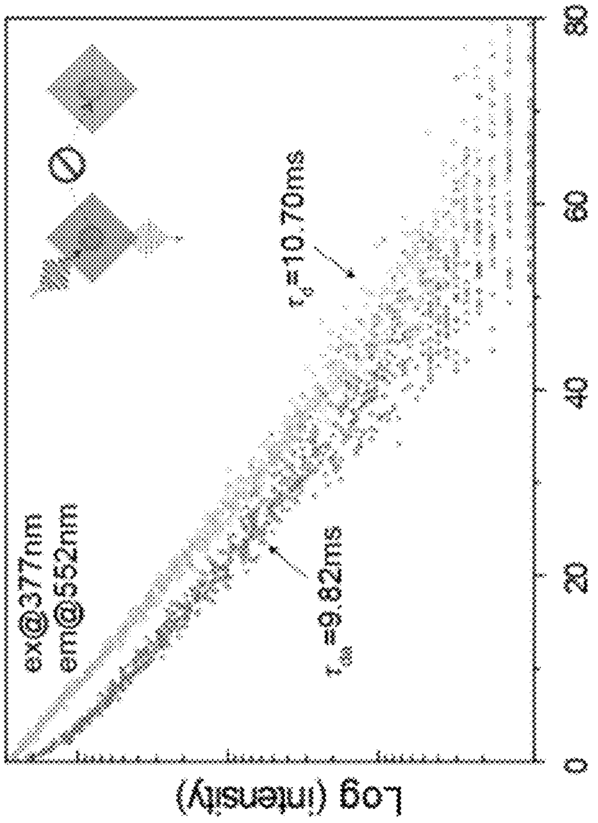
FIG. 7B shows the decay curves of bare $Cs_3TbF_6$ and $Cs_3TbF_6$:$Eu^{3+}$ (1%) crystals.

On account of the 0D lattice structure, the neighboring octahedral units showed negligible electronic coupling according to the calculated charge density isosurface (FIG. 6A). Consequently, essentially independent luminescence from the $[TbF_6]^{3-}$ and $[EuF_6]^{3-}$ octahedra was obtained due to their nonoverlapping excitation bands (FIG. 6B). As shown in FIG. 7A, the sample exhibited characteristic green emissions of $Tb^{3+}$ at ~488/496 nm ($^5D_4 \rightarrow {}^7F_6$) and ~542/552 nm ($^5D_4 \rightarrow {}^7F_5$) upon 377 nm excitation, owing to the selective population of the 5D3 excitation state of Tb3+. By contrast, red emissions of $Eu^{3+}$ at ~593 nm ($^5D_0 \rightarrow {}^7F_1$), ~619 nm ($^5D_0 \rightarrow {}^7F_2$), and ~706 nm ($^5D_0 \rightarrow {}^7F_4$) were exclusively detected under 393 nm excitation, which only populated the $^5L_6$ excitation state of $Eu^{3+}$. Time decay studies detected a marginal change in $Tb^{3+}$ lifetime after $Eu^{3+}$ doping, which confirmed the minimal energy exchange interaction of $Tb^{3+}$ and $Eu^{3+}$ ions (FIG. 7B).

Figure 8:
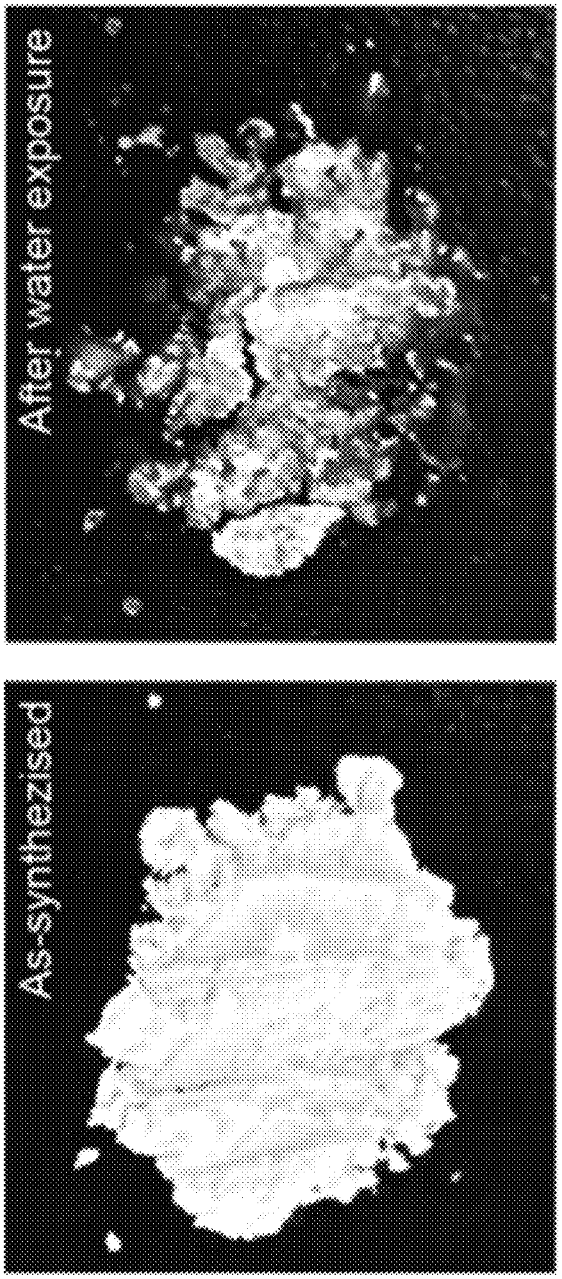
FIG. 8 shows the photographs of as-synthesized $Cs_3TbF_6$:$Eu^{3+}$ (1%) before and after water exposure.
Figure 9:
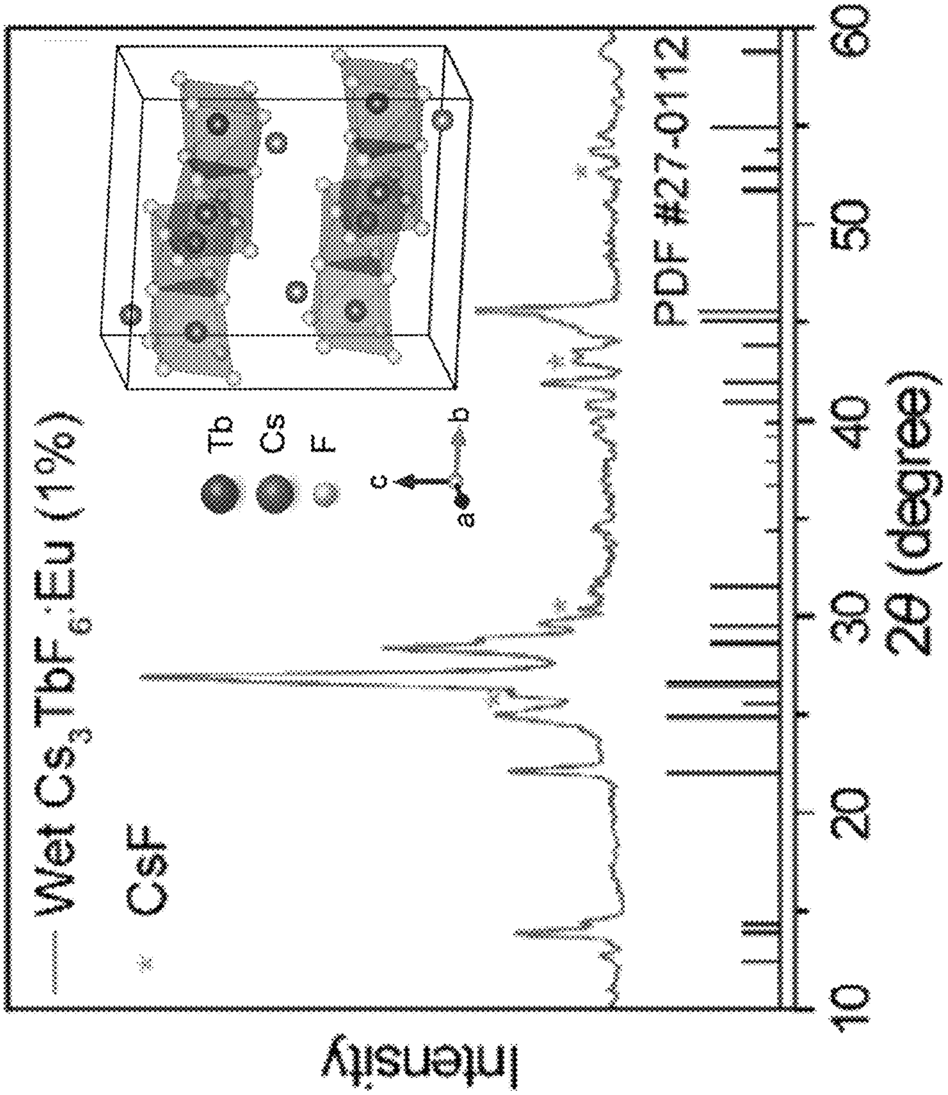
FIG. 9 shows the XRD pattern of the $Cs_3TbF_6$:$Eu^{3+}$ crystals after water exposure. The line spectra are literature data for orthorhombic-phase $CsDy_2F_7$(PDF #27-0112). The inset is the crystal structure diagram of $CsTb_2F_7$.

It is noticed that the as-prepared $Cs_3TbF_6$:$Eu^{3+}$ crystals were hygroscopic and changed their appearance upon exposure to a humid environment (FIG. 8). XRD characterization of the wet sample revealed a phase transformation into orthorhombic $CsTb_2F_7$(FIG. 9). The XRD pattern also shows impurity peaks of CsF, as marked with asterisks. Thus, the phase transformation can be ascribed to a CsF-stripping process:

$$2Cs_3TbF_6 \xrightarrow{water} CsTb_2F_7 + 5CsF$$

Figure 10B:
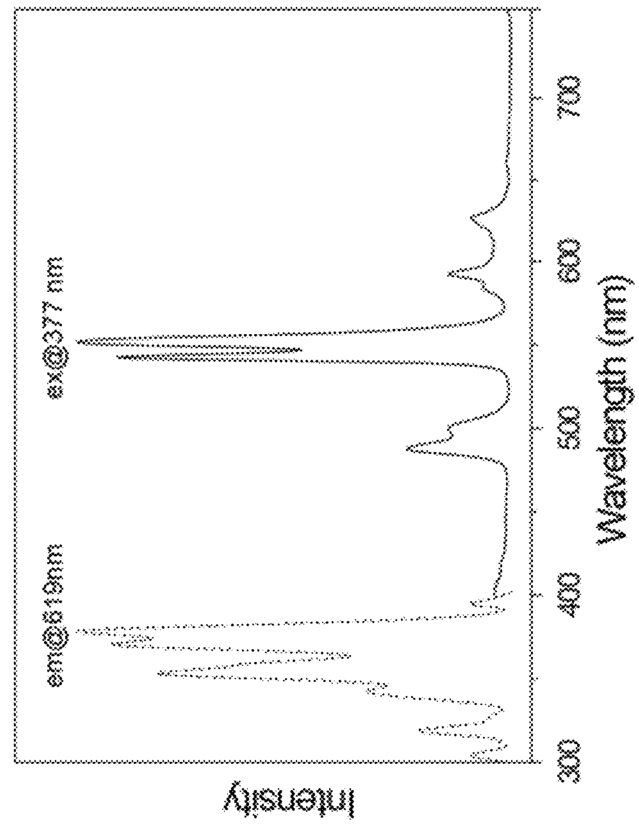
FIG. 10B shows the excitation/emission spectra of $Cs_3TbF_6$:$Eu^{3+}$ (1%) crystals after methanol treatment.
Figure 10A:
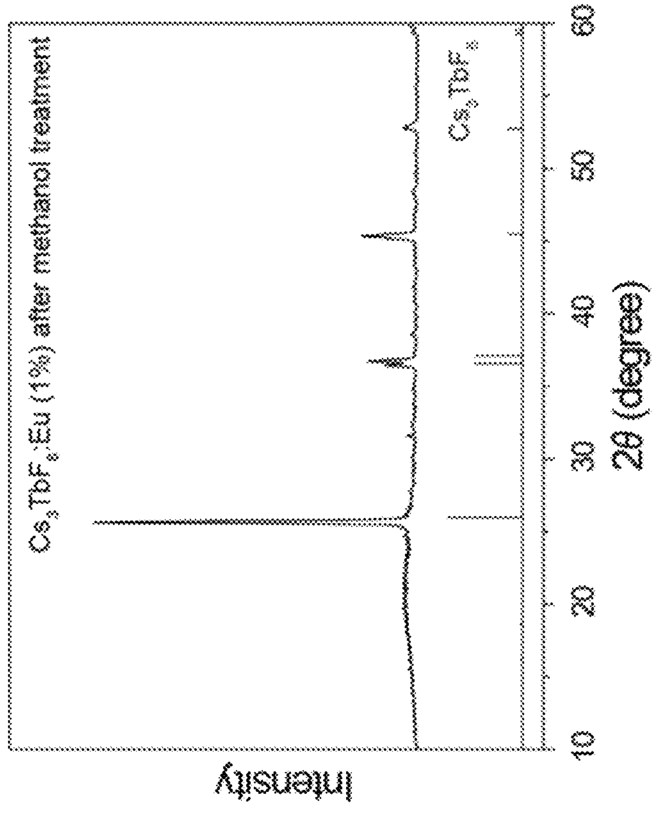
FIG. 10A shows the XRD pattern of $Cs_3TbF_6$:$Eu^{3+}$ (1%) crystals after methanol treatment. The results showed that the sample was essentially unaffected by methanol.

The stripping reaction was primarily due to the high solubility of CsF in water, as the sample remained stable in methanol that is a poor solvent for CsF (FIGS. 10A and 10B).

Figure 11:
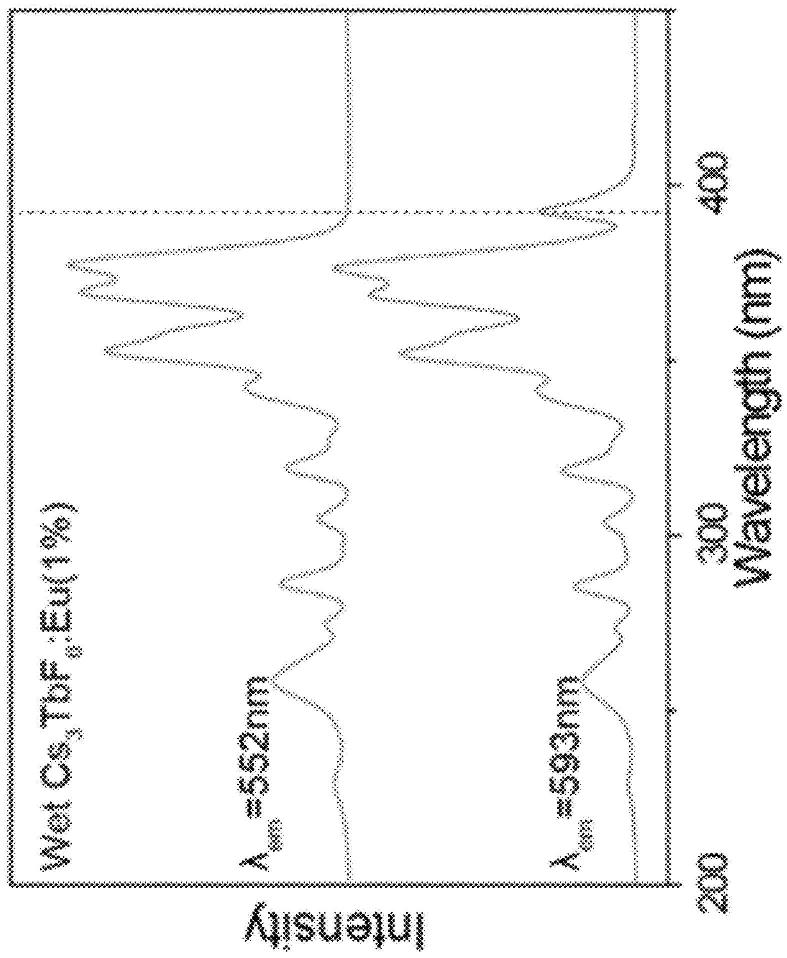
FIG. 11 shows the excitation spectra of wet $Cs_3TbF_6$:$Eu^{3+}$ (1%) crystals by monitoring the emission at 552 nm (top panel) and 593 nm (bottom panel), respectively. The dashed line indicates the $^7F_0 \rightarrow {}^5L_6$ transition of $Eu^{3+}$.
Figure 12B:
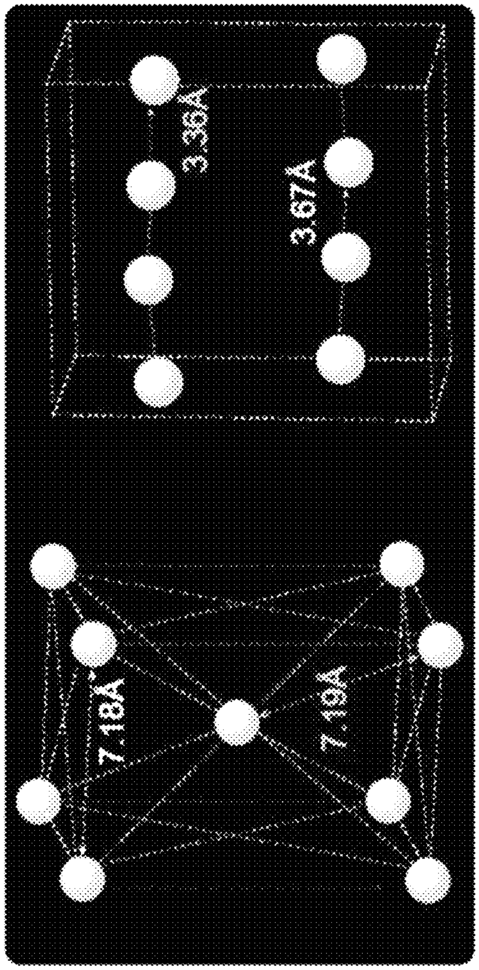
FIG. 12B is a schematic diagram illustrating the distance between adjacent lanthanide ions in $Cs_3TbF_6$ and $CsTb_2F_7$ crystals.
Figure 12A:
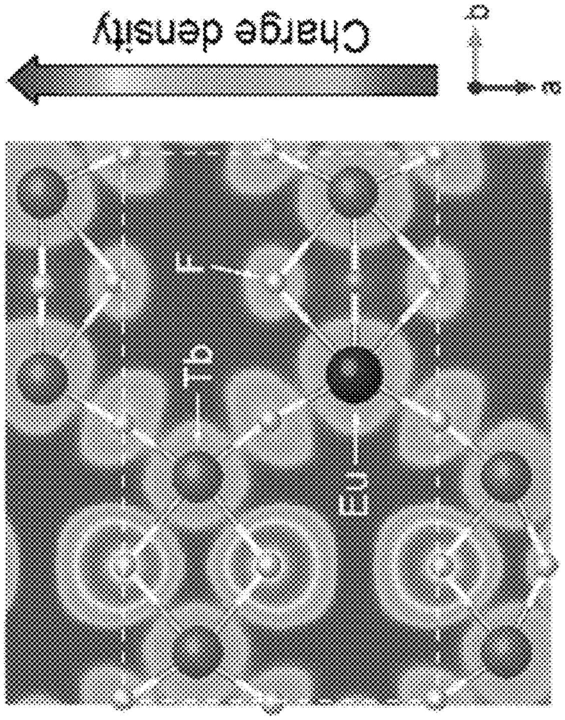
FIG. 12A shows the charge density isosurface at the (007) plane in $Eu^{3+}$-doped $CsTb_2F_7$ that shows coupling of electronic orbitals between the neighboring $[TbF_7]^{4-}$ and $[EuF_7]^{4-}$ polyhedral.
Figure 13A:
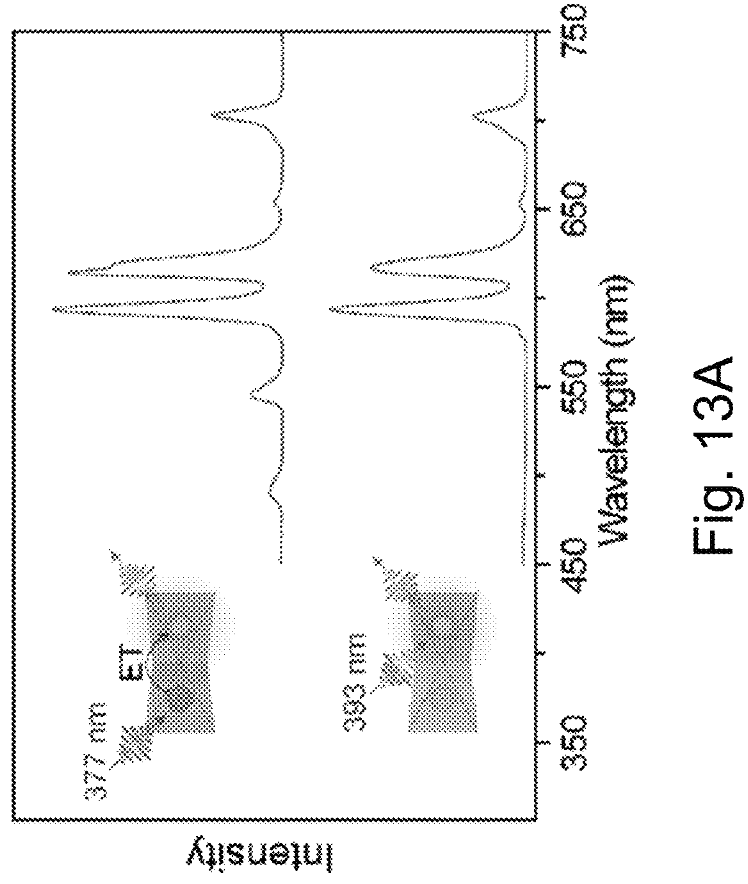
FIG. 13A shows the emission spectra of wet $Cs_3TbF_6$:$Eu^{3+}$ (1%) crystals under 377 nm (top panel) and 393 nm (bottom panel) excitation, respectively.
Figure 13B:
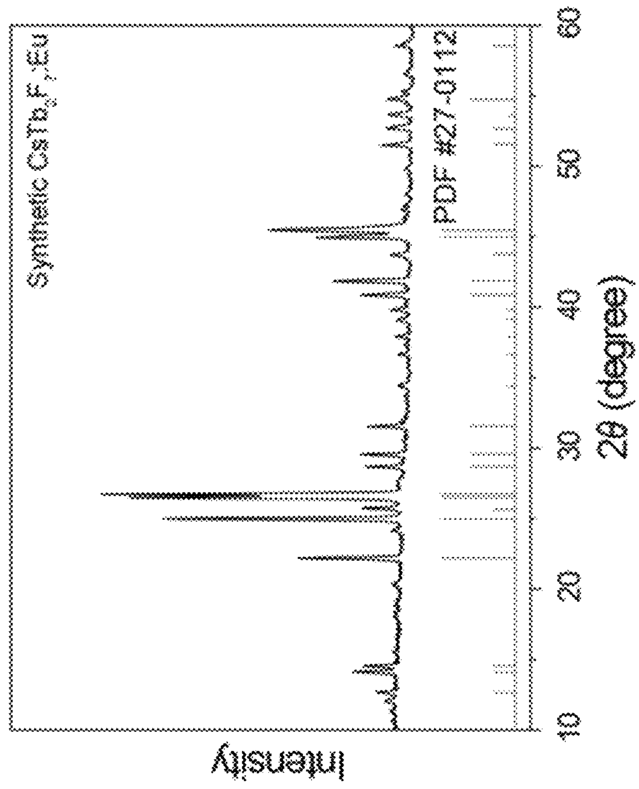
FIG. 13B shows the XRD pattern of synthetic $CsTb_2F_7$:$Eu^{3+}$ (1%) crystal. The line spectra are literature data for orthorhombic phase $CsDy_2F_7$ (PDF #27-0112)
Figure 13C:
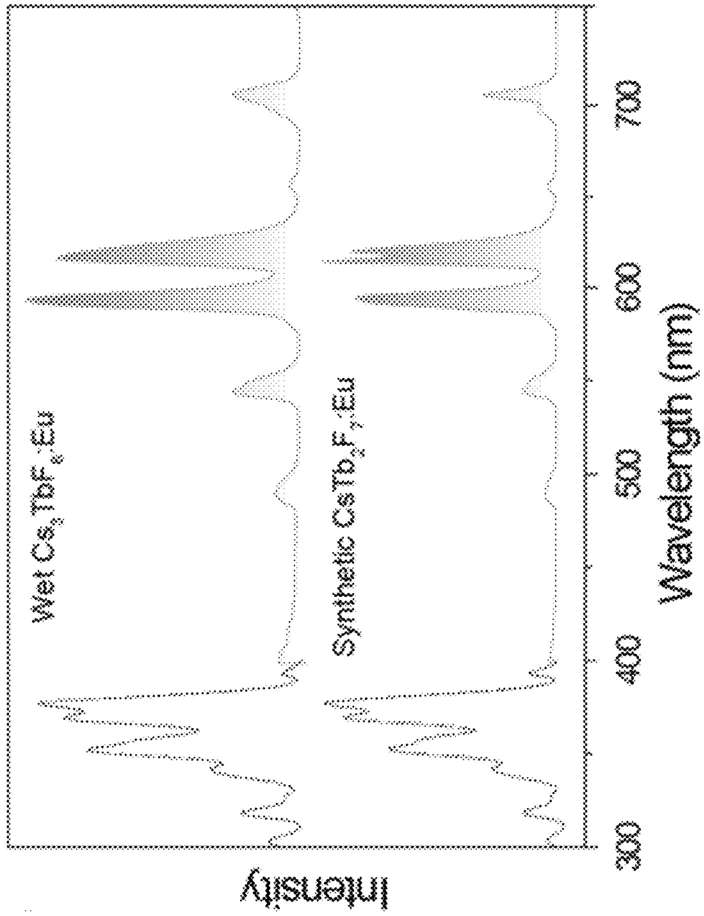
FIG. 13C shows the excitation and emission spectra of hydrolyzed $Cs_3TbF_6$:$Eu^{3+}$ (1%) and synthetic $CsTb_2F_7$:$Eu^{3+}$ (1%) crystals.

The f-f transitions of $Tb^{3+}$ and $Eu^{3+}$ ions in the $CsTb_2F_7$:$Eu^{3+}$ crystals were essentially the same as those in the parent $Cs_3TbF_6$:$Eu^{3+}$ (FIG. 11). However, the orthorhombic phase with a one-dimensional (1D) lattice structure activated the coupling of neighboring polyhedral units due to the contraction of the lanthanide sublattice (FIGS. 12A and 12B), leading to luminescence processes that are essentially independent of the excitation wavelength. In specific, the emission spectra were dominated by $Eu^{3+}$ peaks under both 377 and 393 nm excitation (FIG. 13A), revealing a unidirectional energy transfer from $Tb^{3+}$ to $Eu^{3+}$. On a separate note, the hydrolyzed sample closely resembled the spectra of directly synthesized $CsTb_2F_7$:$Eu^{3+}$ (1%) (FIG. 13B), suggesting the absence of lanthanide segregation during the phase transformation.

Figure 14:
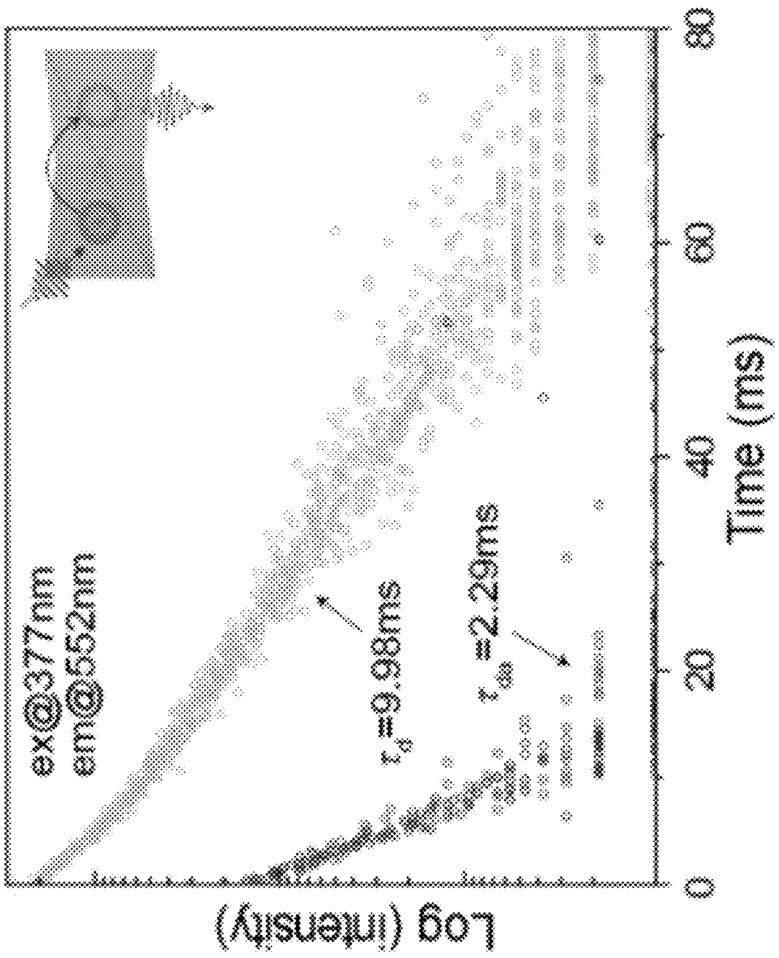
FIG. 14 shows the decay curves of bare $Cs_3TbF_6$ and $Cs_3TbF_6$:$Eu^{3+}$ (1%) crystals after water treatment.

Time decay studies detected an appreciable shortening of $Tb^{3+}$ lifetime from 9.98 to 2.29 ms in the wet $Cs_3TbF_6$ (or $CsTb_2F_7$) crystals due to 1% of $Eu^{3+}$ doping (FIG. 14). Correspondingly, the experimental energy transfer efficiencies were calculated based on the measured lifetimes using the following equation:

$$\eta_{ET} = 1 - \frac{\tau_{da}}{\tau_d}$$

where $\tau_{da}$ and $\tau_a$ are the $^5D_4$ lifetimes of $Tb^{3+}$ in undoped and $Eu^{3+}$-doped samples, respectively. The results confirmed a high $Tb^{3+}$-to-$Eu^{3+}$ energy transfer efficiency of 77.1% in the $CsTb_2F_7$:$Eu^{3+}$ (1%) crystals.

Example 3

Hydrochromic Properties

Figure 15:
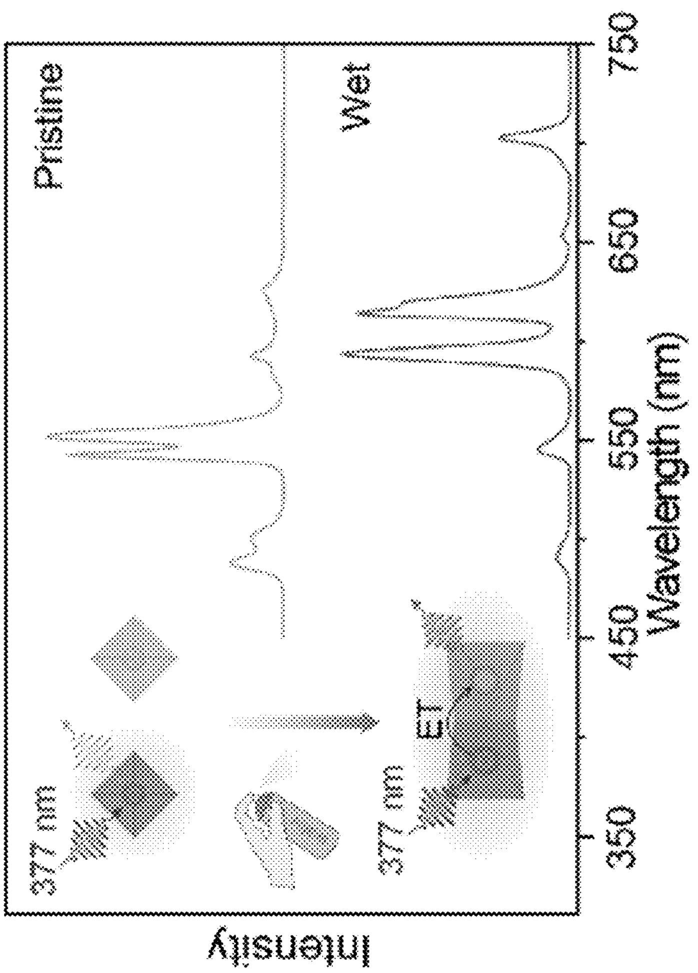
FIG. 15 shows the emission spectra of $Cs_3TbF_6$:$Eu^{3+}$ (1%) crystals before and after water treatment under 377 nm excitation.
Figure 16:
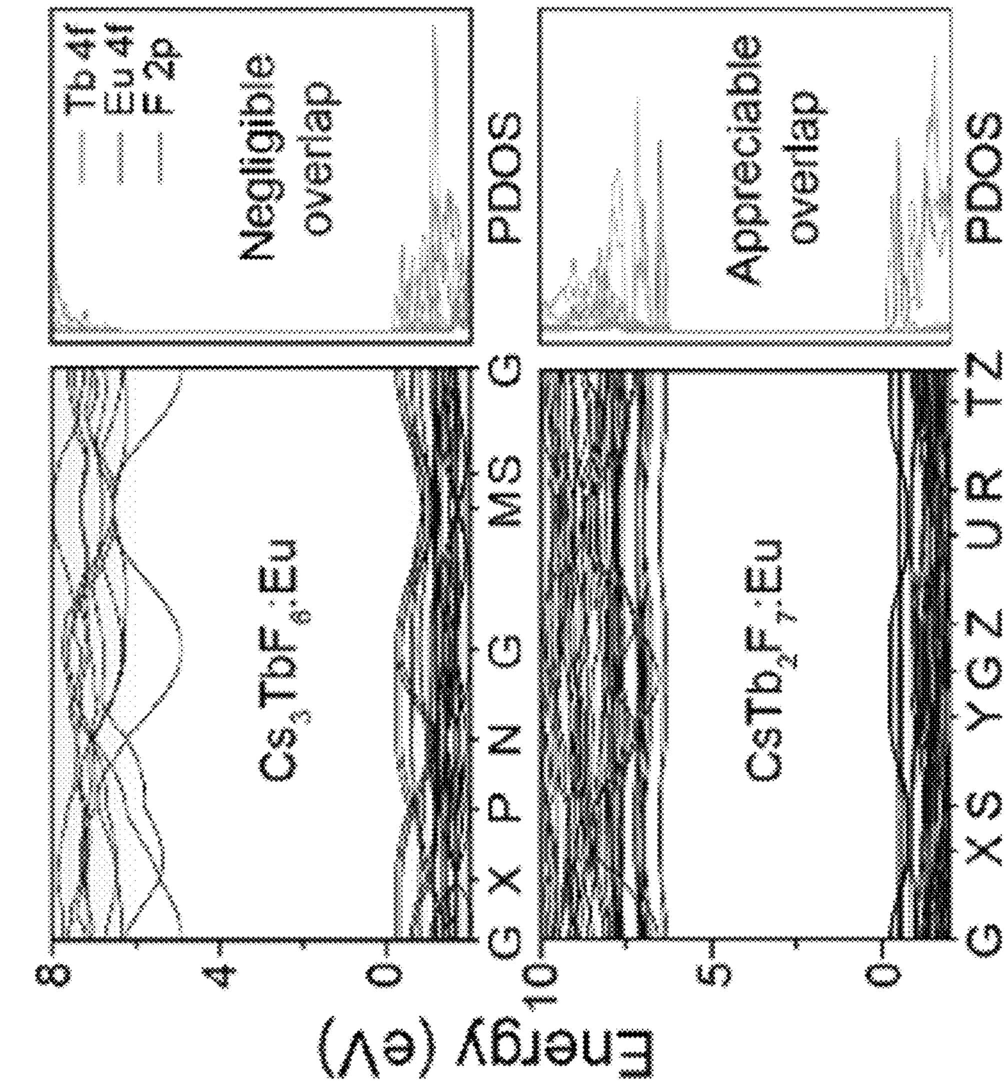
FIG. 16 shows the calculated electronic band structures and corresponding projected density of states (PDOS) of $Cs_3TbF_6$:$Eu^{3+}$ (top panel) and $CsTb_2F_7$:$Eu^{3+}$ (bottom panel), respectively.
Figure 17:
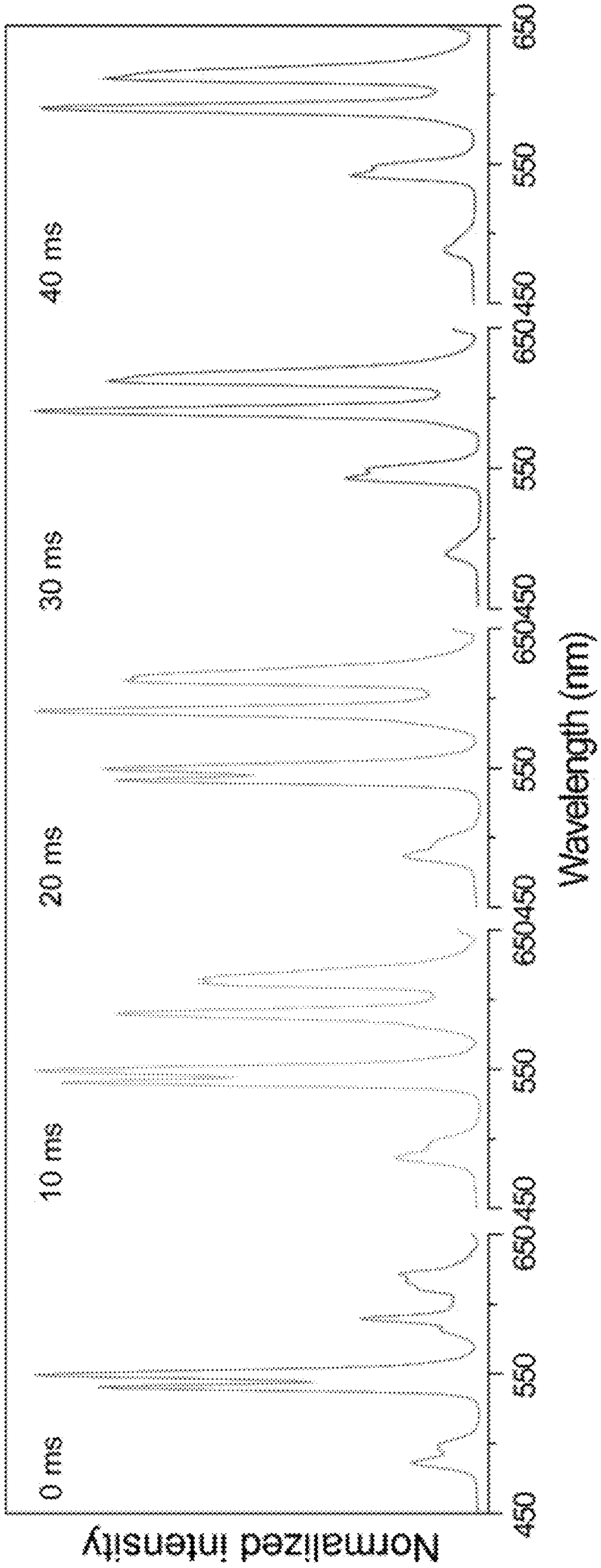
FIG. 17 shows the emission spectra of $Cs_3TbF_6$:$Eu^{3+}$ (1%) crystals as a function of water contact time. The sample was constantly excited using a hand-held UV lamp, and the measurement was started immediately after adding water. The spectra were continuously collected by setting an integration time of 10 ms.
Figure 18:
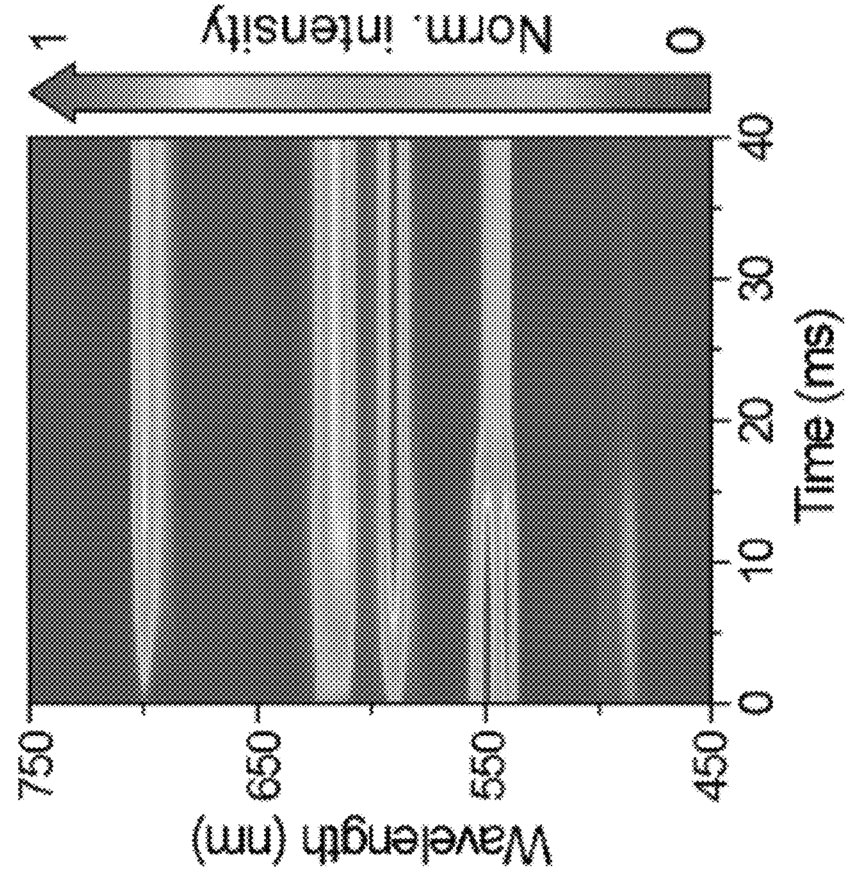
FIG. 18 shows the contour plot of the emission spectrum of $Cs_3TbF_6$:$Eu^{3+}$ (1%) crystals as a function of water contact time.
Figure 19:
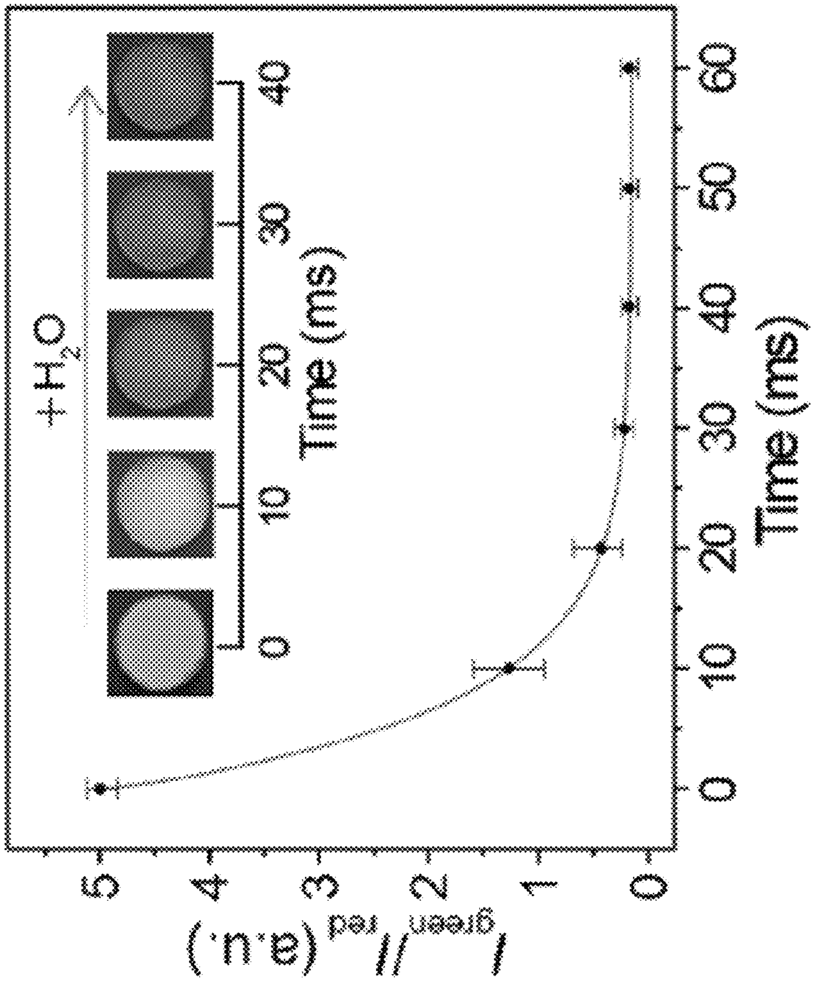
FIG. 19 shows the integral intensity ratios of green and red emissions as a function of water contact time in $Cs_3TbF_6$:$Eu^{3+}$ (1%) crystals. The error bar represents the standard deviation of three repeated measurements. The insets are the corresponding photographs.

Due to the water-induced phase transformation, the $Cs_3TbF_6$:$Eu^{3+}$ crystals displayed a hydrochromic luminescence switching under constant 377 nm excitation (FIG. 15). The sharp emission color shift from green to orange suggests a substantial change in energy coupling between the lanthanide centers, which is consistent with our theoretical calculations. As depicted in FIG. 16, the phase transition resulted in an appreciable overlap of the f orbitals of $Eu^{3+}$ and $Tb^{3+}$, which could lead to strong exchange interactions between the ions. Accordingly, the phase transformation process was monitored by inspecting the spectrum change as a function of water contact time (FIG. 17). As shown in FIG. 18, the emission intensity balance of $Tb^{3+}$ and $Eu^{3+}$, which were correlated with the relative amount of $Cs_3TbF_6$:$Eu^{3+}$ and $CsTb_2F_7$:$Eu^{3+}$ in the sample, rapidly dropped upon water contact. By plotting the green-to-red emission intensity ratio of $Tb^{3+}$ and $Eu^{3+}$ against time (FIG. 19), the hydrochromic response time was determined to be 20 ms, corresponding to 90% completion of the color switching. In particular, it is believed that such a rapid hydrochromic response has not been observed in any of the reported inorganic hydrochromic materials and in most of the reported organic hydrochromic materials (FIG. 20).

Figure 21:
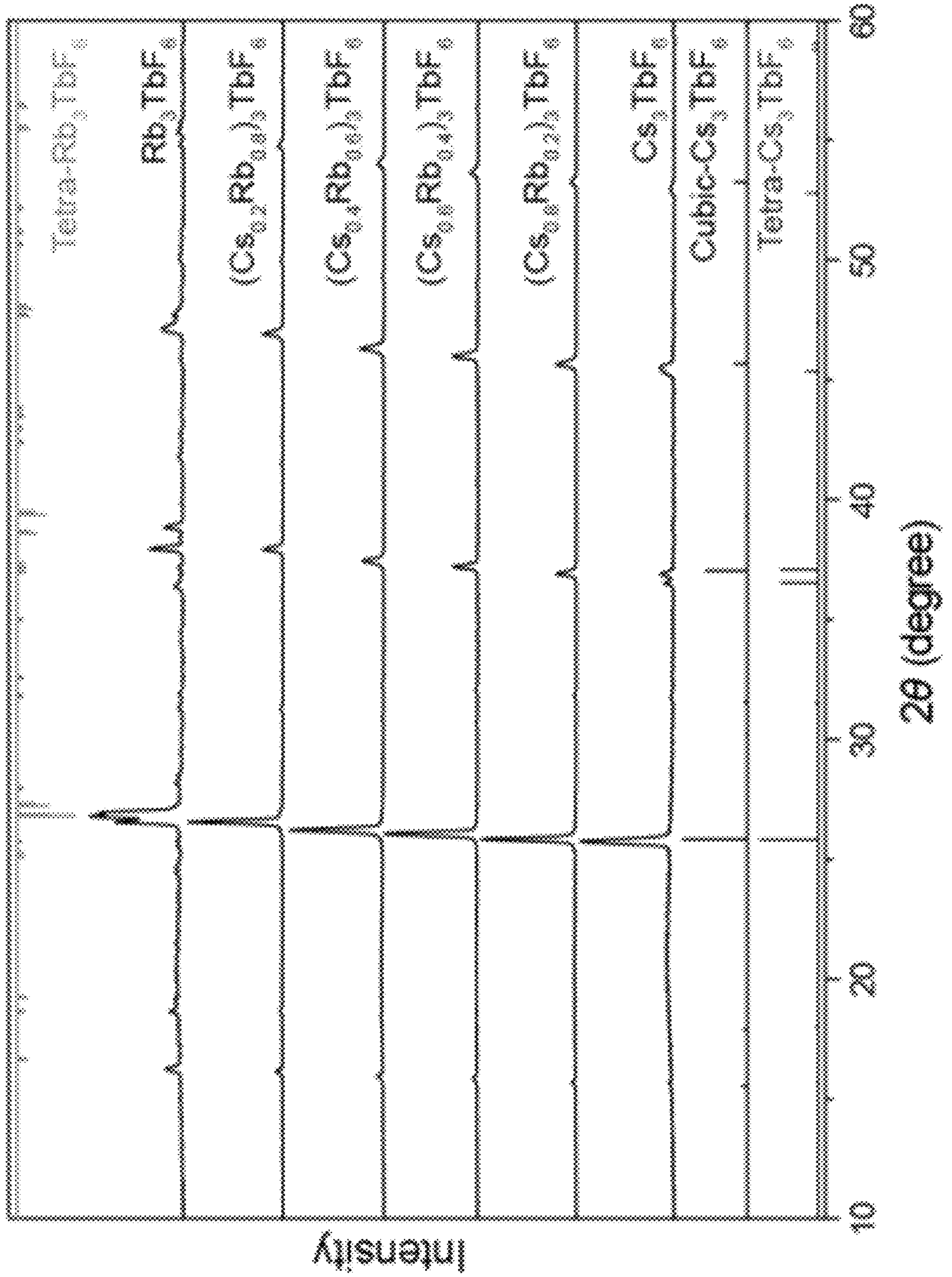
FIG. 21 shows the XRD patterns of $Cs_{3-x}Rb_xTbF_6$:$Eu^{3+}$ (1%) crystals. The spectral shift toward higher diffraction angles can be attributed to the substitution of apparently smaller $Rb^+$ for $Cs^+$ centers in the crystal lattice, resulting in a smaller unit-cell volume.
Figure 22:
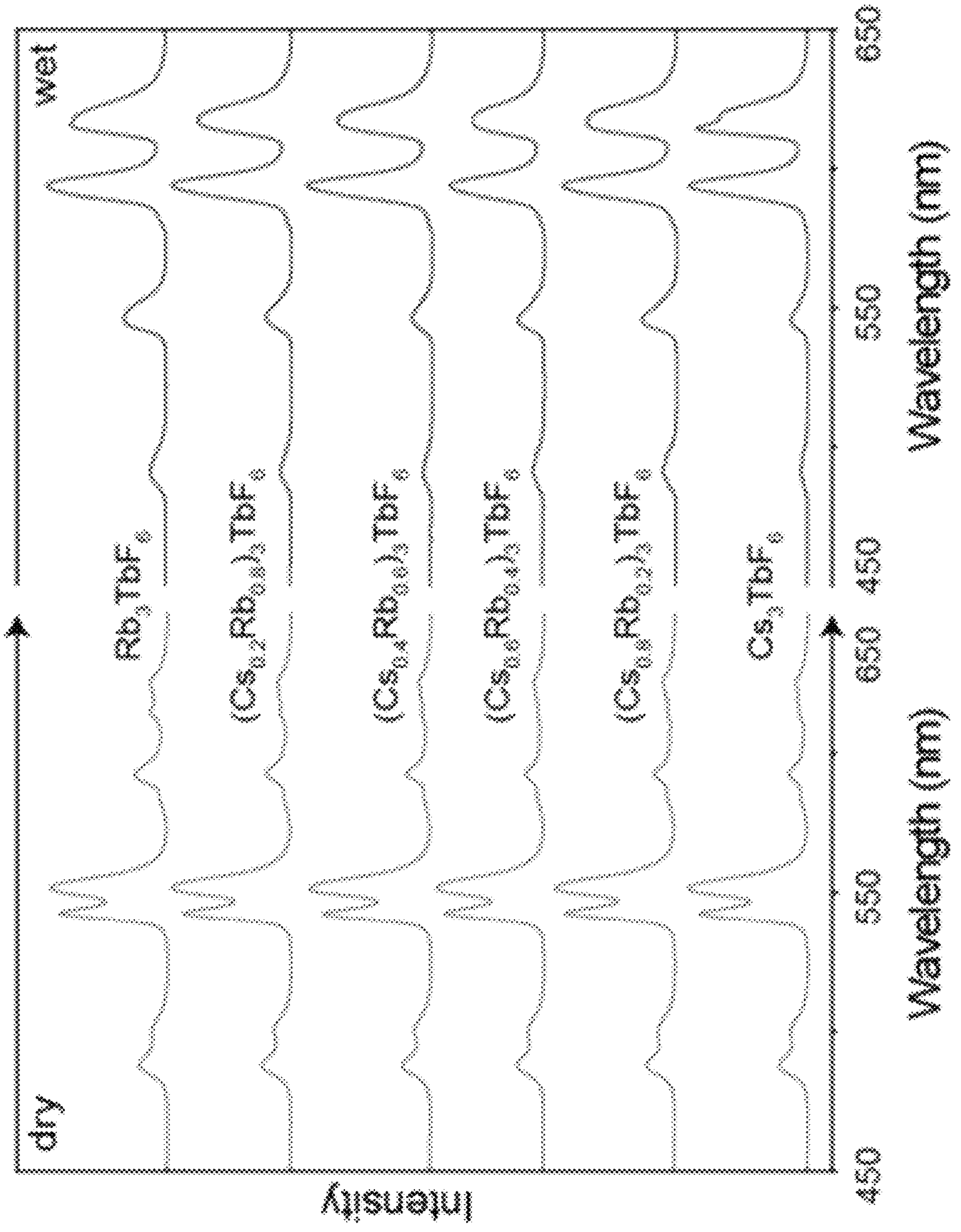
FIG. 22 shows the emission spectra of $Cs_{3-x}Rb_xTbF_6$:$Eu^{3+}$ (1%) crystals before and after water exposure.

It is believed that the ultrafast phase transformation as observed herein is largely benefited from the extra high solubility of CsF in water (3690 g/L at 18° C.), which elicits the absorption of water layers around the crystals. To support this hypothesis, a series of Rb-alloyed $Cs_3TbF_6$:$Eu^{3+}$ (i.e., $Cs_{3-x}Rb_xTbF_6$:$Eu^{3+}$ (1%), with x being 0.6, 1.2, 1.8, 2.4, or 3) has been synthesized and characterized by XRD. As shown in FIG. 21, the XRD pattern of $Cs_{3-x}Rb_xTbF_6$:$Eu^{3+}$ (1%) shifts gradually toward higher diffraction angles, which may be attributed to the substitution of apparently smaller $Rb^+$ for $Cs^+$ centers in the crystal lattice, resulting in a smaller unit-cell volume. Upon excitation at about 377 nm, each of the pristine (dry) $Cs_{3-x}Rb_xTbF_6$:$Eu^{3+}$ and wet $Cs_{3-x}Rb_xTbF_6$:$Eu^{3+}$ shows an emission spectrum that is substantially resemble to those of pristine (dry) $Cs_3TbF_6$:$Eu^{3+}$ and wet $Cs_3TbF_6$:$Eu^{3+}$, respectively (FIG. 22).

Figure 23A:
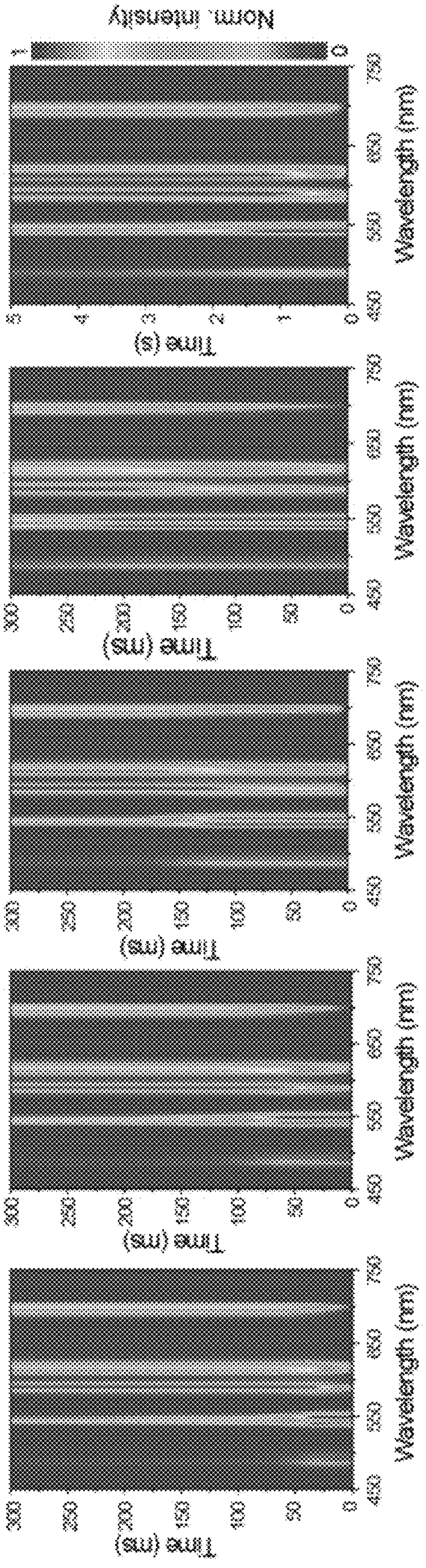
FIG. 23A shows the contour plot of the emission spectra of $Cs_{3-x}Rb_xTbF_6$:$Eu^{3+}$ (1%) crystals as a function of water exposure time.
Figure 23B:
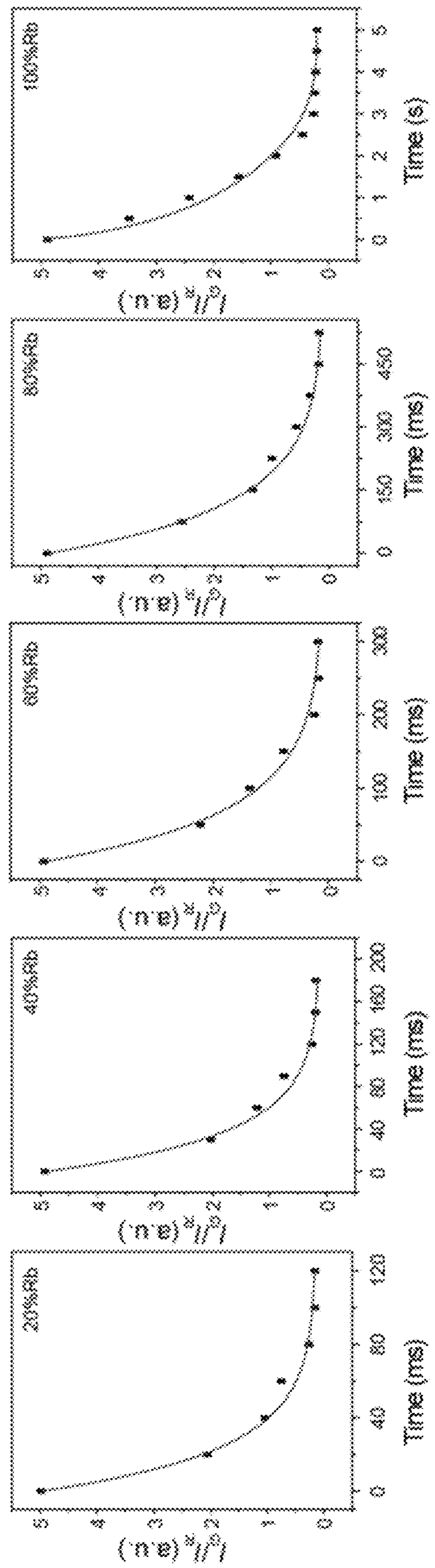
FIG. 23B shows the plot of the intensity ratios of green-to-red emissions of $Cs_{3-x}Rb_xTbF_6$:$Eu^{3+}$ (1%) crystals as a function of water exposure time.
Figure 23C:
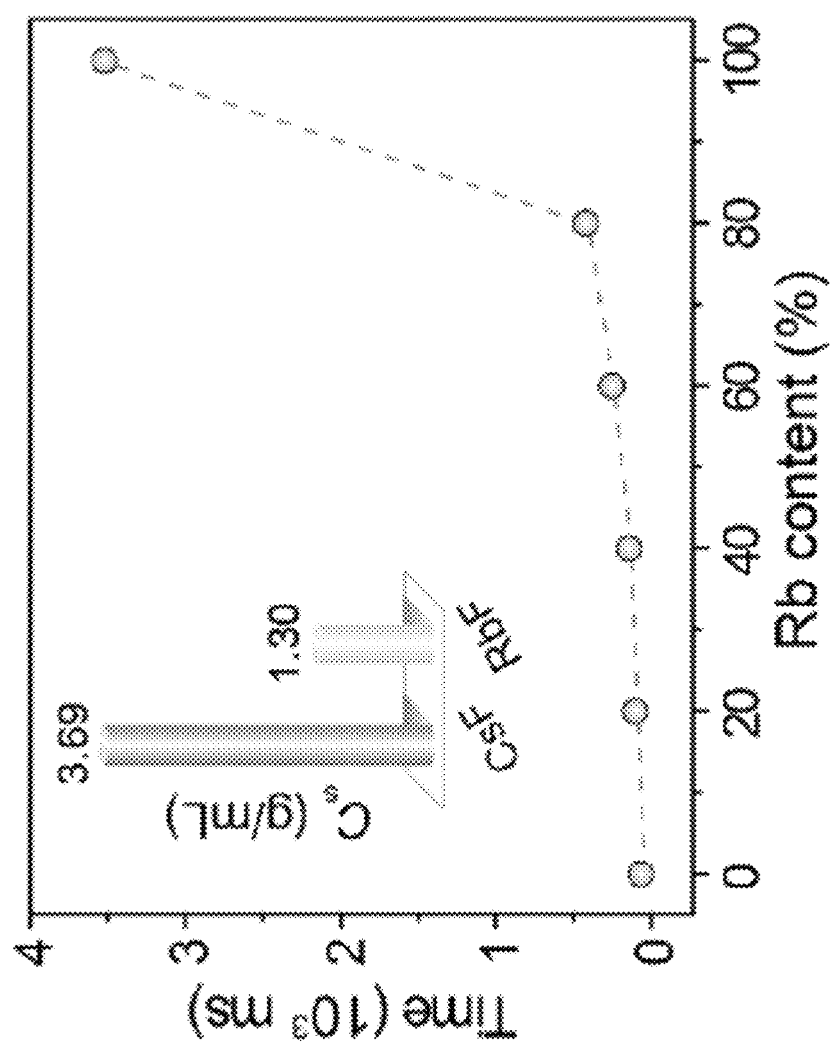
FIG. 23C shows the plot of hydrochromic response time as a function of $Rb^+$ doping concentration in $Cs_3TbF_6$:$Eu^{3+}$ (1%) crystals. The inset shows the solubility of RbF and CsF in water at 18° C.

FIGS. 23A to 23C illustrate the hydrochromic emissions of Rb-alloyed $Cs_3TbF_6$:$Eu^{3+}$ as a function of water exposure time and the hydrochromic response time of Rb-alloyed $Cs_3TbF_6$:$Eu^{3+}$ as a function of $Rb^+$ doping concentration. As shown, it is observed that the hydrochromic response time in Rb-alloyed $Cs_3TbF_6$:$Eu^{3+}$ is increased, and, in particular, a substantially slow phase transformation was detected for Cs-free $Rb_3TbF_6$:$Eu^{3+}$, suggesting the production of less water-soluble RbF (1306 g/L at 18° C.); or in other words, markedly reduced water absorption in the absence of CsF.

Figure 24:
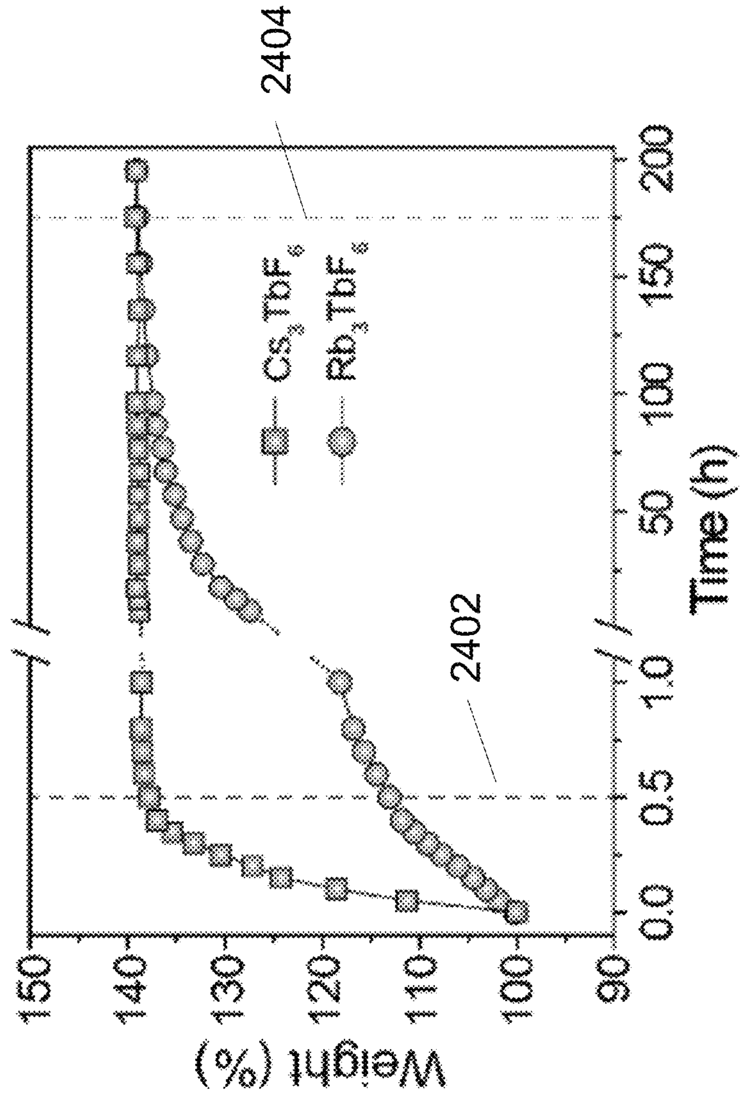
FIG. 24 shows the weight evolution curves of the $Cs_3TbF_6$:$Eu^{3+}$ (1%) and $RbTbF_6$:$Eu^{3+}$ (1%) crystals as a function of exposure time in air. The dashed lines 2402 and 2404 indicate the times required for $Cs_3TbF_6$ and $Rb_3TbF_6$ crystals to reach weight saturation, respectively.
Figure 25:
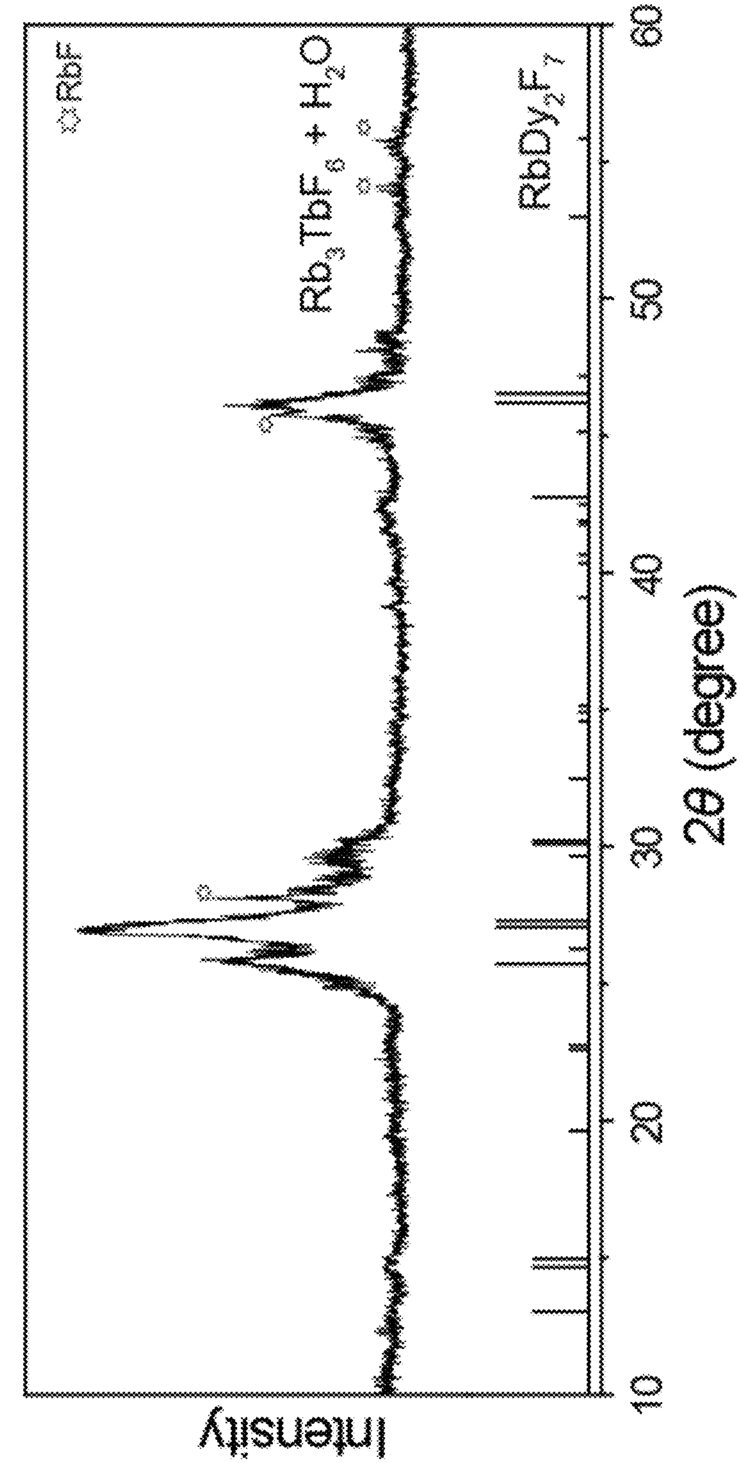
FIG. 25 shows the XRD pattern of $Rb_3TbF_6$ crystals after water treatment. The marked impurity diffraction peaks belong to RbF.
Figure 26A:
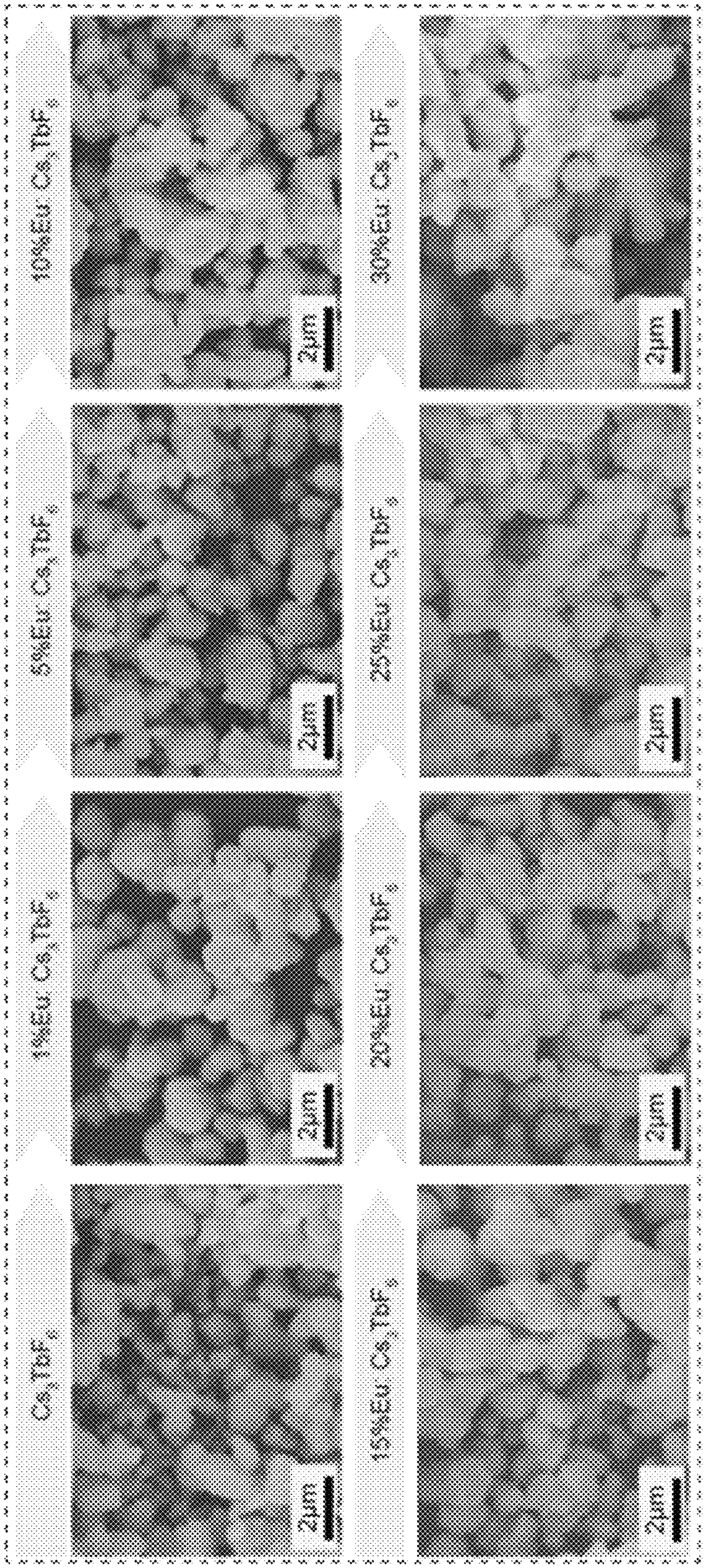
FIG. 26A shows the SEM images of $Cs_3TbF_6:Eu^{3+}$ (0-30%) crystals.
Figure 26B:
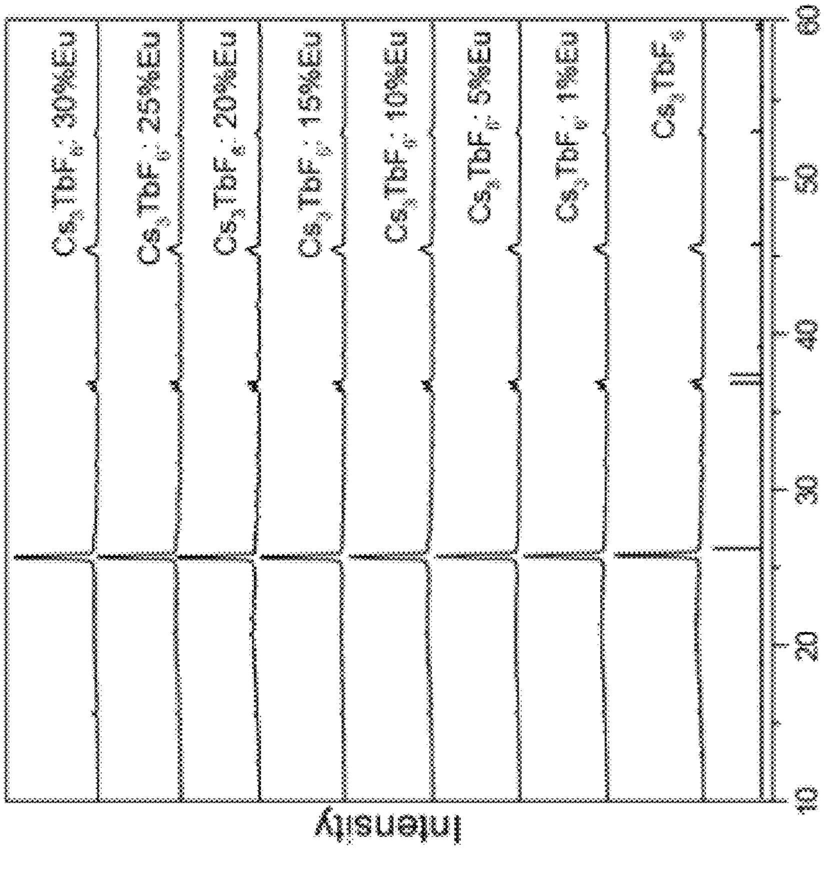
FIG. 26B shows the XRD patterns of $Cs_3TbF_6:Eu^{3+}$ (0-30%) crystals of FIG. 26A. The spectral shift toward lower diffraction angles can be attributed to the substitution of apparently larger $Eu^{3+}$ for $Tb^{3+}$ centers in the crystal lattice, resulting in a larger unit-cell volume.
Figure 27A:
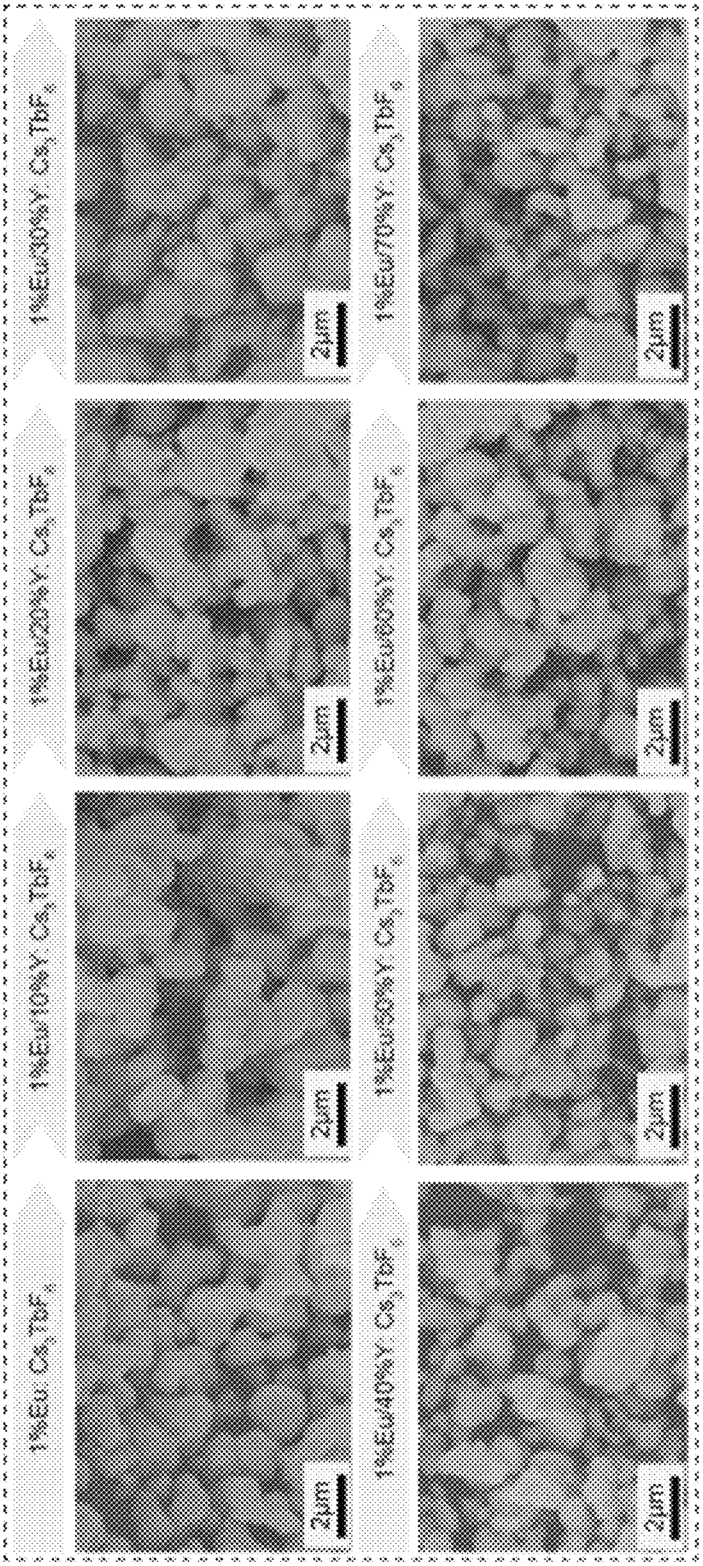
FIG. 27A shows the SEM images of $Cs_3TbF_6:Eu^{3+}/Y^{3+}$ (1%/0-70%) crystals.
Figure 27B:
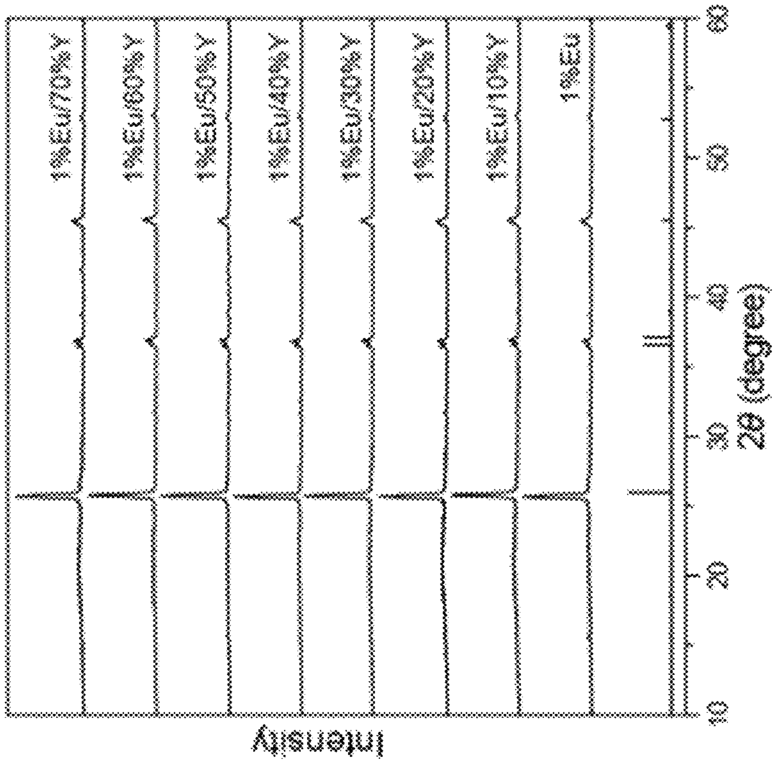
FIG. 27B shows the XRD patterns of $Cs_3TbF_6:Eu^{3+}/Y^{3+}$ (1%/0-70%) crystals of FIG. 27A.
Figure 28A:
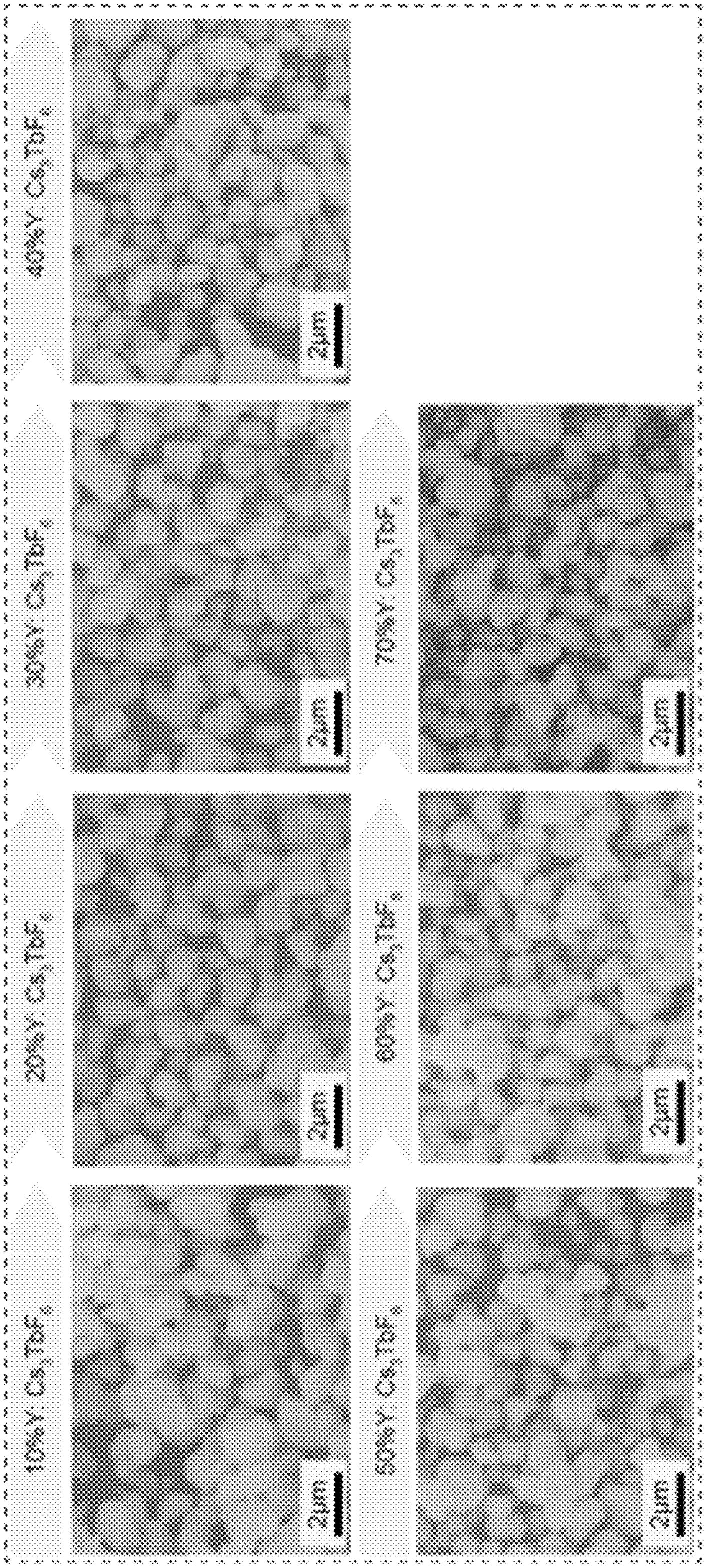
FIG. 28A shows the SEM images of $Cs_3TbF_6:Y^{3+}$ (10-70%) crystals.
Figure 28B:
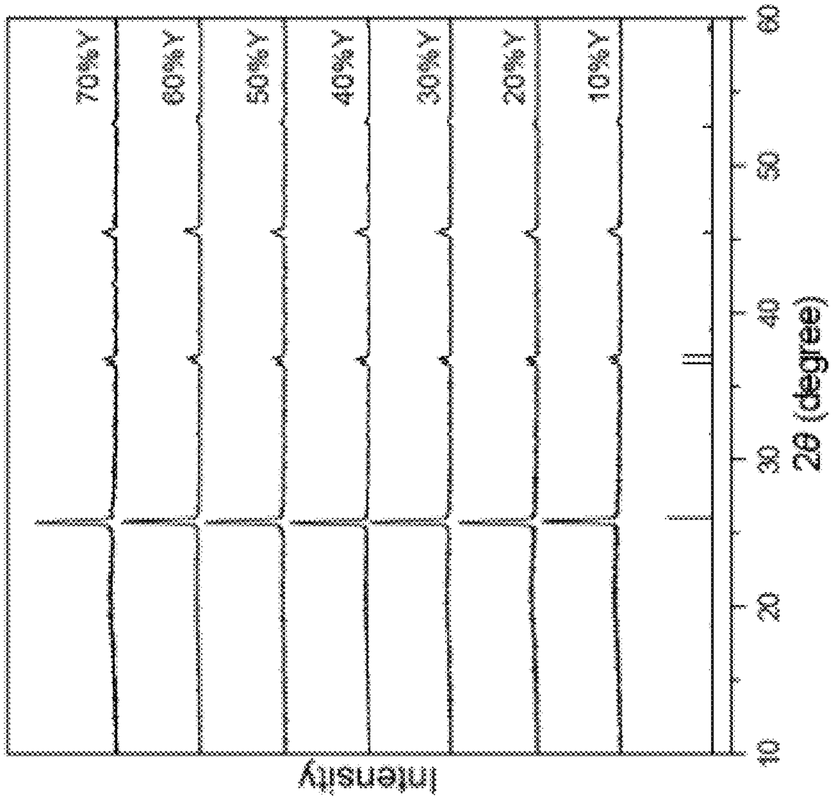
FIG. 28B shows the XRD patterns of $Cs_3TbF_6:Y^{3+}$ (10-70%) crystals of FIG. 28A.

The higher hygroscopicity of $Cs_3TbF_6$:$Eu^{3+}$ than $Rb_3TbF_6$:$Eu^{3+}$ was further demonstrated by examining the weight evolution of the crystals in the ambient environment (25° C., 45 RH %). As summarized in FIG. 24, $Cs_3TbF_6$:$Eu^{3+}$ reached weight saturation much faster (~30 min) than $Rb_3TbF_6$:$Eu^{3+}$ (~175 h), which agreed with the promotion of water absorption by CsF. Notably, the relative weight increases for $Cs_3TbF_6$:$Eu^{3+}$ and $Rb_3TbF_6$:$Eu^{3+}$ at the end of moisture exposure were essentially the same, suggesting that the two crystals experienced similar interactions with water, as confirmed by XRD characterizations (FIG. 25).

Conventional hydrochromic crystals such as $CsPbBr_3$ typically display optical features associated with the band gap of the host lattice, leading to pre-fixed hydrochromic properties specific to the crystals. By contrast, the luminescence switching in the present invention of lanthanide-doped $Cs_3TbF_6$ is controlled by interaction of individual polyhedrons. Therefore, the hydrochromic behavior can be easily tuned by engineering the inter-polyhedral energy transfer through supplementary doping, such as by way of increasing the doped lanthanide ion concentration, co-doping another lanthanide ion and/or rare earth metal ion, etc. As a support, series of $Cs_3TbF_6$:$Eu^{3+}$ (1% to 30%), $Cs_3TbF_6$:$Eu^{3+}$/$Y^{3+}$ (1% $Eu^{3+}$/0 to 70% $Y^{3+}$), and $Cs_3TbF_6$:$Y^{3+}$ (10% to 70%) are synthesized and characterized. In general, the crystal phase and morphology were largely preserved after doping of $Eu^{3+}$ and/or rare-earth ions at high concentrations (FIGS. 26A and 26B, 27A and 27B, 28A and 28B). On particular note, the spectral shift of the XRD patterns of $Cs_3TbF_6$:$Eu^{3+}$ (0% to 30%) toward lower diffraction angles can be attributed to the substitution of apparently larger $Eu^{3+}$ for $Tb^{3+}$ centers in the crystal lattice, resulting in a larger unit-cell volume.

Figure 29:
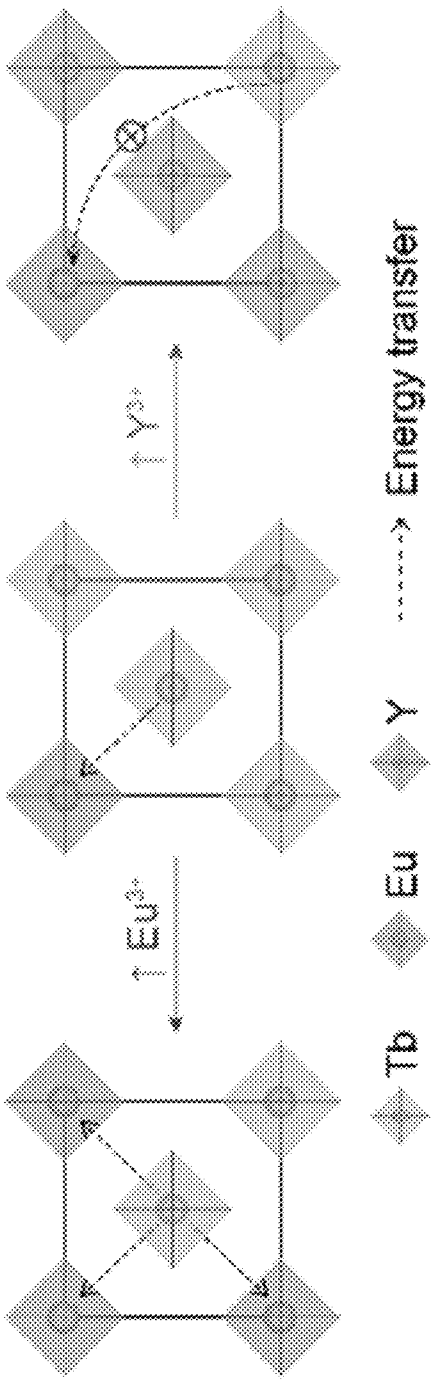
FIG. 29 is a schematic diagram illustrating the doping-controlling energy transfer from $Tb^{3+}$ to $Eu^{3+}$.
Figure 30A:
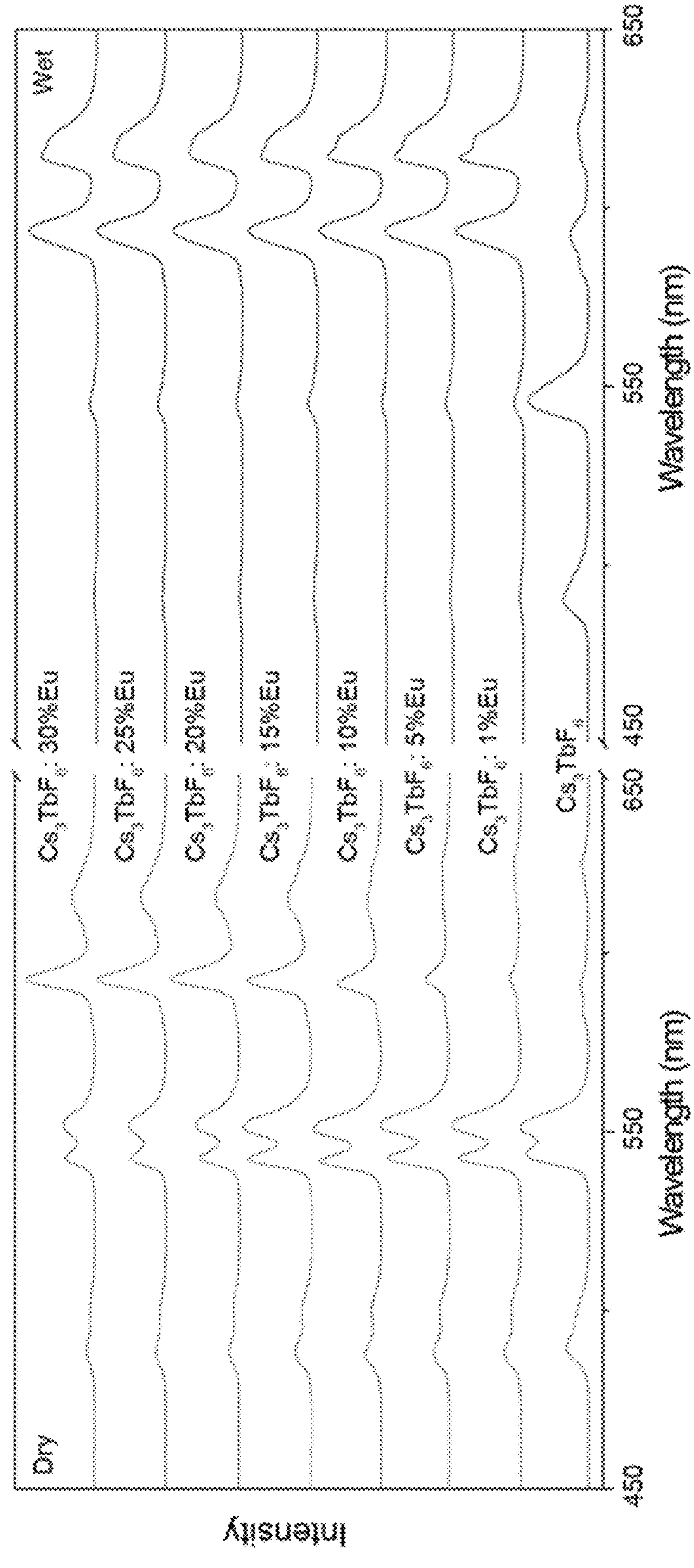
FIG. 30A shows the emission spectra of as-synthesized $Cs_3TbF_6:Eu^{3+}$ (0-30%) crystals before and after water contact under 377 nm excitation.
Figure 30B:
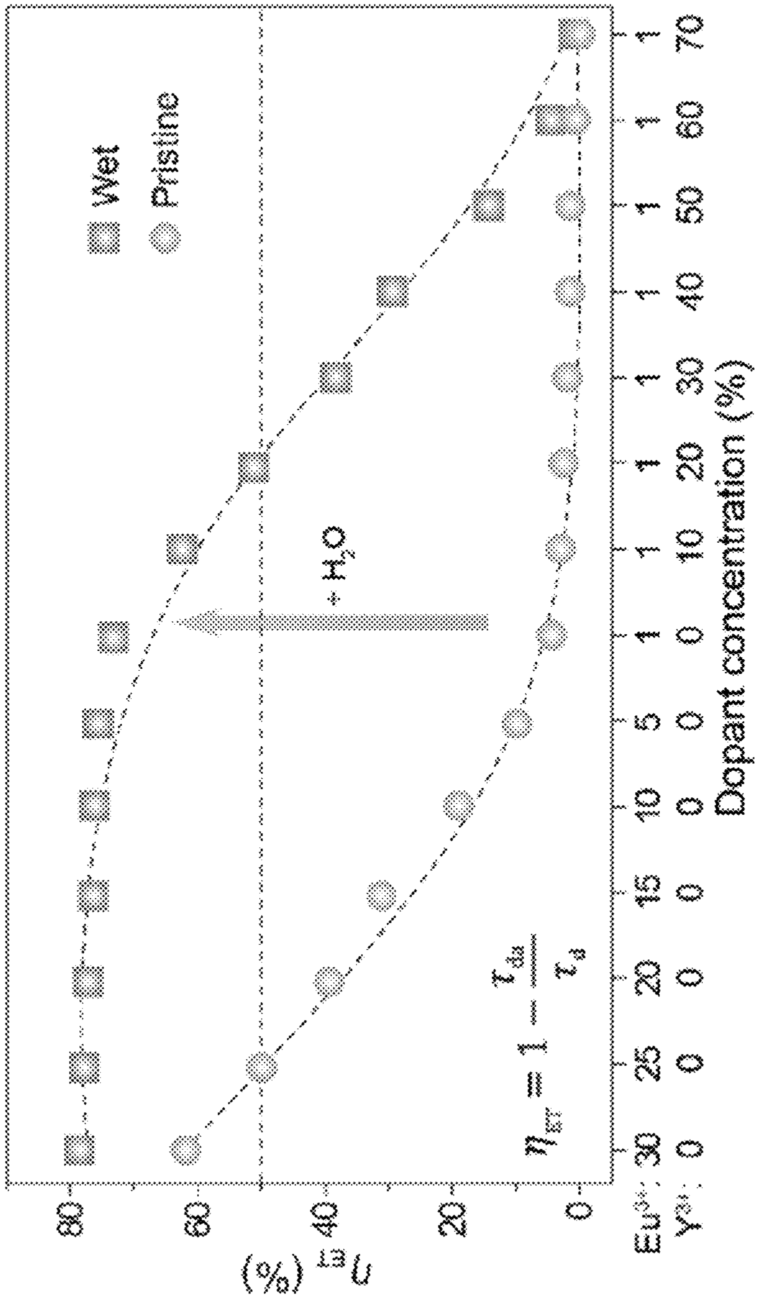
FIG. 30B shows the energy transfer efficiency as a function of $Eu^{3+}/Y^{3+}$ doping concentration in the pristine and wet samples under 377 nm excitation, respectively. The dotted line indicates the energy transfer efficiency of 50%.
Figure 30C:
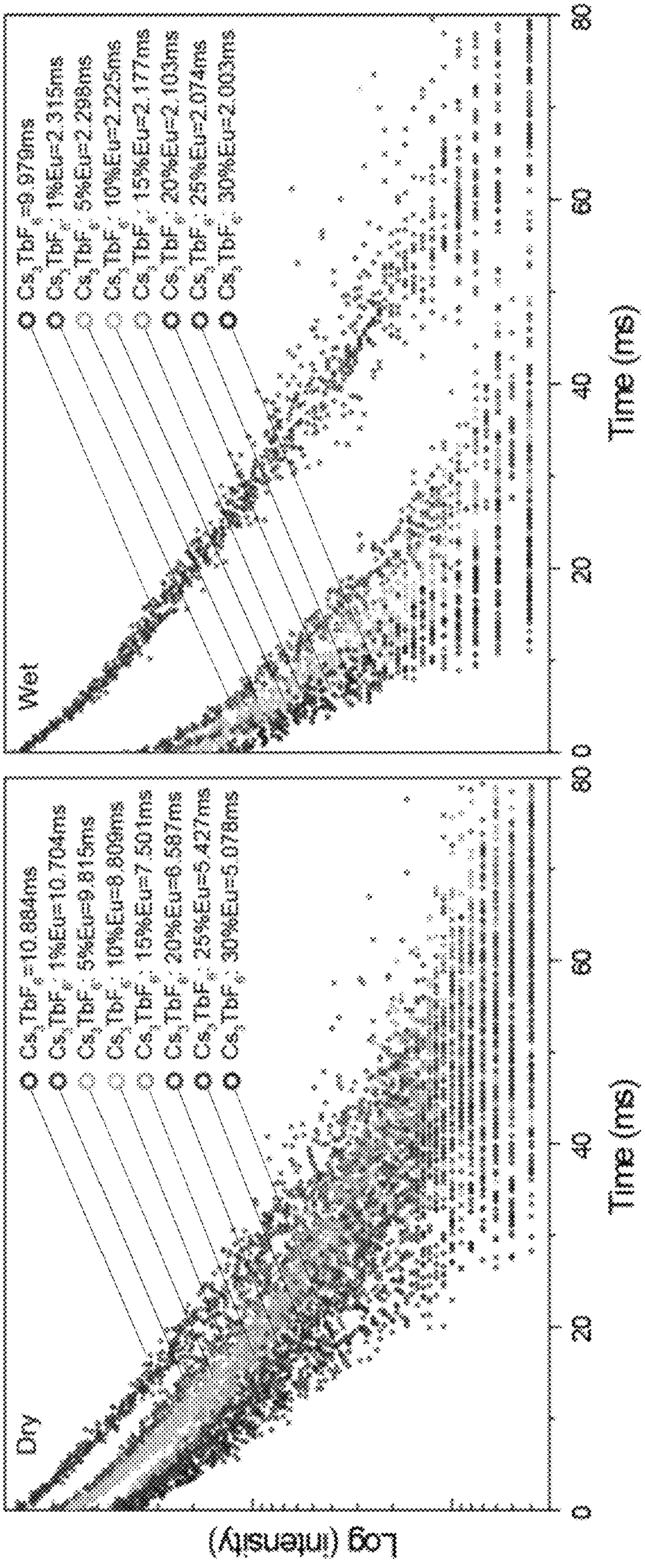
FIG. 30C shows the decay curves of $Cs_3TbF_6:Eu^{3+}$ (0-30%) crystals before and after water treatment corresponding to FIG. 30A.
Figure 31A:
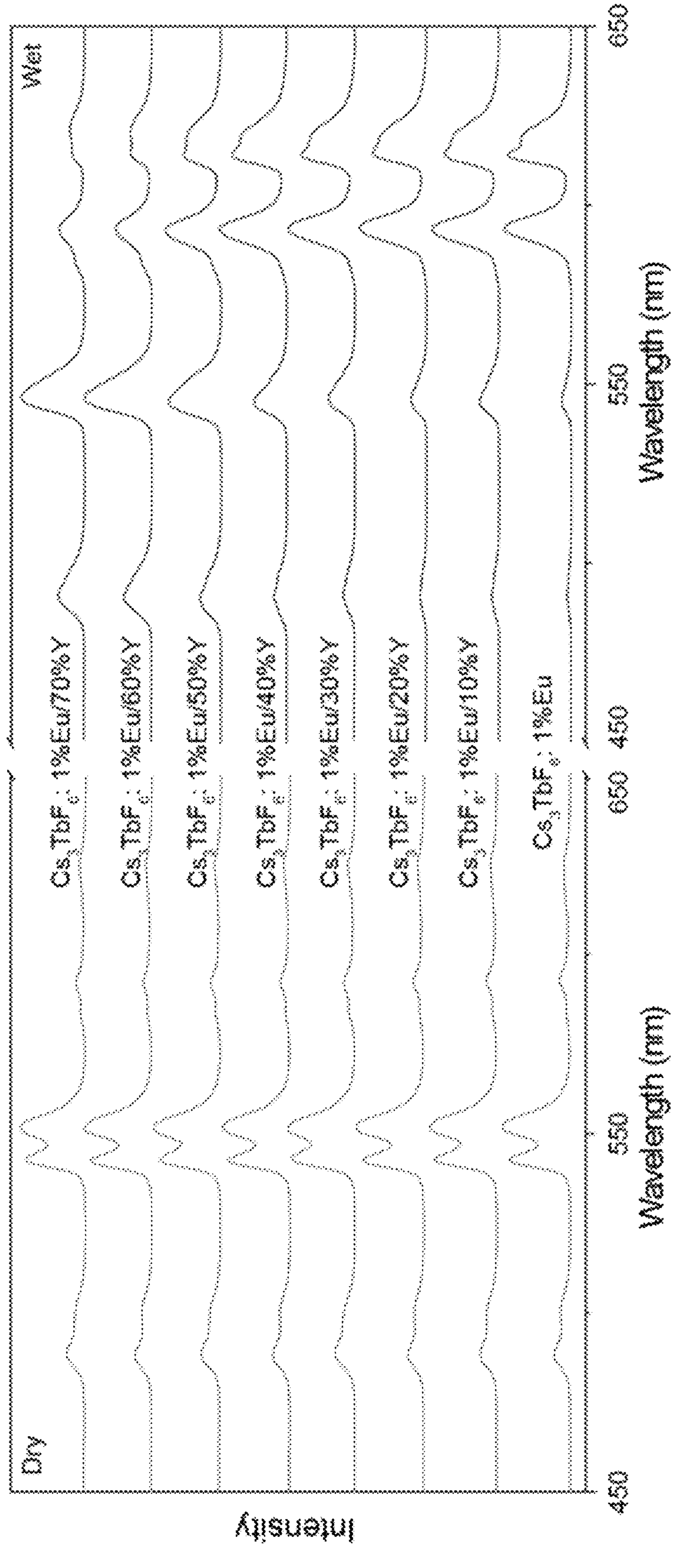
FIG. 31A shows the emission spectra of $Cs_3TbF_6:Eu^{3+}/Y^{3+}$ (1%/0-70%) crystals before and after water contact under 377 nm excitation.
Figure 31B:
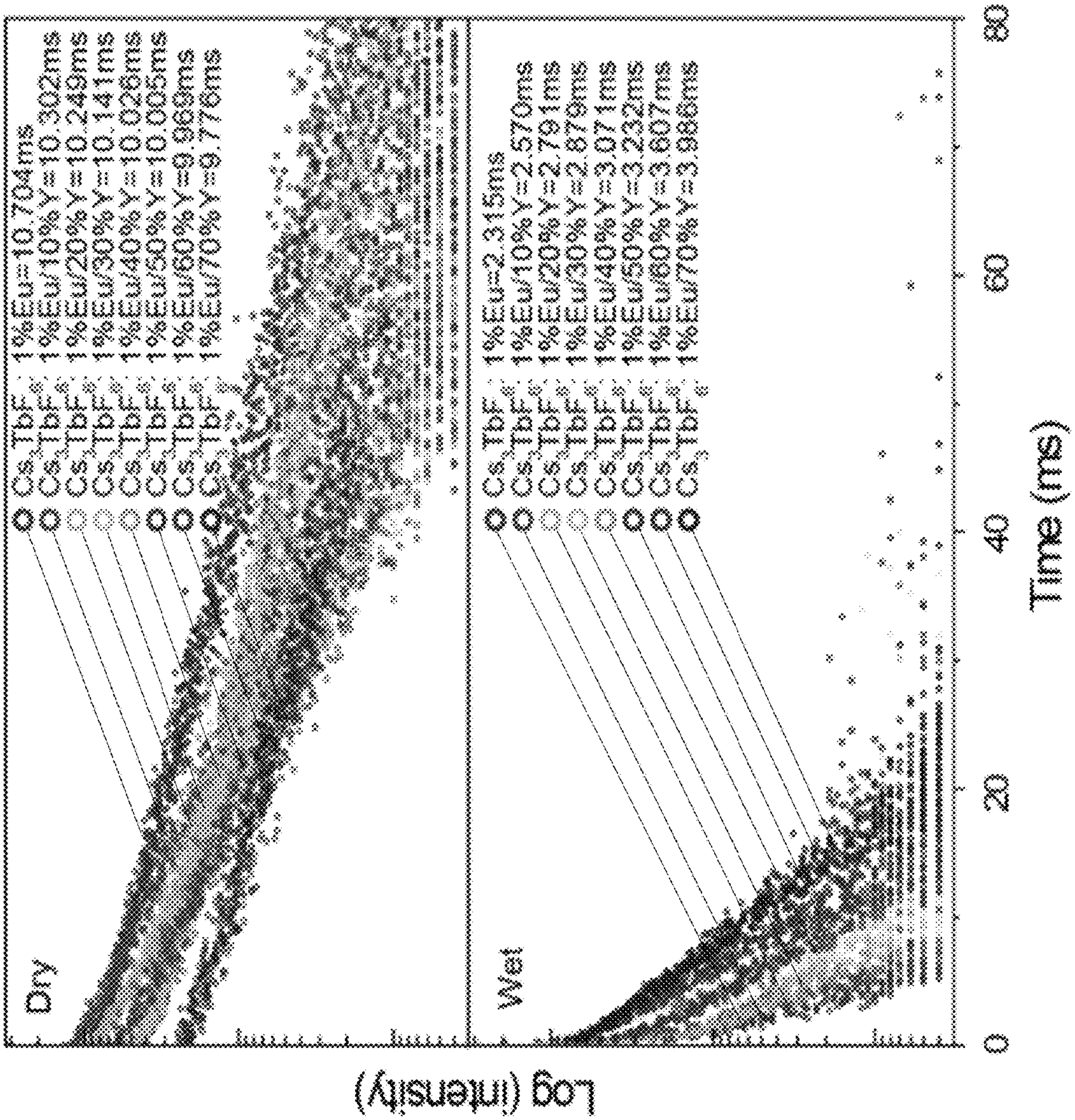
FIG. 31B shows the decay curves of $Cs_3TbF_6:Eu^{3+}/Y^{3+}$ (1%/0-70%) crystals before and after water treatment corresponding to FIG. 31A.
Figure 31C:
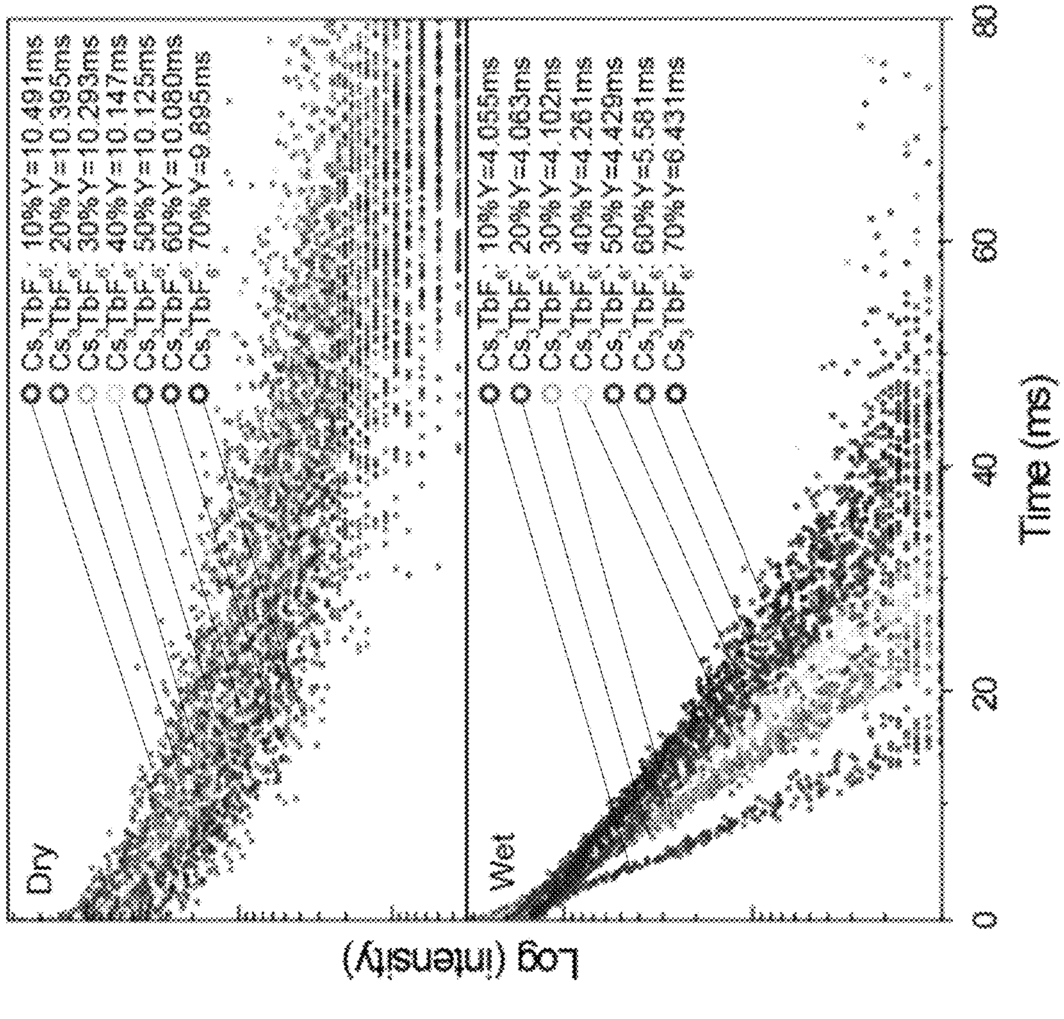
FIG. 31C shows the decay curves of $Cs_3TbF_6:Y^{3+}$ (10-70%) crystals before and after water treatment.

By increasing the $Eu^{3+}$ doping concentration, the $Tb^{3+}$-to-$Eu^{3+}$ energy transfer was strengthened (FIG. 29) due to the promotion of acceptor absorption based on the Förster theory:

$$k_{ET} \propto \frac{\kappa^2}{r^2}\int_0^\infty F_D(\lambda)\varepsilon_A(\lambda)\lambda^4 d\lambda$$

where $\kappa^2$ is an orientation factor, r is the donor-acceptor distance, and $F_D(\lambda)/\varepsilon_A(\lambda)$ is the donor emission/acceptor absorption strength at wavelength $\lambda$. Accordingly, largely enhanced $Eu^{3+}$ emissions in pristine $Cs_3TbF_6$:$Eu^{3+}$ crystals at high doping levels (e.g., 30%) was observed (FIG. 30A). Subsequent phase transformation by water exposure only induced minor changes in the emission profile due to a minor increase in energy transfer efficiency (FIGS. 30B and 30C).

In addition, the energy transfer process can be inhibited by incorporating inert $Y^{3+}$ ions into the host lattice, which increases the interionic distance (r) of $Tb^{3+}$ and $Eu^{3+}$ according to Blasse's equation:

$$r = 2\left(\frac{3V}{4\pi cN}\right)^{1/3}$$

where c is the total concentration of $Tb^{3+}$ and $Eu^{3+}$, N is the number of lanthanide sites in the unit cell, and V is the volume of the unit cell. By increasing the $Y^{3+}$ doping concentration, hydrochromic switching was steadily suppressed because the phase transformation could no longer bring the $Tb^{3+}$ and $Eu^{3+}$ ions into close proximity (FIGS. 29 and 31A to 31C).

Figure 32:
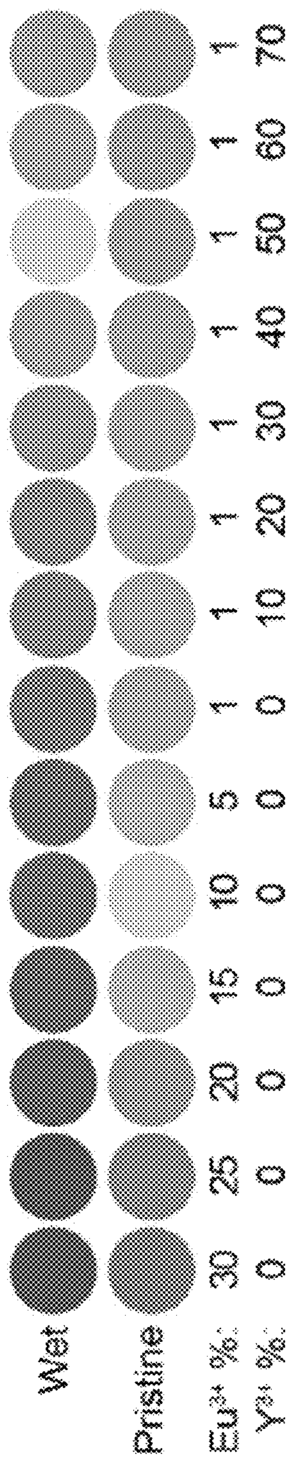
FIG. 32 shows the corresponding luminescence photographs of the samples in FIG. 30B under 365 nm excitation.

Accordingly, it is appreciated that by the doping-mediated administration of inter-polyhedral energy transfer as discussed above, it would allow fine-tuning of the hydrochromic properties. That said, the emission color before and after water treatment of $Cs_3TbF_6$:$Eu^{3+}$ could be fine-tuned by doping with different concentrations of $Eu^{3+}$ and/or co-doping with different concentrations of $Y^{3+}$ (FIG. 32). For example, as shown, the emission color of pristine $Cs_3TbF_6$:$Eu^{3+}$ under 365 nm excitation may change from green to orange by increasing the doped-$Eu^{3+}$ concentration from 1 mol % to 30 mol % while reducing the co-doping concentration of $Y^{3+}$ from 70 mol % to 0 mol %. On the other hand, the emission color of the wet $Cs_3TbF_6$:$Eu^{3+}$/$Y^{3+}$ may change from orange to green upon reducing the $Eu^{3+}$ concentration (from 30 mol % to 1 mol %) while increasing the co-doped $Y^{3+}$ concentration (from 0 mol % to 70 mol %).

Optionally or additionally, the emission color of the pristine-wet pair of $Cs_3TbF_6$:$Eu^{3+}$/$Y^{3+}$ may be further fine-tuned by use of different excitation wavelengths. For example, when the excitation wavelength used for exciting $Cs_3TbF_6$:$Eu^{3+}$/$Y^{3+}$ (1%-30% $Eu^{3+}$/0% $Y^{3+}$) is changed from 365 nm to 393 nm, the emission color of the pristine $Cs_3TbF_6$:$Eu^{3+}$/$Y^{3+}$ will change from non-fluorescent to pink (red).

Figure 33:
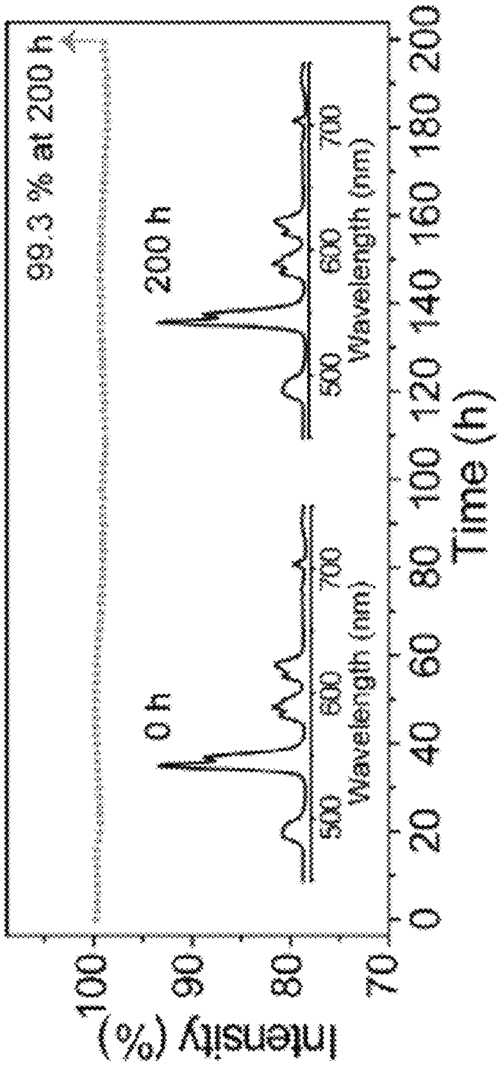
FIG. 33 shows the integral emission intensity of the $Cs_3TbF_6:Eu^{3+}$ (1%) crystals under continuous irradiation of a 365 nm UV lamp at 373 K. The inset is a comparison of the initial and final emission profiles.
Figure 34B:
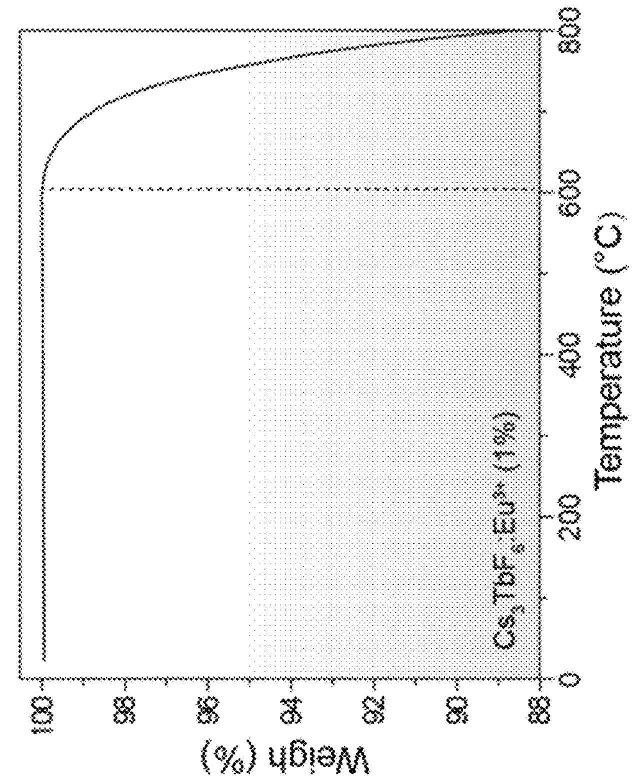
FIG. 34B shows the thermogravimetric (TG) curves of the $Cs_3TbF_6:Eu^{3+}$ (1%) crystals, showing that the sample weight remained stable at temperature up to ~600° C.
Figure 34A:
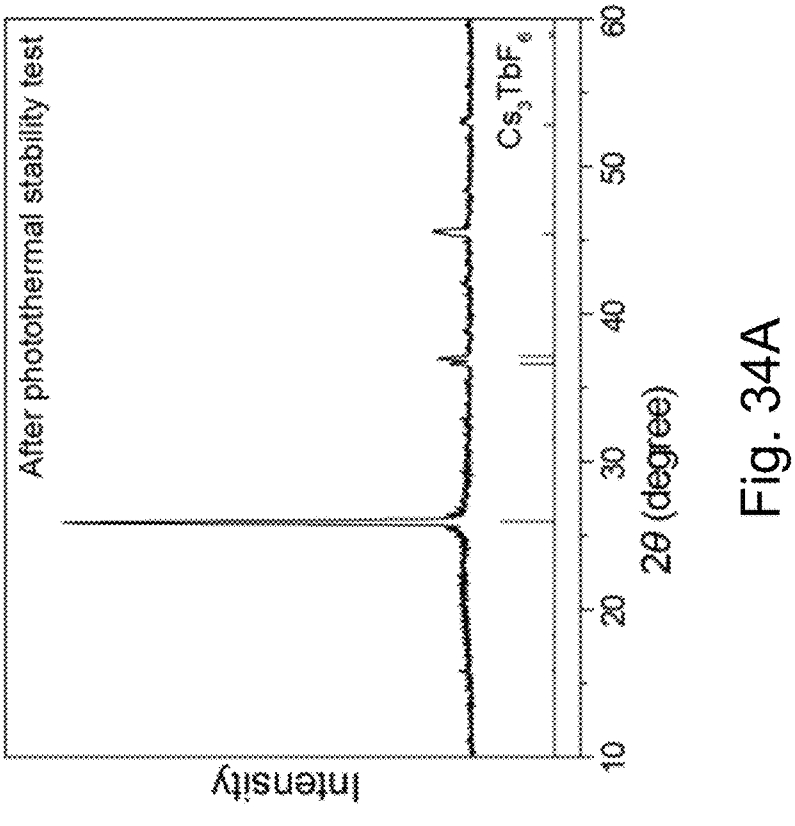
FIG. 34A shows the XRD pattern of the $Cs_3TbF_6:Eu^{3+}$ (1%) crystals after photothermal stability test.
Figure 35A:
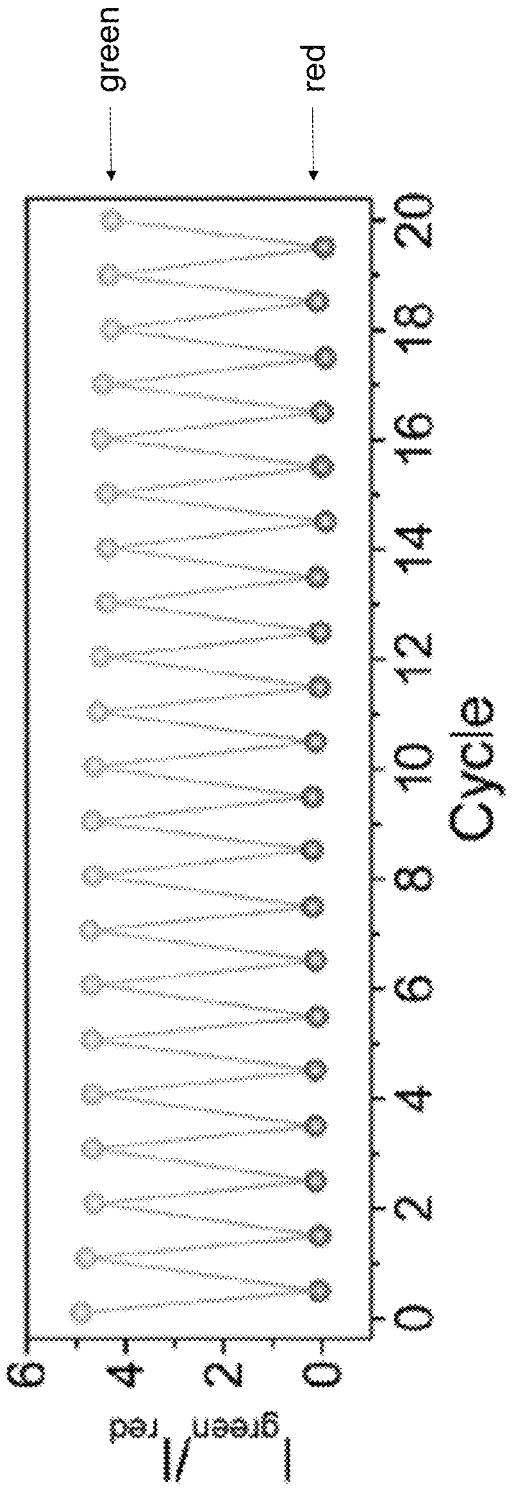
FIG. 35A shows the red-to-green intensity ratios of the $Cs_3TbF_6:Eu^{3+}$ (1%) crystals in 20 wetting-drying cycles.
Figure 35B:
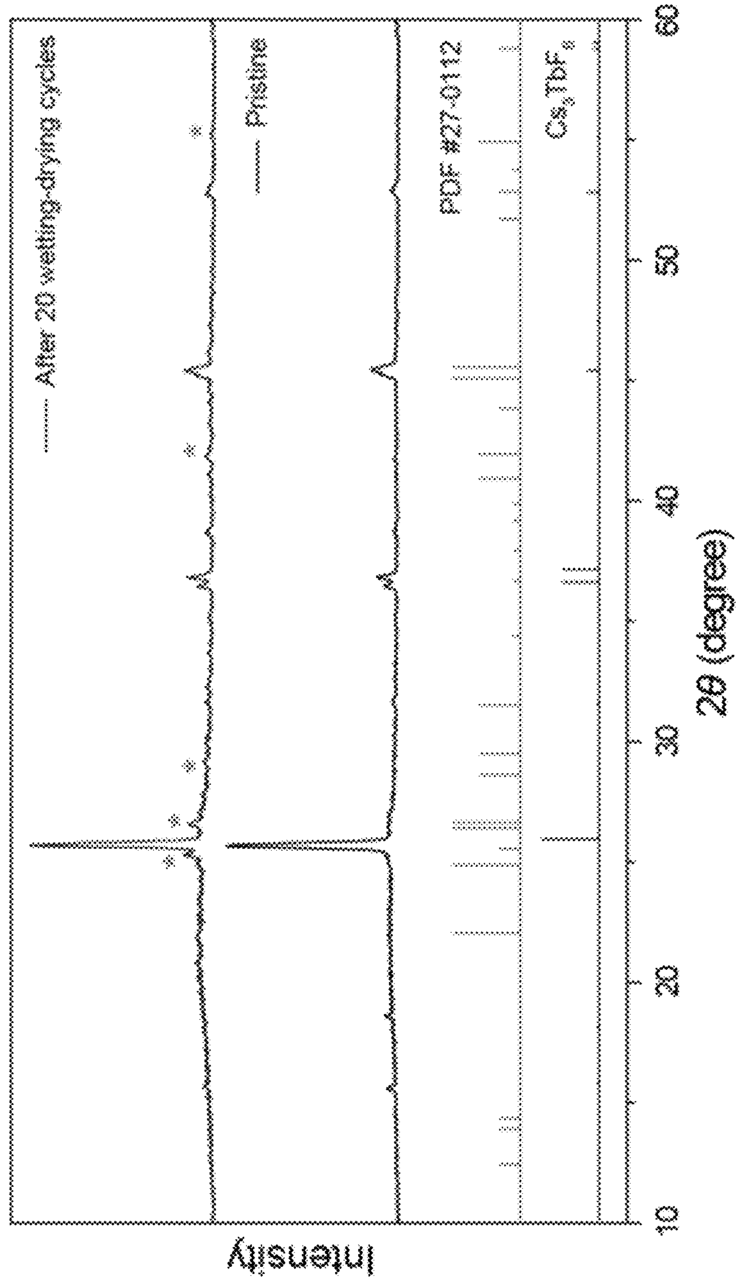
FIG. 35B shows the XRD patterns of $Cs_3TbF_6:Eu^{3+}$ (1%) crystals in pristine and after 20 wetting-drying cycles. Only a negligible amount of $CsTb_2F_7$ residues (indicated by asterisks) were detected after the cycling test, which showed no noticeable effect on the overall luminescence properties.
Figure 36:
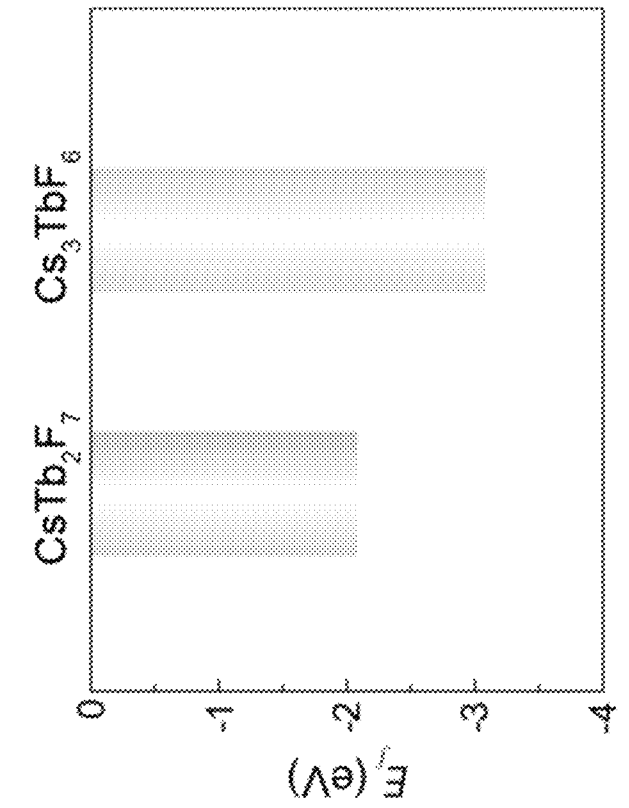
FIG. 36 shows the formation energy of $Cs_3TbF_6$ and $CsTb_2F_7$ crystals obtained by DFT calculation.

On top of the fast and multicolor hydrochromic switching, the $Cs_3TbF_6$:$Eu^{3+}$ crystals also feature reversible phase transformation and high photothermal stability. As plotted in FIG. 33, the sample displayed no noticeable changes in integral intensity and emission profile under continuous irradiation of a 365 nm UV lamp at 373 K for 200 h. Additionally, the sample structure was essentially unaffected by the heat treatment, and the sample weight remained steady at temperatures up to ~600° C. (FIGS. 34A and 34B). Furthermore, the original emission color can be essentially recovered by losing water for 20 wetting-drying cycles (FIG. 35A), owing to retrieval of the initial crystal phase, as confirmed by XRD characterizations (FIG. 35B). The observations were attributed to the higher stability of $Cs_3TbF_6$ than $CsTb_2F_7$ in anhydrous environments, resulting from the lower formation energy (−3.11 eV for $Cs_3TbF_6$ and −2.13 eV for $CsTb_2F_7$) based on density functional theory (DFT) calculations (FIG. 36).

Example 4

Encryption Application

Figure 37A:
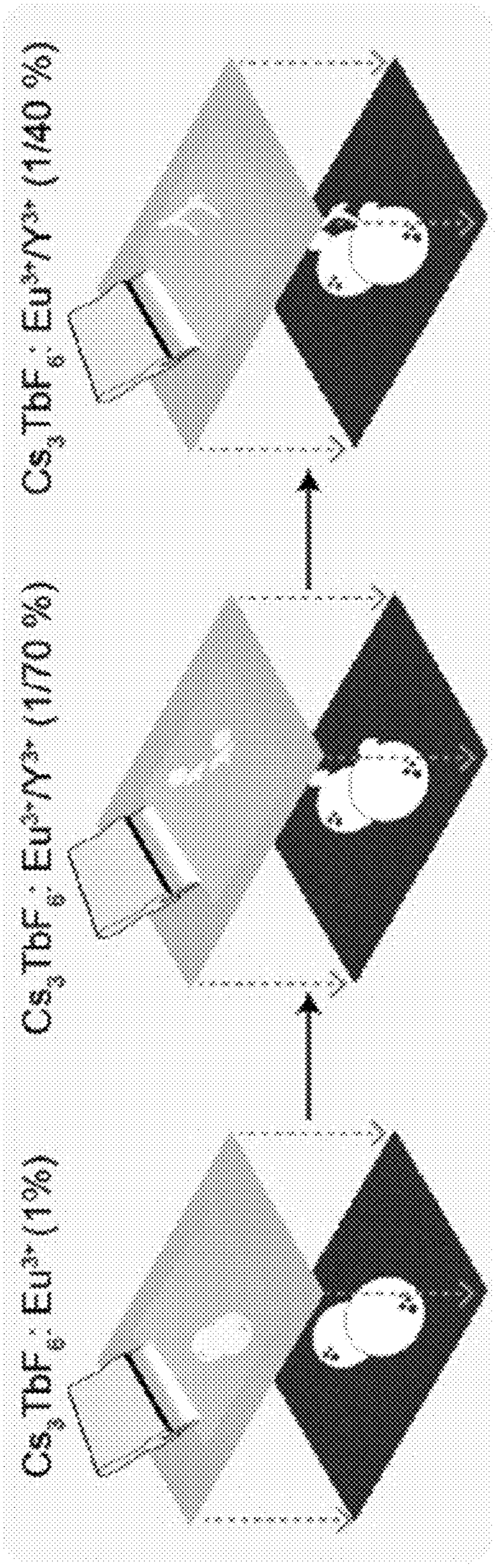
FIG. 37A is a schematic diagram illustrating the multi-color pattern preparation through serial screen printing.
Figure 37B:
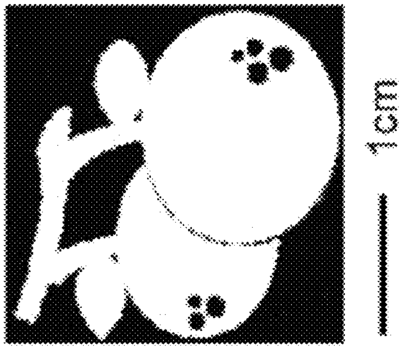
FIG. 37B shows the photograph of the pattern under ambient light.
Figure 37C:
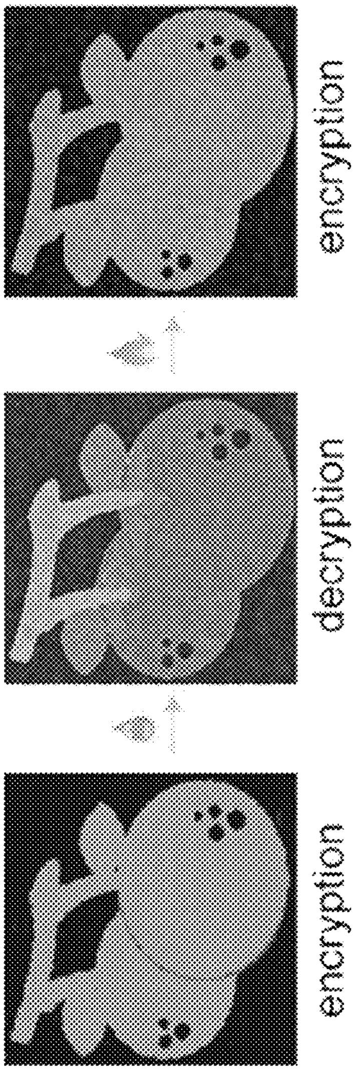
FIG. 37C shows the luminescence photographs of an orange pattern under 365 nm UV lamp excitation in a wetting-drying cycle.

It is believed that the ability of the crystals to deliver tunable emissions in response to external stimulus provides excellent opportunities for information encryption. As a proof of concept, a multicolor graphic was protected by jointly using $Cs_3TbF_6$:$Eu^{3+}$ (1%), $Cs_3TbF_6$:$Eu^{3+}$/$Y^{3+}$ (1%/70%), and $Cs_3TbF_6$:$Eu^{3+}$/$Y^{3+}$ (1%/40%) crystals, which were patterned through serial screen printing on a cardstock substrate (FIG. 37A). As shown in FIGS. 37B and 37C, the security information was only recognizable under simultaneous UV excitation and water stimulus, which could be concealed again by the evaporation of water.

Figure 38A:
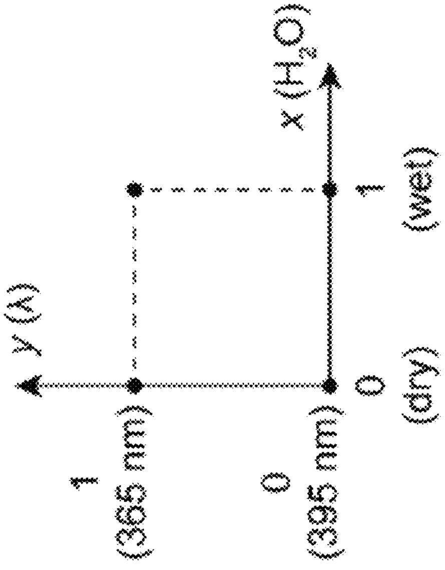
FIG. 38A shows the coordinate plane which illustrates the design principle of two-dimensional encryption based on excitation wavelength and stimulus conditions.
Figure 38B:
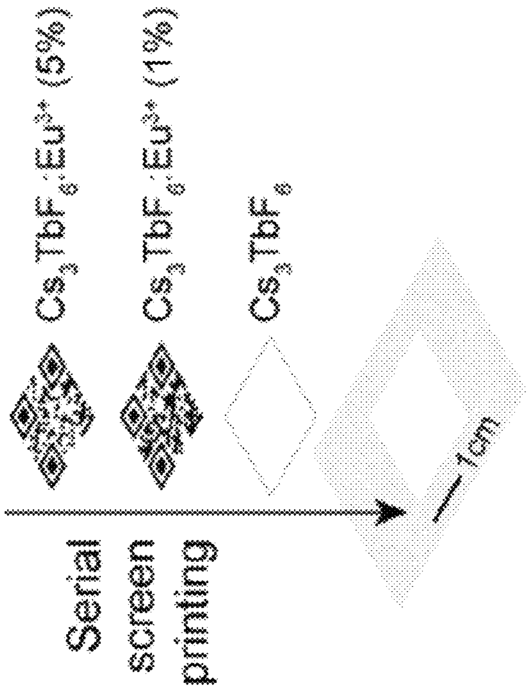
FIG. 38B is a schematic diagram illustrating the QR pattern preparation through serial screen printing.
Figure 38C:
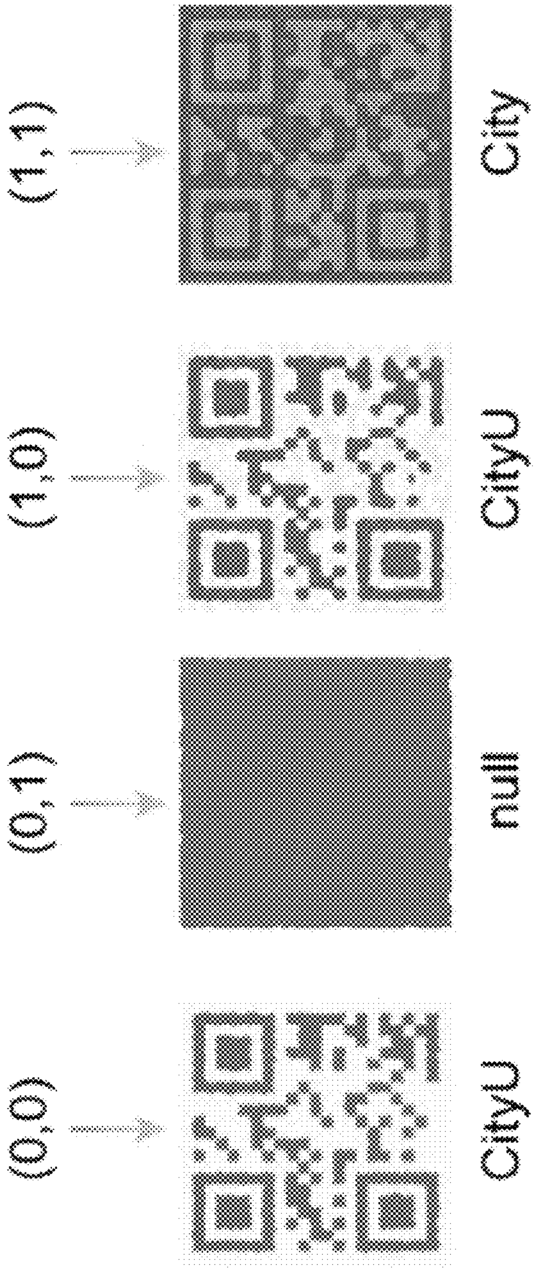
FIG. 38C shows the output codes of the QR pattern under different excitation and stimulus parameters.

Furthermore, a two-dimensional encryption method was devised by combining the stimulus-responsive and excitation-wavelength-dependent features of the $Cs_3TbF_6$:$Eu^{3+}$ crystals (FIG. 38A). In an illustrative design, text information "City" was encrypted into a quick response (QR) code and printed using $Cs_3TbF_6$:$Eu^{3+}$ (1%) against a $Cs_3TbF_6$ background. A protection QR code of "CityU" was further printed in the same position using $Cs_3TbF_6$:$Eu^{3+}$ (5%) (FIG. 38B). FIG. 39C shows the output codes under diverse excitation/stimulus parameters. The encrypted information can only be extracted using a particular combination of excitation wavelength and stimulus condition.

As shown, at (0, 0) conditions (i.e., dry state, $\lambda_{ex}$=395 nm), $Cs_3TbF_6$ is not excitable upon 395 nm excitation but $Cs_3TbF_6$:$Eu^{3+}$ (1%) and $Cs_3TbF_6$:$Eu^{3+}$ (5%) instead. However, it is believed that owing to the low $Eu^{3+}$ content in $Cs_3TbF_6$:$Eu^{3+}$ (1%), the "City" QR code is too weak to be recognized and therefore only the pink "CityU" QR code as printed by $Cs_3TbF_6$:$Eu^{3+}$ (5%) would be observable by naked eyes. Upon changing the excitation to 365 nm (i.e., (0, 1) condition), the optical emission is dominated by $Tb^{3+}$ in all the three halide perovskites, resulting in a green emission. Further changing the conditions to (1, 0) (i.e., wet state, $\lambda_{ex}$=395 nm), substantially the same result was observed as that with (0, 0) conditions, which may be accounted for by the same reason as mentioned above. Finally, at (1, 1) conditions (i.e., wet state, $\lambda_{ex}$=365 nm), an orange "City" QR code against a green background is recognizable by naked eyes. It is appreciated that the recognizable "City" QR code may be attributed to the incomplete (i.e., lower than 100%) energy transfer efficiency from $Tb^{3+}$ to $Eu^{3+}$ under 365 nm or 377 nm excitation, rendering part of the Tb emission at about 550 nm retained and therefore an apparently a brighter emission, as compared to the (1, 1) case of which the emission is solely dependent on the $Eu^{3+}$ emission.

Given the inherent merits of environmental friendliness and easy production, it is believed that the $Cs_3TbF_6$ crystals may hold great promise for multilevel data storage and anti-counterfeiting applications.

The invention has been given by way of example only, and various other modifications of and/or alterations to the described embodiment may be made by persons skilled in the art without departing from the scope of the invention as specified in the appended claims.

The invention claimed is:

1. A hydrochromic halide perovskite comprising a $Cs_3TbF_6$ halide perovskite doped with $Eu^{3+}$, the hydrochromic halide perovskite capable of water-induced reversible phase transformation between a pristine state $Cs_3TbF_6$:$Eu^{3+}$ and a wet state $CsTb_2F_7$:$Eu^{3+}$, and exhibiting reversible change in optical emission when subject to ultraviolet excitation at a specific wavelength.

2. The hydrochromic halide perovskite as claimed in claim 1, wherein the optical emission of $Cs_3TbF_6$:$Eu^{3+}$ is adjustable by the specific wavelength during the ultraviolet excitation.

3. The hydrochromic halide perovskite as claimed in claim 2, wherein when the specific wavelength is between about 365 nm and about 377 nm, $Cs_3TbF_6$:$Eu^{3+}$ produces a green emission; when the specific wavelength is between about 393 nm and about 395 nm, $Cs_3TbF_6$:$Eu^{3+}$ produces a red or pink emission.

4. The hydrochromic halide perovskite as claimed in claim 1, wherein the optical emission of $Cs_3TbF_6$:$Eu^{3+}$ under UV excitation at the specific wavelength is changeable by adjusting concentration of $Eu^{3+}$.

5. The hydrochromic halide perovskite as claimed in claim 1, wherein $Cs_3TbF_6$:$Eu^{3+}$ is a zero-dimensional structure and $CsTb_2F_7$:$Eu^{3+}$ is a one-dimensional structure.

6. The hydrochromic halide perovskite as claimed in claim 4, wherein, when the specific wavelength is about 365 nm, the optical emission of $Cs_3TbF_6$:$Eu^{3+}$ under UV excitation is changeable between green and orange by adjusting concentration of $Eu^{3+}$.

7. The hydrochromic halide perovskite as claimed in claim 6, wherein the concentration of $Eu^{3+}$ is adjustable between 1 mol % and 30 mol %.

8. The hydrochromic halide perovskite as claimed in claim 4, wherein, when the specific wavelength is about 393 nm, the optical emission of $Cs_3TbF_6$:$Eu^{3+}$ under UV excitation is changeable between non-fluorescent and pink by adjusting concentration of $Eu^{3+}$.

9. The hydrochromic halide perovskite as claimed in claim 8, wherein the concentration of $Eu^{3+}$ is adjustable between 0 mol % and 30 mol %.

10. The hydrochromic halide perovskite as claimed in claim 1, wherein the $Cs_3TbF_6$ is co-doped with $Eu^{3+}$ and $Y^{3+}$ ($Cs_3TbF_6$:$Eu^{3+}$/$Y^{3+}$) and $CsTb_2F_7$ is co-doped with $Eu^{3+}$ and $Y^{3+}$ ($CsTb_2F_7$:$Eu^{3+}$/$Y^{3+}$).

11. The hydrochromic halide perovskite as claimed in claim 10, wherein the concentration of $Eu^{3+}$ is adjustable between 1 mol % and 30 mol % and the concentration of $Y^{3+}$ is adjustable between 0 mol % and 70 mol %.

12. The hydrochromic halide perovskite as claimed in claim 10, wherein-optical emission of $Cs_3TbF_6$:$Eu^{3+}$/$Y^{3+}$ is changeable by adjusting the specific wavelength.

13. The hydrochromic halide perovskite as claimed in claim 12, wherein the optical emission of $Cs_3TbF_6$:$Eu^{+3}$/$Y^{+3}$ is changeable from non-fluorescent to pink or red by adjusting the specific wavelength from about 365 nm to about 393 nm.

14. The hydrochromic halide perovskite as claimed in claim 10, under the specific wavelength, optical emission of $Cs_3TbFe_6$:$Eu^{3+}$/$Y^{3+}$ and/or $CsTb_2F_7$:$Eu^{3+}$/$Y^{3+}$ is changeable by adjusting concentration of $Eu^{3+}$ and/or $Y^{3+}$.

15. The hydrochromic halide perovskite as claimed in claim 14, wherein when the specific wavelength is about 365 nm to about 377 nm, the optical emission of $CsTb_2F_7$:$Eu^{3+}$/$Y^{3+}$ is changeable between orange and green by adjusting concentration of $Y^{3+}$.

16. The hydrochromic halide perovskite as claimed in claim 14, wherein, when the specific wavelength is about 365 nm, the optical emission of $Cs_3TbF_6$:$Eu^{3+}$/$Y^{3+}$ is adjustable between orange and green by adjusting concentration of $Eu^{3+}$ and/or $Y^{3+}$.

17. The hydrochromic halide perovskite as claimed in claim 14, wherein, when the specific wavelength is about 365 nm, the optical emission of $CsTb_2F_7$:$Eu^{3+}$/$Y^{3+}$ is adjustable between orange and green by adjusting concentration of $Eu^{3+}$ and/or $Y^{3+}$.

18. The hydrochromic halide perovskite as claimed in claim 1, wherein transformation from $Cs_3TbFe_6$:$Eu^{3+}$ to $CsTb_2F_7$:$Eu^{3+}$ reaches 90% within a response time of about 20 ms.

19. The hydrochromic halide perovskite as claimed in claim 18, wherein the response time is changeable by adjusting water absorption ability of $Cs_3TbF_6$:$Eu^{3+}$ by partly forming Rb-alloyed $Cs_3TbF_6$:$Eu^{3+}$.

20. A film having a printed pattern thereon, the pattern comprising at least a first layer and a second layer, wherein the first layer includes the hydrochromic halide perovskite as claimed in claim 1.

21. The film as claimed in claim 20, wherein the first layer comprises $Cs_3TbF_6$:$Eu^{3+}$, and the second layer comprises $Cs_3TbF_6$ or $Cs_3TbF_6$ doped with $Eu^{3+}$ and $Y^{3+}$ ($Cs_3TbF_6$:$Eu^{3+}$/$Y^{3+}$).

22. A method for preparing the hydrochromic halide perovskite as claimed in claim 1, comprising the steps of:

providing a mixture comprising a Cs source, a Tb source, a F source, and a lanthanide source; and heating the mixture at an elevated temperature for a predetermined time.

23. The method as claimed in claim 22, further comprising a step of grinding the mixture prior to the step of heating the mixture.

24. The method as claimed in claim 22, wherein the mixture comprises stoichiometric amount of $CsCO_3$, $TbF_3$, $NH_4F$, and $EuF_3$.

25. The method as claimed in claim 24, wherein molar ratio of Cs:Tb:F:Eu in the mixture is from about 3:0.99:6:0.01 to about 3:0.7:6:0.3.

26. The method as claimed in claim 24, wherein the mixture further comprises $YF_3$.

27. The method as claimed in claim 26, wherein molar ratio of Cs:Tb:F:Eu:Y in the mixture is from about 3:0.89:6:0.01:0.1 to about 3:0.29:6:0.01:0.7.

28. The method as claimed in claim 24, wherein the mixture further comprises $Rb_2CO_3$.

29. The method as claimed in claim 28, wherein molar ratio of Cs:Rb:Tb:F:Eu in the mixture is from about 2.4:0.6:0.99:6:0.01 to about 0.6:2.4:0.99:6:0.01.

30. The method as claimed in claim 22, wherein the step of heating is performed at about 150° C. to about 500° C. for about 2 h.

* * * * *